US008142278B2

(12) United States Patent
Tsukahara

(10) Patent No.: US 8,142,278 B2
(45) Date of Patent: Mar. 27, 2012

(54) GAMING MACHINE WITH LOCKING FUNCTION AND INSURANCE FEATURE

(75) Inventor: Nakayasu Tsukahara, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1054 days.

(21) Appl. No.: 12/038,578

(22) Filed: Feb. 27, 2008

(65) Prior Publication Data

US 2009/0117976 A1 May 7, 2009

Related U.S. Application Data

(60) Provisional application No. 60/984,591, filed on Nov. 1, 2007.

(51) Int. Cl.
*A63F 9/00* (2006.01)
*A63F 13/00* (2006.01)
*G06F 17/00* (2006.01)
*G06F 19/00* (2011.01)

(52) U.S. Cl. .............................. 463/24; 463/25; 463/29

(58) Field of Classification Search .............. 463/16–22, 463/43–44, 24, 25, 29

See application file for complete search history.

(56) References Cited

U.S. PATENT DOCUMENTS 4,283,709 A 8/1981 Lucero et al.
4,624,459 A 11/1986 Kaufman
4,669,731 A 6/1987 Clarke
4,837,728 A 6/1989 Barrie et al.
4,964,638 A 10/1990 Ishida
5,178,390 A * 1/1993 Okada ...................... 273/143 R
5,280,909 A 1/1994 Tracy
5,564,700 A 10/1996 Celona
5,611,730 A 3/1997 Weiss
5,639,088 A 6/1997 Schneider et al.
5,695,402 A 12/1997 Stupak
5,702,303 A 12/1997 Takemoto et al.
5,770,533 A 6/1998 Franchi
5,820,459 A 10/1998 Acres et al.
5,836,817 A 11/1998 Acres et al.
5,890,963 A 4/1999 Yen
5,910,048 A * 6/1999 Feinberg ......................... 463/25
6,001,016 A 12/1999 Walker et al.
6,003,013 A 12/1999 Boushy et al.
6,089,980 A 7/2000 Gauselmann
6,113,493 A * 9/2000 Walker et al. .................. 463/25
6,165,071 A * 12/2000 Weiss ............................. 463/24
6,224,482 B1 5/2001 Bennett
6,234,896 B1 5/2001 Walker et al.
6,244,957 B1 6/2001 Walker et al.
(Continued)

FOREIGN PATENT DOCUMENTS

EP 0 631 798 A1 1/1995
(Continued)

*Primary Examiner* — Peter DungBa Vo
*Assistant Examiner* — Bach Hoang
(74) *Attorney, Agent, or Firm* — NDQ&M Watchstone LLP

(57) ABSTRACT

A slot machine of the present invention comprises: a removable key provided so as to correspond to the gaming machine; and a controller, the controller programmed to execute the processing of (A) determining whether or not the key has been removed, and (B) controlling the gaming machine so as to make a game executable when determining in the processing (A) that the key has not been removed, while controlling the gaming machine so as to make the game unexecutable when determining in the processing (A) that the key has been removed.

11 Claims, 47 Drawing Sheets

U.S. PATENT DOCUMENTS

| | | | | |
|---|---|---|---|---|
| 6,254,482 | B1 * | 7/2001 | Walker et al. | 463/25 |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,561,903 | B2 * | 5/2003 | Walker et al. | 463/25 |
| 6,695,697 | B1 | 2/2004 | Okada | |
| 6,800,027 | B2 * | 10/2004 | Giobbi et al. | 463/24 |
| 6,869,362 | B2 * | 3/2005 | Walker et al. | 463/25 |
| 6,923,721 | B2 * | 8/2005 | Luciano et al. | 463/24 |
| 6,932,704 | B2 | 8/2005 | Walker et al. | |
| 6,932,707 | B2 | 8/2005 | Duhamel | |
| 7,182,690 | B2 * | 2/2007 | Giobbi et al. | 463/24 |
| 7,393,279 | B2 * | 7/2008 | Walker et al. | 463/25 |
| 7,416,486 | B2 * | 8/2008 | Walker et al. | 463/25 |
| 7,494,416 | B2 * | 2/2009 | Walker et al. | 463/25 |
| 7,722,459 | B2 * | 5/2010 | Kane et al. | 463/25 |
| 7,744,460 | B2 * | 6/2010 | Walker et al. | 463/21 |
| 7,753,789 | B2 * | 7/2010 | Walker et al. | 463/42 |
| 7,771,273 | B2 * | 8/2010 | Walker et al. | 463/25 |
| 7,771,275 | B2 * | 8/2010 | Walker et al. | 463/25 |
| 7,775,878 | B2 * | 8/2010 | Walker et al. | 463/25 |
| 7,775,879 | B2 * | 8/2010 | Walker et al. | 463/25 |
| 7,811,167 | B2 * | 10/2010 | Giobbi et al. | 463/24 |
| 8,029,366 | B2 * | 10/2011 | Fujimoto | 463/42 |
| 2003/0069073 | A1 | 4/2003 | Okada | |
| 2003/0119585 | A1 * | 6/2003 | Walker et al. | 463/25 |
| 2004/0219967 | A1 * | 11/2004 | Giobbi et al. | 463/16 |
| 2005/0049026 | A1 * | 3/2005 | Angel | 463/16 |
| 2006/0148571 | A1 * | 7/2006 | Hossack et al. | 463/43 |
| 2007/0010309 | A1 * | 1/2007 | Giobbi et al. | 463/16 |
| 2007/0191090 | A1 * | 8/2007 | O'Halloran et al. | 463/20 |
| 2008/0064459 | A1 * | 3/2008 | Kelly | 463/7 |
| 2010/0151934 | A1 * | 6/2010 | Kniberg et al. | 463/24 |
| 2010/0331069 | A1 * | 12/2010 | Giobbi et al. | 463/16 |

FOREIGN PATENT DOCUMENTS

| | | | |
|---|---|---|---|
| EP | 0 840 264 | A1 | 5/1998 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| WO | WO03/083795 | A1 | 10/2003 |
| WO | WO2004/095383 | A1 | 11/2004 |

* cited by examiner

Fig. 6

| | PAY TABLE | | | 1BET | 2BET | MAX(3)BET |
|---|---|---|---|---|---|---|
| *1* | *DOUBLE* | *DOUBLE* | *DOUBLE* | *800* | *1600* | *2400* |
| *2* | *DOUBLE* | *DOUBLE* | *3BAR* | *240* | *480* | *720* |
| *3* | *DOUBLE* | *3BAR* | *3BAR* | *120* | *240* | *360* |
| *4* | *3BAR* | *3BAR* | *3BAR* | *60* | *120* | *180* |
| *5* | *DOUBLE* | *DOUBLE* | *2BAR* | *120* | *240* | *360* |
| *6* | *DOUBLE* | *2BAR* | *2BAR* | *60* | *120* | *180* |
| 7 | 2BAR | 2BAR | 2BAR | 30 | 60 | 90 |
| *8* | *DOUBLE* | *DOUBLE* | *1BAR* | *60* | *120* | *180* |
| 9 | DOUBLE | 1BAR | 1BAR | 30 | 60 | 90 |
| 10 | 1BAR | 1BAR | 1BAR | 15 | 30 | 45 |
| 11 | DOUBLE | ANY BAR | ANY BAR | 10 | 20 | 30 |
| 12 | ANY BAR | ANY BAR | ANY BAR | 5 | 10 | 15 |
| *13* | *DOUBLE* | *DOUBLE* | *CHERRY* | *80* | *160* | *240* |
| 14 | DOUBLE | CHERRY | CHERRY | 40 | 80 | 120 |
| 15 | CHERRY | CHERRY | CHERRY | 20 | 40 | 60 |
| 16 | DOUBLE | CHERRY | ANY | 10 | 20 | 30 |
| 17 | CHERRY | CHERRY | ANY | 5 | 10 | 15 |
| 18 | CHERRY | ANY | ANY | 2 | 4 | 6 |
| 19 | GIFT BONUS | | | 44.138 | 44.138 | 44.138 |

Fig. 30

| Code No. | Index | Number of steps (※) |
|---|---|---|
| 00 | 1 | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | 2 | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

※ The number of steps regarding index 1 as basis of reference

GAMING MACHINE WITH LOCKING FUNCTION AND INSURANCE FEATURE

CROSS-REFERENCE TO RELATED APPLICATIONS

This application claims benefit of priority based on U.S. Provisional Patent Application No. 60/984,591 filed on Nov. 1, 2007. The contents of this application are incorporated herein by reference in their entirety.

BACKGROUND OF THE INVENTION

1. Field of the Invention

The present invention relates to a gaming machine with a locking function and a control method thereof.

2. Discussion of the Background

Examples of a conventional slot machine are disclosed in: U.S. Pat. No. 5,820,459, U.S. Pat. No. 6,695,697, U.S. Ser. No. 2003/0069073-A1, EP 1192975-A, U.S. Pat. Nos. 6,254,483, 5,611,730, 5,639,088, 6,257,981, 6,234,896, 6,001,016, 6,273,820, 6,224,482, 4,669,731, 6,244,957, 5,910,048, 5,695,402, 6,003,013, 4,283,709, EP0631798-A, DE4137010-A1, GB 2326830-A, DE 3712841-A1, U.S. Pat. Nos. 4,964,638, 6,089,980, 5,280,909, 5,702,303, 6,270,409, 5,770,533, 5,836,817, 6,932,704, 6,932,707, 4,837,728, EP 1302914-A, U.S. Pat. Nos. 4,624,459, 5,564,700, WO 03/083795-A, DE 3242890-A1, EP 0840264-A, DE 10049444-A1, WO 04/095383-A, EP 1544811-A, U.S. Pat. No. 5,890,963, EP 1477947-A, and EP 1351180-A. In a facility where a slot machine or the like is installed, a variety of game media such as coins or cash are inserted into the slot machine to play a game. Each slot machine is configured to according to a winning state (game result) occurring along with development of games.

Among those conventional gaming machines, as disclosed in U.S. Pat. No. 5,910,048 for example, there has been a slot machine in which a profit is returned to the player when loss of the game media reaches a predetermined amount. Further, there also has been a slot machine in which a profit is returned to the player when the number of games reaches a specific number in a game where a unit game is repeatedly executed.

On a gaming machine in which some awards can be offered to the player for playing games over a long period of time such as a slot machine that returns the profit to the player when the number of games reaches the specific number, a case could happen where the player desires to interrupt the game once for the restroom, meals or the like, while keeping the history of games (e.g., the number of games) that the player has played until that time. However, it is not possible to distinguish an available slot machine from a reserved slot machine by external appearances of the conventional gaming machines; therefore, another player could play games on this gaming machine when the player has interrupted the game and left the slot machine.

Moreover, in the conventional gaming machines, there has been a problem where there is an extremely high possibility that another player plays games on this gaming machine when the player has interrupted the game and left the gaming machine for some reason when a favorable gaming state for the player is generated on the gaming machine, since it is not possible to distinguish an available gaming machine from a reserved gaming machine by the external appearances thereof.

It is an object of the present invention to provide a gaming machine and a control method thereof which are capable of preventing the gaming machine from being played by other players when the player interrupts the game and leaves the gaming machine, and letting the player play games at ease for a long period of time.

The contents of U.S. Pat. Nos. 5,820,459, 6,695,697, U.S. Ser. No. 2003/0069073-A1, EP 1192975-A, U.S. Pat. Nos. 6,254,483, 5,611,730, 5,639,088, 6,257,981, 6,234,896, 6,001,016, 6,273,820, 6,224,482, 4,669,731, 6,244,957, 5,910,048, 5,695,402, 6,003,013, 4,283,709, EP 0631798-A, DE 4137010-A1, GB 2326830-A, DE 3712841-A1, U.S. Pat. Nos. 4,964,638, 6,089,980, 5,280,909, 5,702,303, 6,270,409, 5,770,533, 5,836,817, 6,932,704, 6,932,707, 4,837,728, EP 1302914-A, U.S. Pat. Nos. 4,624,459, 5,564,700, WO 03/083795-A, DE 3242890-A1, EP 0840264-A, DE 10049444-A1, WO 04/095383-A, EP 1544811-A, U.S. Pat. No. 5,890,963, EP 1477947-A, and EP 1351180-A are incorporated herein by reference in their entirety.

SUMMARY OF THE INVENTION

The first aspect of the present invention provides a gaming machine comprising the following configuration.

Namely, the gaming machine comprises: a removable key provided so as to correspond to the gaming machine; and a controller. The controller is programmed to execute the processing of (A) determining whether or not the key has been removed, and (B) controlling the gaming machine so as to make a game executable when determining in the processing (A) that the key has not been removed, while controlling the gaming machine so as to make the game unexecutable when determining in the processing (A) that the key has been removed.

According to the above-mentioned gaming machine, the gaming machine has a removable key provided so as to correspond to the gaming machine, and a game is made executable when it is determined that the key has not been removed, while the game is made unexecutable when it is determined that the key has been removed. Accordingly, when a player leaves this gaming machine for the restroom or the like, it is possible for this player to prevent other players from playing games on this gaming machine by removing the key from the gaming machine. Particularly when a favorable gaming state for the player is generated on this gaming machine, there is a high possibility that other players play games on this gaming machine. However, according to the above-mentioned gaming machine, even in such a situation, it is possible for the player to surely prevent other players from playing games on this gaming machine while away from this gaming machine by removing the key from the gaming machine. Further, in the case that game media are credited beforehand on this gaming machine, it is also possible to prevent theft of the credit.

Preferably, the above-mentioned gaming machine further comprises the following configuration.

Namely, the controller is further programmed to execute the processing of: (C) executing the game, on condition that the game has been made executable in the processing (B); (D) measuring an elapsed time since last removal of the key; and (E) clearing a history of games executed in the processing (C), when the elapsed time reaches a first predetermined time without the key being returned.

According to the above-mentioned gaming machine, the game is executed on condition that the game has been made executable. Further, the history of games is cleared when the elapsed time since last removal of the key reaches the first predetermined time (e.g., 30 minutes). Accordingly, the player having removed the key and left the gaming machine must return to the gaming machine to return the key within the first predetermined time, in order that the history of games may not be cleared. As a result, it is possible to improve the operating efficiency of the gaming machine.

Moreover, the player having removed the key and left the gaming machine can start the game from the state before leaving the gaming machine without the history of games being cleared, so long as the player returns the key within the first predetermined time. As a result, a player who desires to play games for a long period of time while keeping the history of games can leave the gaming machine at ease for the restroom, a break or the like during the game.

Preferably, the above-mentioned gaming machine further comprises the following configuration.

Namely, the controller is further programmed to execute the processing of (F) accepting insertion of a predetermined number of game media, when the key is returned before the elapsed time reaches the first predetermined time after having reached a second predetermined time that is shorter than the first predetermined time, and clearing the history of games when a predetermined number of game media are not inserted.

While the player is away, securing the profit for the game provider side is difficult because games are not played.

However, according to the above-mentioned gaming machine, insertion of the predetermined number of game media is accepted when the key is returned before the elapsed time reaches the first predetermined time after having reached the second predetermined time (e.g., 15 minutes) that is shorter than the first predetermined time (e.g., 30 minutes); and the history of games is cleared when the predetermined number of game media are not inserted.

Accordingly, the player who has left the gaming machine for a longer period of time than the second predetermined time is required to insert the predetermined number of game media, as the condition of starting the game from the state before leaving the gaming machine; thereby the game provider side can secure its profit of the period during which the games are not played.

Furthermore, since the player can restart the game with the history of games before leaving the gaming machine kept even without inserting game media when the key is returned before the second predetermined time elapses; thus, it is possible to encourage the player to return to the gaming machine soon.

The first aspect of the present invention further provides a gaming machine comprising the following configuration.

Namely, A gaming machine comprises: a removable key provided so as to correspond to the gaming machine; a symbol display device capable of variably displaying a plurality of symbols; and a controller. The controller is programmed to execute the processing of (A) determining whether or not the key has been removed, (B) controlling the gaming machine so as to make a game executable when determining in the processing (A) that the key has not been removed, while controlling the gaming machine so as to make the game unexecutable when determining in the processing (A) that the key has been removed, (C) executing, on condition that the game has been made executable in the processing (B), a game in which the plurality of symbols are variably displayed and then stop-displayed by the symbol display device after game media have been BET in number equal to or less than a predetermined maximum number of BETs, and game media are paid out in number according to the stop-displayed symbols or a combination thereof, (D) counting the number of games, (E) paying out a predetermined number of game media when the number of games counted in the processing (D) has reached a specific number, (F) measuring an elapsed time since last removal of the key, and (G) clearing the number of games counted in the processing (D) when the elapsed time reaches a first predetermined time without the key being returned.

According to the above-mentioned gaming machine, the gaming machine has a removable key provided so as to correspond to the gaming machine, and a game is made executable when it is determined that the key has not been removed, while the game is made unexecutable when it is determined that the key has been removed. Accordingly, when a player leaves this gaming machine for the restroom or the like, it is possible for this player to prevent other players from playing games on this gaming machine by removing the key from the gaming machine. Particularly when a favorable gaming state for the player is generated on this gaming machine, there is a high possibility that other players play games on this gaming machine. However, according to the above-mentioned gaming machine, even in such a situation, it is possible for the player to surely prevent other players from playing games on this gaming machine while away from this gaming machine by removing the key from the gaming machine. Further, in the case that coins are credited beforehand on this gaming machine, it is also possible to prevent theft of the credit.

Further, according to the above-mentioned gaming machine, the number of games is counted and the predetermined number of game media are paid out when the number of games counted reaches the specific number. Meanwhile, the number of games counted is cleared when the elapsed time since last removal of the key reaches the first predetermined time (e.g., 30 minutes). Accordingly, the player having removed the key and left the gaming machine must return to the gaming machine to return the key within the first predetermined time, in order that the number of games may not be cleared. As a result, it is possible to improve the operating efficiency of the gaming machine.

Moreover, the player having removed the key and left the gaming machine can start the game from the state before leaving the gaming machine without the number of games being cleared, so long as the player returns the key within the first predetermined time. As a result, a player who desires to acquire game media to be paid out by the number of games reaching the specific number can leave the gaming machine at ease for the restroom, a break or the like during the game.

Preferably, the above-mentioned gaming machine further comprises the following configuration.

Namely, the controller is further programmed to execute the processing of (H) accepting insertion of a predetermined number of game media, when the key is returned before the elapsed time reaches the first predetermined time after having reached a second predetermined time that is shorter than the first predetermined time, and clearing the number of games when the predetermined number of game media are not inserted.

According to the above-mentioned gaming machine, insertion of the predetermined number of game media is accepted when the key is returned before the elapsed time reaches the first predetermined time after having reached the second predetermined time (e.g., 15 minutes) that is shorter than the first predetermined time (e.g., 30 minutes); and the number of games is cleared when the predetermined number of game media are not inserted.

Accordingly, the player who has left the gaming machine for a longer period of time than the second predetermined time is required to insert the predetermined number of game media, as the condition of starting the game from the state before leaving the gaming machine; thereby the game provider side can secure its profit of the period during which the games are not played.

Furthermore, since counting is restarted from the number of games counted before leaving the gaming machine even without inserting game media when the key is returned before the second predetermined time elapses; thus, it is possible to encourage the player to return to the gaming machine soon.

Preferably, the above-mentioned gaming machine further comprises the following configuration.

Namely, the gaming machine further comprises a data reading device capable of reading data from a removable storage medium, wherein the key includes an identification information storage medium storing identification information for identifying the gaming machine, and the processing (A) includes determining that the key has been removed when the identification information corresponding to the gaming machine is readable by the data reading device, and determining that the key has not been removed when the identification information corresponding to the gaming machine is unreadable by the data reading device.

According to the above-mentioned gaming machine, the key has the identification information storage medium storing the identification information for identifying the gaming machine; and it is determined that the key has been removed when the identification information corresponding to this gaming machine is unreadable by the data reading device, and it is determined that the key has not been removed when the identification information corresponding to this gaming machine is readable by the data reading device. More specifically, it is determined whether or not the key has been removed based on whether or not the identification information is readable, the identification information being stored in the identification information storage medium provided in the key. Among the players who have removed the key, there can be a player who changes his or her mind or the like and does not return to the gaming machine. However, since the identification information is used in the above-mentioned gaming machine, it is possible to issue a new key more easily than in the case where a physical key is used, even when the key is not returned.

A second aspect of the present invention provides a gaming machine comprising the following configurations.

Namely, the gaming machine comprises: a reading device capable of reading player data from a player information storage medium storing the player information for specifying a player; an input device with which interruption of a game or end of the game is to be inputted; and a controller. The controller is programmed to execute the processing of (A) reading the player information from the player information storage medium by using the reading device, (B) making the game executable when, in the game ended state, the player information has been read in the processing (A), (C) making the game unexecutable, on condition that interruption of the game or end of the game has been inputted from the input device, (D) determining, when the player information is read in the processing (A) after interruption of the game has been last inputted from the input device, whether or not this piece of player information is the same as a piece of player information having been last read before interruption of the game, and (E) making the game executable when determining that the two pieces of player information are the same, while keeping the game unexecutable when determining that the two pieces of player information are not the same.

According to the above-mentioned gaming machine, the gaming machine is provided with the reading device capable of reading the player information from the player information storage medium (e.g., a credit card or a house card) storing the player information for specifying the player. Further, the game is made executable when, in the game ended state, the player information has been read, and the game is made unexecutable on condition that interruption of the game or end of the game has been inputted. Furthermore, when the player information is read after interruption of the game has been last inputted, it is determined whether or not this piece of player information is the same as the piece of player information having been last read before interruption of the game; and while the game is made executable when the two pieces of player information are determined to be the same, the game is kept unexecutable when the two pieces of player information are not the same.

Accordingly, when a player leaves this gaming machine for the restroom or the like, it is possible for this player to prevent other players from playing games on this gaming machine by removing the player information storage medium (making the player information unreadable by the reading device) and inputting interruption of the game. Particularly when a favorable gaming state for the player is generated on this gaming machine, there is a high possibility that other players play games on this gaming machine. However, according to the above-mentioned gaming machine, even in such a situation, it is possible for the player to surely prevent other players from playing games on this gaming machine while away from this gaming machine by removing the player information storage medium and inputting interruption of the game. Further, in the case that game media are credited beforehand on this gaming machine, it is also possible to prevent theft of the credit.

Preferably, the above-mentioned gaming machine further comprises the following configurations.

Namely, the controller is further programmed to execute the processing of: (F) executing the game on condition that the game has been made executable in the processing (B); (G) measuring an elapsed time since last input of interruption of the game from the input device; and (H) clearing a history of games executed in the processing (F), when the elapsed time reaches a third predetermined time without the game being made executable in the processing (E) after interruption of the game has been last inputted from the input device.

According to the above-mentioned gaming machine, the game is executed on condition that the game has been made executable. Further, the history of games is cleared when the elapsed time since last removal of the key reaches the third predetermined time (e.g., 30 minutes). Accordingly, the player having inputted interruption of the game and left the gaming machine must return to the gaming machine to make the game executable (to make the player information readable by the reading device) within the third predetermined time, in order that the history of games may not be cleared. As a result, it is possible to improve the operating efficiency of the gaming machine.

Moreover, the player having inputted interruption of the game and left the gaming machine can start the game from the state before leaving the gaming machine without the history of games being cleared, so long as the player makes the game executable within the third predetermined time. As a result, a player who desires to play games for a long period of time while keeping the history of games can leave the gaming machine at ease for the restroom, a break or the like during the game.

Preferably, the gaming machine further comprises the following configurations.

Namely, the controller is further programmed to execute the processing of: (I) determining whether or not this piece of player information, which is read by the reading device before the elapsed time reaches the third predetermined time after having reached a fourth predetermined time that is shorter than the third predetermined time, is the same as a piece of player information having been last read before interruption of the game; and (J) accepting insertion of a predetermined number of game media when the two pieces of player information have been determined to be the same in the processing (I), and clearing the history of games when the predetermined number of game media are not inserted.

According to the above-mentioned gaming machine, insertion of the predetermined number of game media is accepted when the game is made executable before the elapsed time reaches the third predetermined time after having reached the fourth predetermined time (e.g., 15 minutes) that is shorter than the third predetermined time (e.g., 30 minutes); and the history of games is cleared when the predetermined number of game media are not inserted.

Accordingly, the player who has left the gaming machine for a longer period of time than the fourth predetermined time is required to insert the predetermined number of game media, as the condition of starting the game from the state before leaving the gaming machine; thereby the game provider side can secure its profit of the period during which the games are not played.

Furthermore, since the player can restart the game with the history of games before leaving the gaming machine kept even without inserting game media when the game is made executable before the second predetermined time elapses; thus, it is possible to encourage the player to return to the gaming machine soon.

Preferably, the above-mentioned gaming machine further comprises the following configurations.

Namely, the gaming machine further comprises a symbol display device capable of variably displaying a plurality of symbols, wherein the processing (F) includes executing, on condition that the game has been made executable in the processing (B), a game in which the plurality of symbols are variably displayed and then stop-displayed by the symbol display device after game media have been BET in number equal to or less than a predetermined maximum number of BETs, and game media are paid out in number according to the stop-displayed symbols or a combination thereof; the controller is further programmed to execute the processing of (K) counting the number of games, and (L) paying out a predetermined number of game media when the number of games counted in the processing (K) has reached a specific number; and the processing (H) includes clearing the number of games counted in the processing (K), when the elapsed time reaches the third predetermined time without the game being made executable in the processing (E) after interruption of the game has been last inputted from the input device.

According to the above-mentioned gaming machine, the number of games is counted and the predetermined number of game media are paid out when the number of games counted reaches the specific number. Meanwhile, the number of games counted is cleared when the elapsed time reaches the third predetermined time (e.g., 30 minutes). Accordingly, the player having inputted interruption of the game and left the gaming machine must return to the gaming machine to make the game executable within the third predetermined time, in order that the number of games may not be cleared. As a result, it is possible to improve the operating efficiency of the gaming machine.

Moreover, the player having inputted interruption of the game and left the gaming machine can start the game from the state before leaving the gaming machine without the number of games being cleared, so long as the player makes the game executable within the third predetermined time. As a result, a player who desires to acquire game media to be paid out by the number of games reaching the specific number can leave the gaming machine at ease for the restroom, a break or the like during the game.

Preferably, the gaming machine further comprises the following configurations.

Namely, the processing (J) includes accepting insertion of a predetermined number of game media when the two pieces of player information have been determined to be the same in the processing (I), and clearing the number of games when the predetermined number of game media are not inserted.

According to the above-mentioned gaming machine, insertion of the predetermined number of game media is accepted when the player information storage medium is returned before the elapsed time reaches the third predetermined time after having reached the fourth predetermined time (e.g., 15 minutes) that is shorter than the third predetermined time (e.g., 30 minutes); and the number of games is cleared when the predetermined number of game media are not inserted.

Accordingly, the player who has left the gaming machine for a longer period of time than the fourth predetermined time is required to insert the predetermined number of game media, as the condition of starting the game from the state before leaving the gaming machine; thereby the game provider side can secure its profit of the period during which the games are not played.

Furthermore, since counting is restarted from the number of games counted before leaving the gaming machine even without inserting game media when the player information storage medium is returned before the fourth predetermined time elapses; thus, it is possible to encourage the player to return to the gaming machine soon.

The first aspect of the present invention further provides a control method of a gaming machine comprising the following configurations.

Namely, the control method of a gaming machine comprises the steps of: (A) determining whether or not a removable key, which is provided so as to correspond to the gaming machine, is removed; and (B) making a game executable when determining in the step (A) that the key has not been removed, while making the game unexecutable when determining in the step (A) that the key has been removed.

According to the above-mentioned control method of the gaming machine, a game is made executable when it is determined that the key, being provided so as to correspond to the gaming machine, has not been removed, while the game is made unexecutable when it is determined that the key has been removed. Accordingly, when a player leaves this gaming machine for the restroom or the like, it is possible for this player to prevent other players from playing games on this gaming machine by removing the key from the gaming machine. Particularly when a favorable gaming state for the player is generated on this gaming machine, there is a high possibility that other players play games on this gaming machine. However, according to the above-mentioned control method of the gaming machine, even in such a situation, it is possible for the player to surely prevent other players from playing games on this gaming machine while away from this gaming machine by removing the key from the gaming machine. Further, in the case that game media are credited beforehand on this gaming machine, it is also possible to prevent theft of the credit.

The above-mentioned control method further includes the following configurations.

Namely, the control method comprises the steps of: (C) executing, on condition that the game has been made executable in the step (B), a game in which the plurality of symbols are variably displayed and then stop-displayed by the symbol display device after game media have been BET in number equal to or less than a predetermined maximum number of BETs, and game media are paid out in number according to the stop-displayed symbols or a combination thereof; (D) counting the number of games; and (E) paying out a predetermined number of game media when the number of games counted in the step (D) has reached a specific number; (F) measuring an elapsed time since last removal of the key; and (G) clearing the number of games counted in the step (D), when the elapsed time reaches a first predetermined time without the key being returned.

According to the above-mentioned control method of the gaming machine, the number of games is counted and the predetermined number of game media are paid out when the number of games counted reaches the specific number. Meanwhile, the number of games counted is cleared when the elapsed time since last removal of the key reaches the first predetermined time (e.g., 30 minutes). Accordingly, the player having removed the key and left the gaming machine must return to the gaming machine to return the key within the first predetermined time, in order that the number of games may not be cleared. As a result, it is possible to improve the operating efficiency of the gaming machine.

Moreover, the player having removed the key and left the gaming machine can start the game from the state before leaving the gaming machine without the number of games being cleared, so long as the player returns the key within the first predetermined time. As a result, a player who desires to acquire game media to be paid out by the number of games reaching the specific number can leave the gaming machine at ease for the restroom, a break or the like during the game.

BRIEF DESCRIPTIONS OF THE DRAWINGS

FIG. 6 is a view for explaining a payout table of the slot machine shown in FIG. 3.

FIG. 30 is a schematic view showing a correspondence table of the number of steps and code No.

DESCRIPTION OF THE EMBODIMENTS

The present invention includes a first aspect of the present invention and a second aspect of the present invention.

The first aspect of the present invention is a gaming machine comprising the following configurations. Namely, the gaming machine comprises: a removable key provided so as to correspond to the gaming machine; and a controller. The controller is programmed to execute the processing of (A) determining whether or not the key has been removed, and (B) controlling the gaming machine so as to make a game executable when determining in the processing (A) that the key has not been removed, while controlling the gaming machine so as to make the game unexecutable when determining in the processing (A) that the key has been removed.

The second aspect of the present invention is a gaming machine comprising the following configurations. Namely, the gaming machine comprises: a reading device capable of reading player data from a player information storage medium storing the player information for specifying a player; an input device with which interruption of a game or end of the game is to be inputted; and a controller. The controller is programmed to execute the processing of (A) reading the player information from the player information storage medium by using the reading device, (B) making the game executable when, in the game ended state, the player information has been read in the processing (A), (C) making the game unexecutable, on condition that interruption of the game or end of the game has been inputted from the input device, (D) determining, when the player information is read in the processing (A) after interruption of the game has been last inputted from the input device, whether or not this piece of player information is the same as a piece of player information having been last read before interruption of the game, and (E) making the game executable when determining that the two pieces of player information are the same, while keeping the game unexecutable when determining that the two pieces of player information are not the same.

Therefore, in the descriptions hereinafter, the present invention is simply referred to as "the present invention" in the case of describing the invention without distinguishing the first aspect of the present invention from the second aspect of the present invention; and the present invention is referred to as "the first aspect of the present invention" or "the second aspect of the present invention" in the case of describing the invention by distinguishing the two inventions.

First, a general description of a slot machine according to one embodiment of the first aspect of the present invention will be given.

Figure 1:
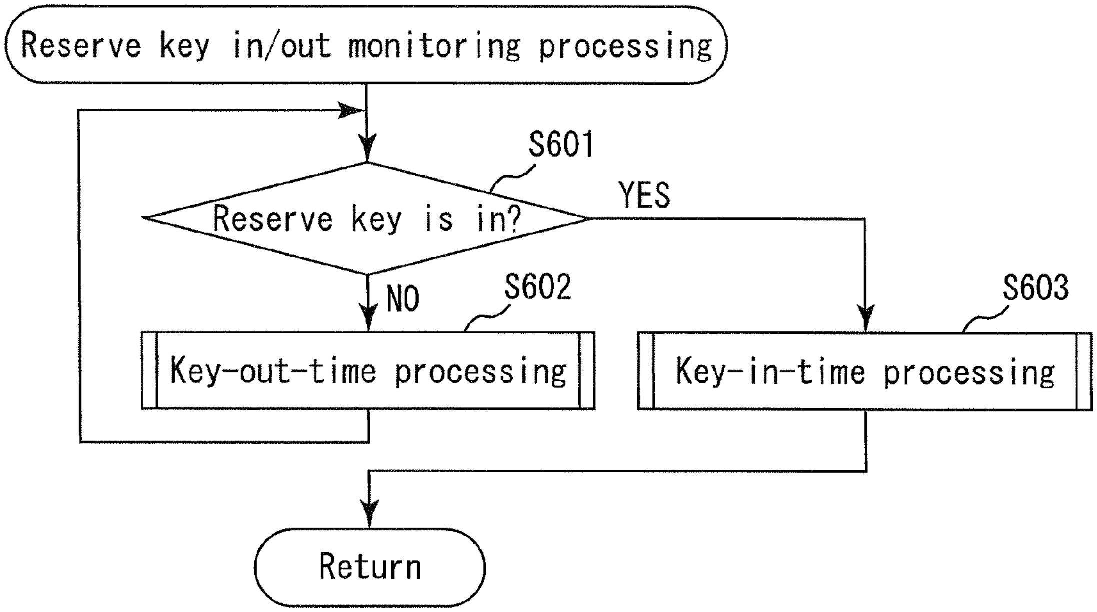
FIG. 1 is a flowchart showing a subroutine of reserve key in/out monitoring processing executed in a slot machine according to one embodiment of a first aspect of the present invention.

FIG. 1 is a flowchart showing a subroutine of reserve key in/out monitoring processing executed in a slot machine according to one embodiment of a first aspect of the present invention.

In a slot machine 10 according to one embodiment of the first aspect of the present invention, the number of games is counted every time the game is executed. Further, the predetermined number of coins (360 coins in the present embodiment) are paid out when the number of games reaches the specific number (1000 times in the present embodiment).

Figure 3:
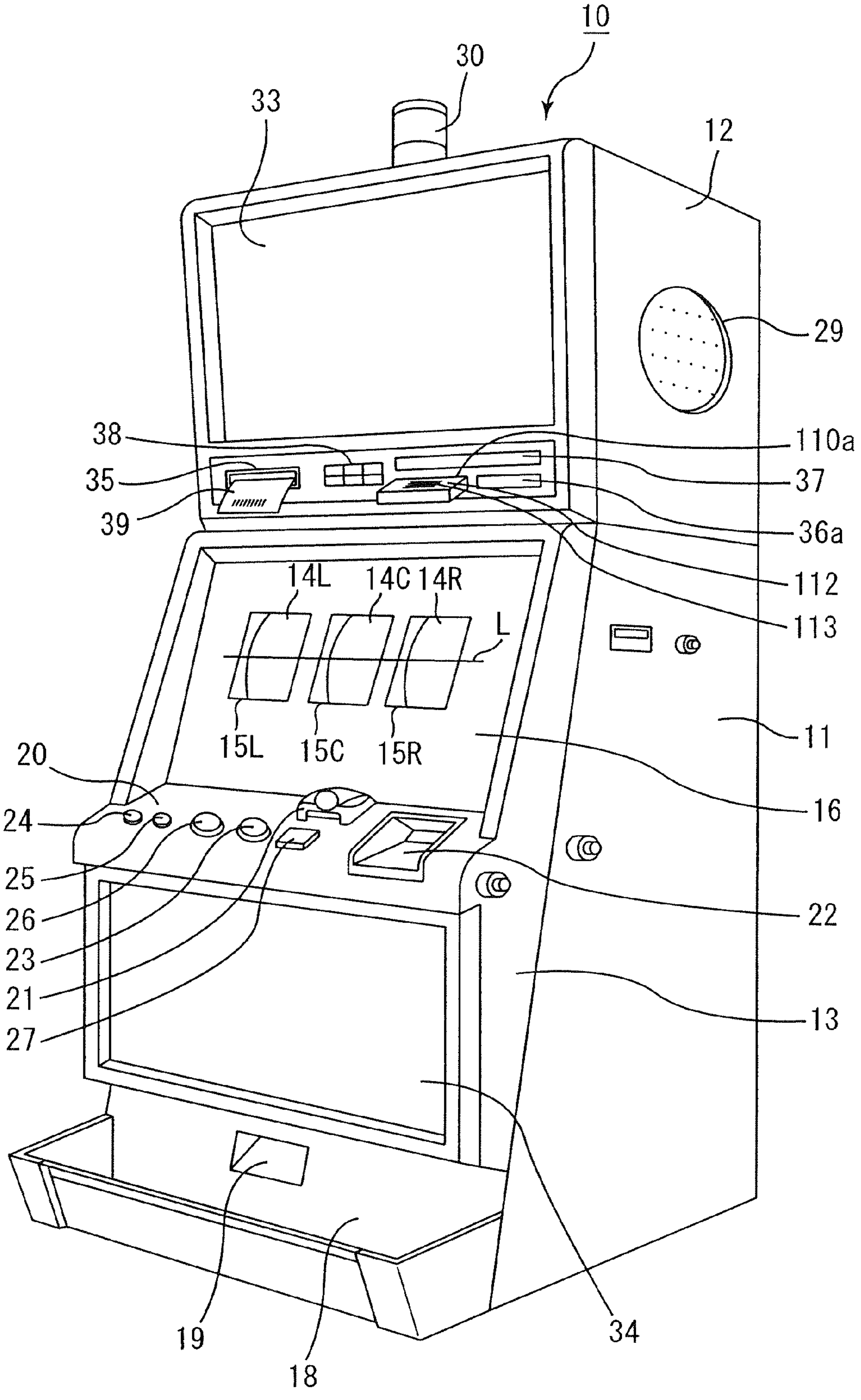
FIG. 3 is a perspective view schematically showing a slot machine according to one embodiment of the first aspect of the present invention.
Figure 4:
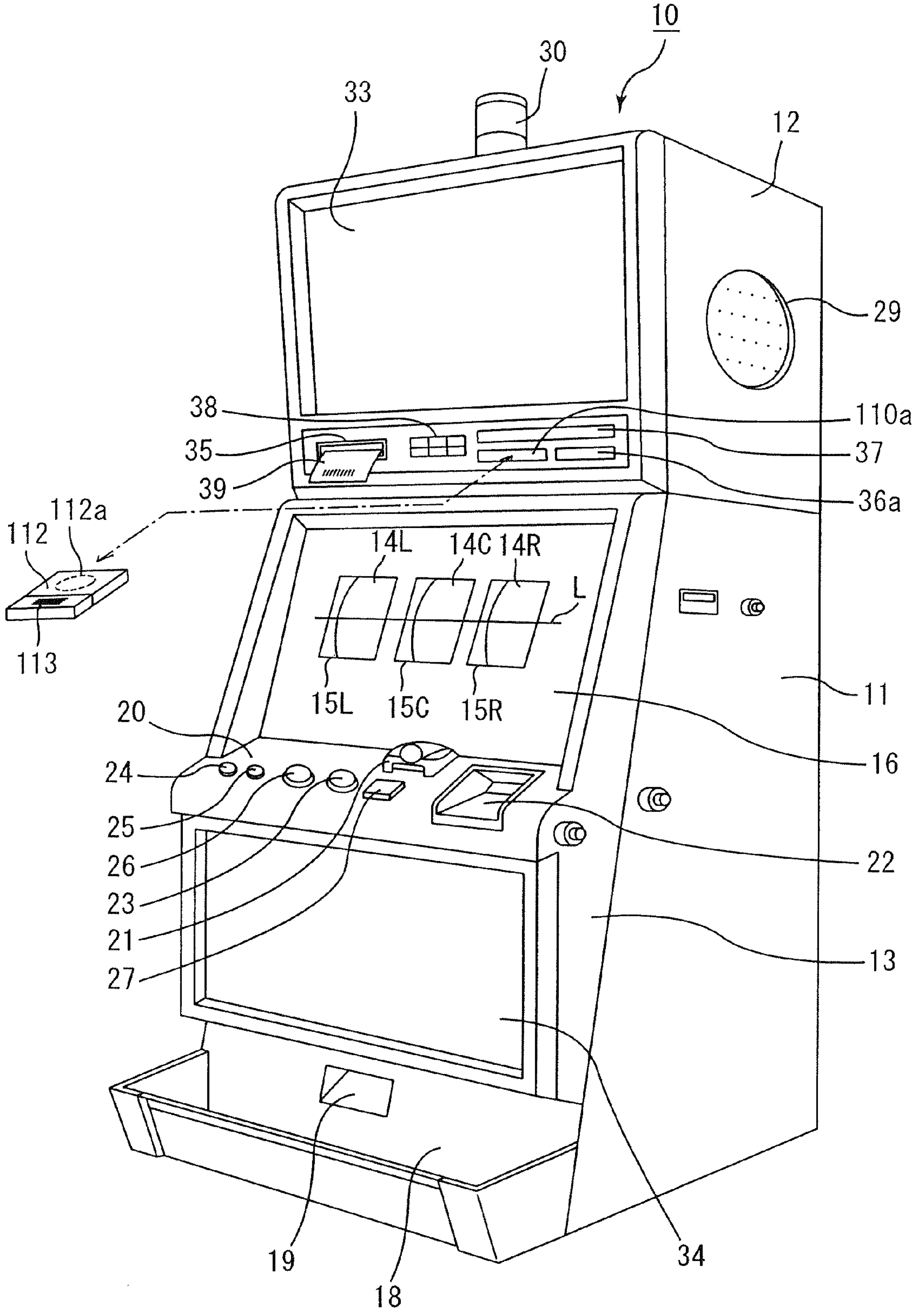
FIG. 4 is another perspective view schematically showing a slot machine according to one embodiment of the first aspect of the present invention.

The slot machine 10 includes a reserve key 112 (see FIG. 3 and FIG. 4). A main CPU 41 (see FIG. 5) provided in the slot machine 10 executes the reserve key in/out monitoring processing shown in FIG. 1 after the power has been turned on and activation processing (see step S101 in FIG. 17) has been executed.

In the reserve key in/out monitoring processing, the main CPU 41 first determines whether or not the reserve key 112 is inserted into a reserve key slot 110*a* (see FIG. 3 and FIG. 4) (step S601). The main CPU 41 determines whether or not the reserve key 112 is inserted by, for example, providing a light sensor inside the reserve key slot 110*a*.

When determining that the reserve key 112 is not inserted (step S601: NO), the main CPU 41 executes the key-out-time processing (step S602). In the key-out-time processing, the main CPU 41 clears the number of games counted if an elapsed-time T1 since removal of the reserve key 112 reaches a first predetermined time (30 minutes in the present embodiment) or more. Thereafter, the main CPU 41 returns the processing to step S601. It is to be noted that the key-out-time processing will be described in detail later by using FIG. 18.

When determining that the reserve key 112 is inserted (step S601: YES), the main CPU 41 executes the key-in-time processing (step S603). In the key-in-time processing, the main CPU 41 accepts insertion of a predetermined number of coins (5 coins in the present embodiment) if it is determined that the reserve key 112 is returned after having been removed for a second predetermined time (15 minutes in the present embodiment) or more. The main CPU 41 then terminates the present subroutine without clearing the number of games if the predetermined number of coins are inserted. Meanwhile, the main CPU 41 terminates the present subroutine after clearing the number of games if the predetermined number of coins are not inserted. It is to be noted that the key-in-time processing will be described in detail later by using FIG. 19.

As just described, according to the slot machine 10 relating to one embodiment of the first aspect of the present invention, step S602 is repeated and the game is not executed, when the reserve key 112 is not inserted into the reserve key slot 110*a*. Namely, the main CPU 41 controls the slot machine to make the game unexecutable. Accordingly, when a player leaves this slot machine 10 for the restroom or the like, it is possible for this player to prevent other players from playing games on this slot machine 10 by removing the reserve key 112. Particularly when the number of games approaches the specific number, there is a high possibility that other players play games on this slot machine 10. However, according to the slot machine 10 relating to one embodiment of the first aspect of the present invention, even in such a situation, it is possible for the player to surely prevent other players from playing games on this slot machine 10 while away therefrom.

Further, according to the slot machine 10 relating to one embodiment of the first aspect of the present invention, the number of games counted is cleared when the elapsed-time T1 since removal of the reserve key 112 reaches the first predetermined time. Accordingly, the player having removed the reserve key 112 and left the slot machine 10 must return to the slot machine 10 to return the reserve key 112 within the first predetermined time, in order that the number of games may not be cleared. As a result, it is possible to improve the operating efficiency of the slot machine 10.

Moreover, the player having removed the reserve key 112 and left the slot machine 10 can start the game from the state before leaving the slot machine 10 without the number of games being cleared, so long as the player returns the reserve key 112 within the first predetermined time. As a result, a player who desires to acquire coins to be paid out by the number of games reaching the specific number can leave the slot machine 10 at ease for the restroom, a break or the like during the game.

According to the slot machine 10 relating to one embodiment of the first aspect of the present invention, insertion of the predetermined number of coins is accepted when the reserve key 112 is returned before the elapsed time T1 reaches the first predetermined time after having reached the second predetermined time (15 minutes) that is shorter than the first predetermined time (30 minutes); and the number of games is cleared when the predetermined number of coins are not inserted.

Accordingly, the player who has left the slot machine 10 for a longer period of time than the second predetermined time is required to insert the predetermined number of coins, as the condition of starting the game from the state before leaving the slot machine 10; thereby the game provider side can secure its profit of the period during which the games are not played.

Furthermore, since counting is restarted from the number of games counted before leaving the slot machine 10 even without inserting game media when the reserve key 112 is returned before the second predetermined time elapses; thus, it is possible to encourage the player to return to the slot machine 10 soon.

Next, a general description of a slot machine according to one embodiment of the second aspect of the present invention will be given.

The slot machine according to one embodiment of the second aspect of the present invention has substantially the same configurations as those of the slot machine according to one embodiment of the first aspect of the present invention. Therefore, constituents corresponding to those of the slot machine according to one embodiment of the first aspect of the present invention are provided with the same signs as in the slot machine according to one embodiment of the first aspect of the present invention.

Figure 2:
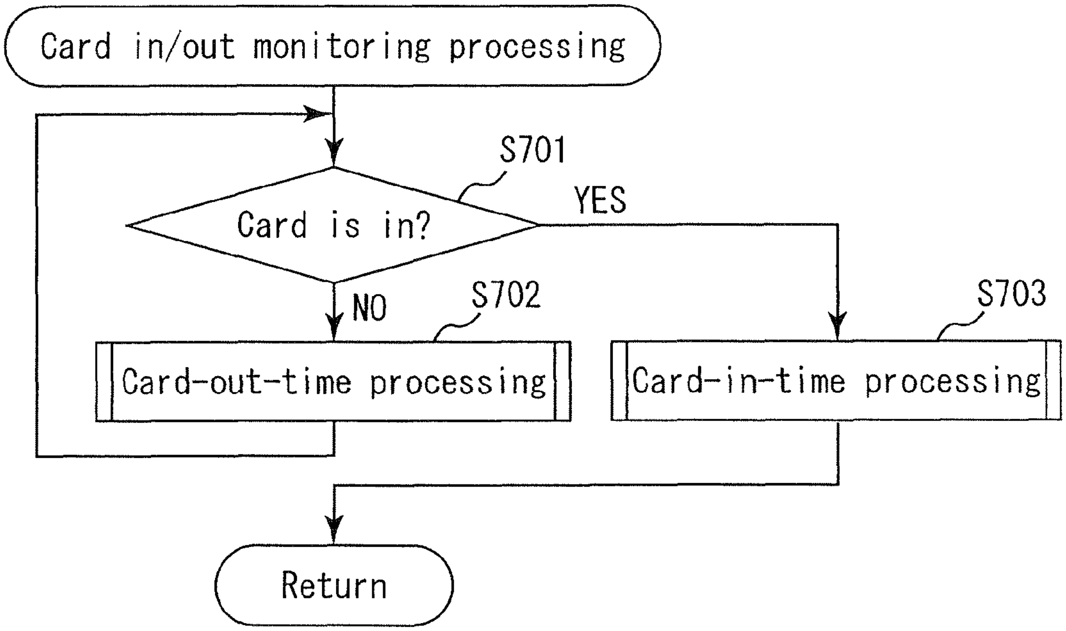
FIG. 2 is a flowchart showing a subroutine of card in/out monitoring processing executed in a slot machine according to one embodiment of a second aspect of the present invention.

FIG. 2 is a flowchart showing a subroutine of card in/out monitoring processing executed in a slot machine according to one embodiment of a second aspect of the present invention.

In the slot machine 10 according to one embodiment of the second aspect of the present invention, the number of games is counted every time a game is executed, as in the slot machine according to one embodiment of the first aspect of the present invention. Then, the predetermined number of coins are paid out when the number of games reaches the specific number.

A main CPU 41 (see FIG. 32) provided in the slot machine 10 executes the card in/out monitoring processing shown in FIG. 2, after the power has been turned on and activation processing has been executed.

In the card in/out monitoring processing, the main CPU 41 first determines whether or not a smart card is inserted into a card slot 36*a* (see FIG. 31) (step S701). The main CPU 41 determines whether or not the smart card is inserted by, for example, providing a light sensor inside the card slot 36*a*. The smart card is owned by the player, and for example, data for identifying the player (player ID) is stored therein.

When determining that the smart card is not inserted (step S701: NO), the main CPU 41 executes the card-out-time processing (step S702). In the card-out-time processing, the main CPU 41 starts measuring an elapsed-time T2 when interruption of the game is inputted at the time of removing the smart card; thereafter, the main CPU 41 clears the number of games counted when the elapsed-time T2 reaches a third predetermined time (30 minutes in the present embodiment) or more. Meanwhile, the main CPU 41 clears the player ID read at insertion of the smart card and stored in a RAM 43 (see FIG. 32), when interruption of the game is not inputted at the time of removing the smart card. The main CPU 41 then returns the processing to step S701 after clearing the number of games or after clearing the player ID stored in the RAM 43. It is to be noted that the card-out-time processing will be described in detail later by using FIG. 34.

When determining that the smart card is inserted (step S701: YES), the main CPU 41 executes card-in-time processing (step S703). In the card-in-time processing, the main CPU 41 reads the player ID from the smart card and stores it in the RAM 43, if the smart card is inserted in the game ended state. Thereafter, the present subroutine is terminated.

On the other hand, the main CPU 41 reads the player ID from the smart card and compares it with the player ID stored in the RAM 43, if the smart card is inserted in the game interrupted state. When the two player IDs are the same, the main CPU 41 determines whether or not the smart card has been removed for a fourth predetermined time (15 minutes in the present embodiment) or more. Then, when determining that the smart card is returned after having been removed for the fourth predetermined time (15 minutes in the present embodiment) or more, the main CPU 41 accepts insertion of the predetermined number of coins (5 coins in the present embodiment). Thereafter, the main CPU 41 terminates the present subroutine without clearing the number of games if the predetermined number of coins are inserted. The main CPU 41 terminates the present subroutine after clearing the number of games if the predetermined number of coins are not inserted. It is to be noted that the card-in-time processing will be described in detail later by using FIG. 35.

As just described, according to the slot machine 10 relating to one embodiment of the second aspect of the present invention, step S702 is repeated and the game is not executed, when the smart card is not inserted into the card slot 36*a*. Accordingly, when a player leaves this slot machine 10 for the restroom or the like, it is possible for this player to prevent other players from playing games on this slot machine 10 by removing the smart card and inputting interruption of the game. Particularly when the number of games counted approaches the specific number, there is a high possibility that other players play games on this slot machine 10. However, according to the slot machine 10 relating to one embodiment of the second aspect of the present invention, even in such a situation, it is possible for the player to surely prevent other players from playing games on this slot machine 10 when leaving this slot machine 10, by removing the smart card and inputting interruption of the game.

According to the above-mentioned slot machine 10, the number of games counted is cleared when the elapsed-time T2 reaches the third predetermined time (e.g., 30 minutes). Accordingly, the player having inputted interruption of the game and left the slot machine 10 must return to the slot machine 10 to make the game executable within the third predetermined time, in order that the number of games may not be cleared. As a result, it is possible to improve the operating efficiency of the slot machine 10.

Moreover, the player having inputted interruption of the game and left the slot machine 10 can start the game from the state before leaving the slot machine 10 without the number of games being cleared, so long as the player makes the game executable within the third predetermined time. As a result, a player who desires to acquire coins to be paid out by the number of games reaching the specific number can leave the slot machine 10 at ease for the restroom, a break or the like during the game.

Furthermore, according to the slot machine 10 relating to one embodiment of the second aspect of the present invention, insertion of the predetermined number of coins is accepted when the smart card is returned before the elapsed time T2 reaches the third predetermined time after having reached the fourth predetermined time (e.g., 15 minutes) that is shorter than the third predetermined time (e.g., 30 minutes); and the number of games is cleared when the predetermined number of game media are not inserted.

Accordingly, the player who has left the slot machine 10 for a longer period of time than the fourth predetermined time is required to insert the predetermined number of coins, as the condition of starting the game from the state before leaving the slot machine 10; thereby the game provider side can secure its profit of the period during which the games are not played.

Furthermore, since counting is restarted from the number of games counted before leaving the slot machine 10 even without inserting coins when the smart card is returned before the fourth predetermined time elapses; thus, it is possible to encourage the player to return to the slot machine 10 soon.

Hereinbefore, general descriptions of the slot machine according to one embodiment of the present invention (the first aspect of the present invention and the second aspect of the present invention) have been given.

Hereinafter, first, detailed descriptions of the slot machine according to one embodiment of the first aspect of the present invention will be given.

FIG. 3 and FIG. 4 are perspective views schematically showing a slot machine according to one embodiment of the first aspect of the present invention.

In a slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11. Inside the cabinet 11, three reels 14 (14L, 14C, 14R) are rotatably provided. On the peripheral face of each of the reels 14, a symbol sequence consisting of 22 figures (hereinafter also referred to as symbols) is drawn.

A lower image display panel 16 is provided at the front of the respective reels 14 on the main door 13. The lower image display panel 16 is provided with a transparent liquid crystal panel to which a variety of information concerning a game, an effect image and the like are displayed during the game.

The lower image display panel 16 corresponds to the image display device of the present invention.

On the lower image display panel 16, three display windows 15 (15L, 15C, 15R) are formed in which their back faces are visible, and three symbols drawn on the peripheral face of each of the reels 14 are respectively displayed via each of the display windows 15. On the lower image display panel 16, one winning line L horizontally crossing over the three display windows 15 is formed. The winning line L is for determining a combination of symbols. When the combination of symbols that are rearranged along the winning line L is a predetermined combination, coins are paid out in number according to the combination and the number of inserted coins (the number of BETs).

It is to be noted that, in the present invention, it may be possible to provide a configuration such that, for example, there are formed a plurality of winning lines L crossing horizontally or diagonally over the three display windows 15, and the winning lines L in number according to the number of inserted coins are verified, and when a combination of symbols rearranged along the verified winning line L is a predetermined combination, coins are paid out in number according to the combination.

Further, when a specific symbol (so-called scatter symbol) is rearranged to the display window, coins may be paid out in number according to the number of the scatter symbols regardless of the combination of symbols.

Moreover, although not shown, a touch panel 69 is provided at the front face of the lower image display panel 16. The player can operate the touch panel 69 to input a variety of commands.

Below the lower image display panel 16, there are provided a control panel 20 comprised of a plurality of buttons 23 to 27 with each of which a command according to game progress is inputted by the player, a coin receiving slot 21 through which a coin is accepted into the cabinet 11, and a bill validator 22.

The control panel 20 is provided with a spin button 23, a change button 24, a CASHOUT button 25, a 1-BET button 26 and a maximum BET button 27. The spin button 23 is used for inputting a command to start rotation of the reels 14. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (three coins in the present embodiment) out of credited coins. In addition, the maximum number of BETs may be configured so as to be set by the operator, staff or the like of the casino.

The bill validator 22 not only discriminates a regular bill from a false bill, but also accepts the regular bill into the cabinet 11. It is to be noted that the bill validator 22 maybe configured so as to be capable of reading a later-described ticket 39 with a barcode. At the lower front of the main door 13, namely below the control panel 20, there is provided a belly glass 34 on which a character or the like of the slot machine 10 is drawn.

An upper image display panel 33 is provided at the front face of the top box 12. The upper image display panel 33 is provided with a liquid crystal panel to display, for example, an effect image, an image representing introduction of contents of a game, and explanation of a rule of the game.

Also, a speaker 29 is provided on the top box 12. Under the upper image display panel 33, there are provided a ticket printer 35, a card reader 36 (see FIG. 5), a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card inserted into the card slot 36*a* and writes data into the smart card. The smart card is a card owned by the player, and for example, data for identifying the player (identification data) and data concerning a history of games played by the player are stored therein. Data corresponding to a coin, a bill or a credit may be stored in the smart card. Further, a magnetic stripe card may be adopted in place of the smart card. The data display 37 is comprised of a fluorescent display and the like, and displays, for example, data read by the card reader 36 or data inputted by the player via the key pad 38. The key pad 38 is used for inputting a command and data concerning issuing of a ticket, and the like.

The reserve key reader 110 (see FIG. 5) is provided below the data display 37 and on the left side of the card reader 36; and into the reserve key slot 110*a* of the reserve key reader 110, the reserve key 112 is inserted so that apart of the reserve key 112 protrudes from the surface of the slot machine 10 as shown in FIG. 3. On part of the surface of the reserve key 112, grooves 113 are provided in order to prevent the reserve key 112 from slipping when inserted into or removed from the reserve key slot 110*a*. It is to be noted that, the main CPU 41 determines that the reserve key 112 is inserted into the reserve key reader 110, when the reserve key 112 is inserted into the reserve key slot 110*a* as shown in FIG. 3.

FIG. 4 shows a state where the reserve key 112 is removed. AS shown in FIG. 4, an IC chip 112*a* is embedded in the reserve key 112. The IC chip 112*a* stores gaming machine identification data therein (hereinafter, referred to as "GMID data"). The GMID data is for identifying slot machines, and unique data is assigned to each slot machine 10. The GMID data corresponds to the identification information in the present invention.

Figure 5:
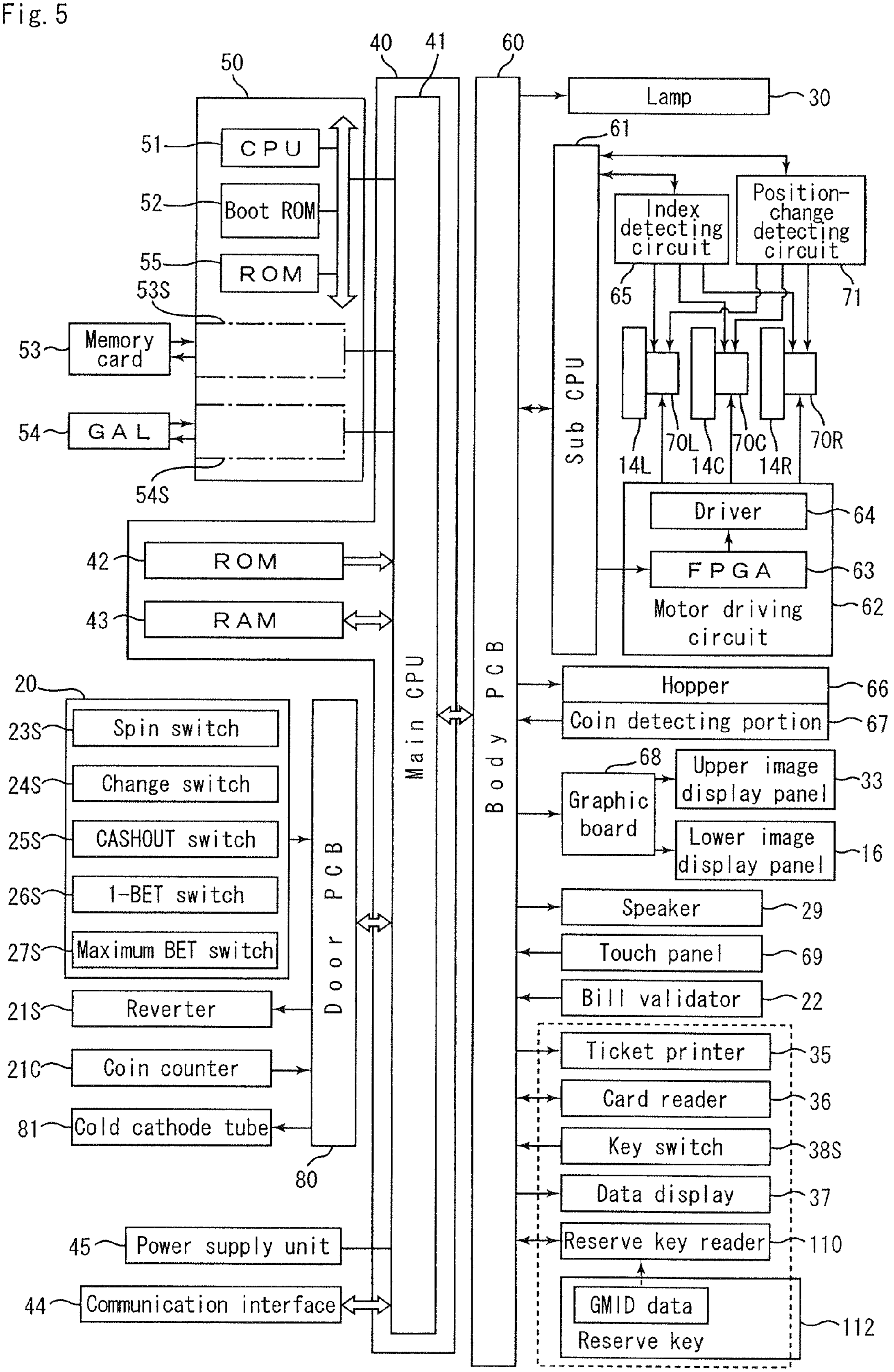
FIG. 5 is a block diagram showing the internal configuration of the slot machine shown in FIG. 3.

FIG. 5 is a block diagram showing the internal configuration of the slot machine shown in FIG. 3.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 is comprised of nonvolatile memory such as CompactFlash (registered trade mark), and stores a game program and a game system program. The game program includes a to-be-stopped symbol determination program. The to-be-stopped symbol determination program is a program for determining a symbol (code No. corresponding to the symbol) on each of the reels 14 to be rearranged along the winning line L. The to-be-stopped symbol determination program includes symbol weighing data respectively corresponding to a plurality of types of payout ratios (e.g. 80%, 84%, 88%). The symbol weighing data is data showing the corresponding relation between code No. of each symbol (see FIG. 30) and one or a plurality of random numbers belonging to a predetermined numerical range (0 to 255), for each of the three reels 14. The payout ratio is set based on payout ratio setting data which is outputted from a GAL 54, and a symbol to be rearranged is determined based on the symbol weighing data corresponding to the payout ratio.

Further, the card slot 53S is configured so as to allow the memory card 53 to be inserted thereinto or removed therefrom, and is connected to the mother board 40 by an IDE bus. Therefore, the memory card 53 can be removed from the card slot 53S, and then another game program and another game system program are written into the memory card 53, and the memory card 53 can be inserted into the card slot 53S, to change the type and contents of a game played on the slot machine 10. Further, the memory card 53 storing one game program and one game system program can be exchanged with the memory card 53 storing another game program and another game system program, to change the type and contents of a game played on the slot machine 10.

The game program includes a program according to development of the game. Further, the game program includes image data and sound data to be outputted during the game, image data and sound data for notifying that the mode has been shifted to the insurance mode, image data and sound data for notifying that the mode has shifted to the non-insurance mode, and the like.

GAL 54 is a type of a PLD having an OR fixed type array structure. The GAL 54 is provided with a plurality of input ports and output ports. When predetermined data is inputted into the input port, the GAL 54 outputs, from the output port, data corresponding to the inputted data. The data outputted from the output port is the above-mentioned payout ratio setting data.

Further, the IC socket 54S is configured such that the GAL 54 can be mounted thereonto and removed therefrom, and the IC socket 54S is connected to the mother board 40 through the PCI bus. Therefore, the GAL 54 can be removed from the IC socket 54S, and then a program to be stored into the GAL 54 is rewritten, and the GAL 54 is then mounted onto the IC socket 54S, to change the payout ratio setting data outputted from the GAL 54. Further, the GAL 54 can be exchanged with another GAL 54 to change the payout ratio setting data.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50. In the ROM 55, country identification information and an authentication program are stored. In the boot ROM 52, an auxiliary authentication program and a program (boot code) to be used by the CPU 51 for activating the auxiliary authentication program, and the like are stored.

The authentication program is a program (falsification check program) for authenticating a game program and a game system program. The authentication program is written along a procedure (authentication procedure) for checking and proving that a game program and a game system program to be subject to authentication loading processing have not been falsified, namely authenticating the game program and the game system program. The auxiliary authentication program is a program for authenticating the above-mentioned authentication program. The auxiliary authentication program is written along a procedure (authentication procedure) for proving that an authentication program to be subject to the authentication processing has not been falsified, namely authenticating the authentication program.

The mother board 40 is configured using a commercially available general-purpose mother board (a print wiring board on which fundamental components of a personal computer are mounted), and comprises a main CPU 41, a ROM (Read Only Memory) 42, a RAM (RandomAccessMemory) 43, and a communication interface 44. The main CPU 41, the ROM 42 and the RAM 43 mounted on the mother board 40 constitute the controller of the present invention.

The ROM 42 is comprised of a memory device such as flash memory, and stores a program such as a BIOS (Basic Input/Output System) executed by the main CPU 41 and permanent data. When the BIOS is executed by the main CPU 41, processing for initializing a predetermined peripheral device is conducted, concurrently with start of processing for loading the game program and the game system stored in the memory card 53 via the gaming board 50. It should be noted that, in the present invention, the ROM 42 may or may not be data rewritable one.

The RAM 43 stores data and a program to be used at the time of operation of the main CPU 41. Further, the RAM 43 is capable of storing an authentication program to be read via the gaming board 50, a game program and a game system program.

Further, the RAM 43 is provided with a storage area for an insurance mode flag. The insurance mode flag is a flag for indicating whether the mode is the insurance mode or the non-insurance mode. The storage area for the insurance mode flag is, for example, composed of a storage area of a predetermined number of bits, and the insurance mode flag is turned "ON" or "OFF" according to the stored contents of the storage area. The insurance mode flag being "ON" indicates the insurance mode, and the insurance mode flag being "OFF" indicates the non-insurance mode.

Further, the RAM 43 is provided with a storage area for data showing the number-of-games C.

Moreover, the RAM 43 stores data of the number of credits, the number of coin-ins and coin-outs in one game, and the like. The communication interface 44 serves to communicate with an external device such as a server of the casino, via the communication line 101.

Moreover, the mother board 40 is connected with a later-described body PCB (Printed Circuit Board) 60 and a door PCB 80 through respective USBs. Further, the mother board 40 is connected with a power supply unit 45. When power is supplied from the power supply unit 45 to the mother board 40, the main CPU 41 of the mother board 40 is activated concurrently with supply of power to the gaming board 50 via the PCI bus to activate the CPU 51.

The body PCB 60 and the door PCB 80 are connected with an equipment and a device that generate an input signal to be inputted into the main CPU 41 and an equipment and a device operations of which are controlled by a control signal outputted from the main CPU 41. The main CPU 41 executes the game program and the game system program stored in the RAM 43 based on the input signal inputted into the main CPU 41, and thereby executes the predetermined arithmetic processing, stores the result thereof into the RAM 43, or transmits a control signal to each equipment and device as processing for controlling each equipment and device.

The body PCB 60 is connected with a lamp 30, a sub CPU 61, a hopper 66, a coin detecting portion 67, a graphic board 68, a speaker 29, a touch panel 69, a bill validator 22, a ticket printer 35, a card reader 36, a key switch 38S and a data display 37. The lamp 30 is lighted in a predetermined pattern based on a control signal outputted from the main CPU 41.

The sub CPU 61 serves to control rotation and stop of the reels 14 (14L, 14C, 14R). A motor driving circuit 62 having an FPGA (Field Programmable Gate Array) 63 and a driver 64 is connected to the sub CPU 61. The FPGA 63 is an electronic circuit such as a programmable LSI, and functions as a control circuit of a stepping motor 70. The driver 64 functions as an amplification circuit of a pulse to be inputted into the stepping motors 70. The stepping motors 70 (70L, 70C, 70R) for rotating the respective reels 14 are connected to the motor driving circuit 62. The stepping motor 70 is a one-two phase excitation stepping motor.

In the present invention, the excitation method of the stepping motor is not particularly limited, and for example, a two phase excitation method, one phase excitation method or the like may be adopted. Further, a DC motor may be adopted in place of the stepping motor. In the case of adopting the DC motor, a deviation counter, a D/A converter, and a servo amplifier are sequentially connected to the sub CPU 61, and the DC motor is connected to the servo amplifier. Further, a rotational position of the DC motor is detected by a rotary encoder, and a current rotational position of the DC motor is supplied as data from the rotary encoder to the deviation counter.

Further, an index detecting circuit 65 and a position-change detecting circuit 71 are connected to the sub CPU 61. The index detecting circuit 65 detects the position (later-described index) of the reels 14 during rotation, and is further capable of detecting a loss of synchronism of the reels 14. It should be noted that the control of rotation and stoppage of reels 14 will be described later in detail using the figures.

The position-change detecting circuit 71 detects the change of the stop positions of the reel 14, after the stop of the rotation of the reels 14. For example, the position-change detecting circuit 71 detects the change of the stop positions of the reels 14, in a case such that a player forcibly changes the stop positions of reels 14 to create a combination of symbols in a winning state, even though the actual combination of symbols is not in the winning state, or in some other cases. The position-change detecting circuit 71 is configured, for example, to detect fins (not shown) mounted to the inner sides of the reels 14 at predetermined intervals so as to detect the change of the stop positions of the reels 14.

The hopper 66 is installed inside the cabinet 11, and pays out a predetermined number of coins based on the control signal outputted from the main CPU 41, from the coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The graphic board 68 controls image display to the upper image display panel 33 and the lower image display panel 16 based on the control signal outputted from the main CPU 41. The number of credits stored in the RAM 43 is displayed to the number-of-credits display portion 31 of the lower image display panel 16. Further, the number of payouts of coins is displayed to the number-of-payouts display portion 32 of the lower image display panel 16.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35, based on the control signal outputted from the main CPU 41, prints on a ticket a barcode formed by encoding data such as the number of credits stored in the RAM 43, a date, and an identification number of the slot machine 10, and outputs the ticket as the ticket 39 with a barcode. The ticket printer 35 corresponds to the ticket printer of the present invention. The card reader 36 reads data from the smart card and transmits the read data to the main CPU 41, and writes data onto the smart card based on the control signal from the main CPU 41. The key switch 38S is provided on the key pad 38, and outputs a predetermined input signal to the main CPU 41 when the key pad 38 is operated by the player. The data display 37 displays data read by the card reader 36 and data inputted by the player via the keypad 38 based on the control signal outputted from the main CPU 41.

The door PCB 80 is connected with a control panel 20, a reverter 21S, a coin counter 21C, and a cold cathode tube 81. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, and the maximum BET switch 27S corresponding to the maximum BET button 27. The respective switches 23S to 27S output input signals to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and is lit up based on the control signal outputted from the main CPU 41.

The slot machine 10 according to the present embodiment further includes the following configuration.

The ROM 42 further stores the GMID data of this slot machine 10. The reserve key reader 110 is connected to the body PCB 60. The reserve key reader 110 is capable of reading the GMID data from the IC chip 112*a* embedded in the reserve key 112, when the reserve key 112 is inserted into the reserve key slot 110*a* (see FIG. 3). The reserve key reader 110 is a contactless IC chip reader capable, with a RFID (Radio Frequency Identification) system, of reading data stored in the IC chip and writing data into the IC chip. The RFID system conducts a short-range communication by using an induction field or electrical waves, to read data stored in semiconductor memory and write data into the semiconductor memory without a contact to the semiconductor memory. It is to be noted that this technology is conventionally known to those skilled in the art and described in, for example, JP-A H8-21875; therefore, descriptions will be omitted here.

The main CPU 41 determines in every game whether the piece of GMID data read from the IC chip 112*a* is identical to the piece of GMID data of this slot machine 10 stored in the ROM 43. Then, the main CPU 41 determines that the reserve key 112 is inserted in the case that the two pieces of GMID data are identical to each other, and the main CPU 41 determines that the reserve key 112 is not inserted in the case that the two pieces of GMID data are not identical to each other. If the main CPU 41 determines that the reserve key 112 is not inserted, the main CPU 41 executes the key-out-time processing (see FIG. 18) and then again executes the processing for determining whether or not the reserve key 112 is inserted. On the other hand, if the main CPU 41 determines that the reserve key 112 is inserted, the main CPU 41 executes the key-in-time processing (see FIG. 19) and then executes the game.

The slot machine 10 corresponds to the gaming machine in the present invention.

The reserve key 112 corresponds to the removable key provided so as to correspond to the gaming machine in the present invention.

The main CPU 41, the ROM 42, and the RAM 43 that are mounted on the mother board 40 constitute the controller in the present invention.

The reels 14 correspond to the symbol display device in the present invention.

FIG. 6 is a view for explaining a payout table in the present embodiment.

"DOUBLE", "3BAR", "2BAR", "1BAR", and "CHERRY" in the payout table represent types of symbols drawn on the reels 14. It is to be noted that, other than the above-mentioned symbols, a bonus trigger, which is a symbol corresponding to "GIFT BONUS", and other symbols are also drawn on the reels 14. In the payout table, "ANY BAR" represents the "3BAR", "2BAR" or "1BAR", and "ANY" represents an arbitrary symbol.

Combinations shown in the payout table represent winning combinations, and the number of coin-outs is set for each of the winning combinations, according to the numbers of BETs.

When a combination of symbols on each of the reels 14 which are rearranged is the combination of "GIFT BONUS" bonus triggers, a predetermined number of coins is paid out as a jackpot. It is to be noted that a numeric value corresponding to "GIFT BONUS" in the payout table indicates an expectation value of the number of coin-outs, and is constant regardless of the number of BETs. Therefore, a setting is made such that the probability for establishing "GIFT BONUS" is high and the number of coin-outs is small in the case of 1BET whereas the probability for establishing "GIFT BONUS" is low and the number of coin-outs is large in the case of the MAXBET. It should be noted that this probability setting is made by using symbol weighing data.

Further, four types of jackpots "GRAND", "MAJOR", "MINOR" and "MINI" are provided in decreasing order of the number of coin-outs. The larger the number of coin-outs, the lower the jackpot occurrence ratio is set, and which jackpot is to be established is determined randomly using a random number. It should be noted that the expectation value of the number of coin-outs according to each jackpot is constant.

Here, each of the jackpots is set to payout 180 or more coins.

When a game is started by pressing of the spin button 23 after pressing of a 1-BET button 26 or a maximum BET button 27, the sequence of symbols drawn on each of the reels 14 is scroll-displayed downwardly in the display windows 15 with rotation of the reels 14, and after the lapse of a predetermined period of time, the sequence of symbols drawn on each of the reels 14 is rearranged in the display windows 15 with the stop of rotation of the reels 14. Further, a variety of winning combinations are previously set based on the respective combinations of symbols, and when the combination of symbols corresponding to the winning combination stops along the winning line L, the number of coin-outs according to the winning combination is added to credits owned by the player. When the combination of "GIFT BONUS" bonus triggers is established, a predetermined number of coin-outs is added to the credits owned by the player.

It should be noted that, in the present embodiment, there is described the case of paying out coins according to the jackpot when the combination of bonus triggers is established. However, the gaming state generated in establishment of the combination of bonus triggers is not particularly limited in the present invention. Examples of the gaming state may include a free game, a second game, and a mystery bonus. Further, when the combination of bonus triggers is established, the ticket 39 with a barcode may be issued with predetermined information printed thereon.

Combinations of symbols in italic in the payout table are combinations of which the number of coin-outs to be conducted is equal to or more than 180 when established in a game played with a MAXBET.

In the game played with a MAXBET in the insurance mode, when any one of those combinations of symbols is established, the mode is shifted from the insurance mode to the non-insurance mode.

Here, insurance in the slot machine 10 is described.

As for the insurance, the slot machine 10 has two modes: the insurance mode "RESCUE PAY ON"; and the non-insurance mode "RESCUE PAY OFF".

The non-insurance mode is set immediately after the power is turned on in the slot machine 10, and the mode is then shifted to the insurance mode by inserting a predetermined number of game media.

In the insurance mode, the number of games played after shifting to the insurance mode is counted.

When the number of games counted in the insurance mode reaches 1000, 360 coins are paid out (RESCUE PAY).

However, in the game played with a MAXBET in the insurance mode, when there is established a combination of which the number of coin-outs is equal to or more than 180, the number of games counted is cleared and the mode is shifted from the insurance mode to the non-insurance mode, as described above.

Next, the flow [P01] to [P20] of a game played on the slot machine 10 is described by using FIGS. 7 to 16.

FIGS. 7 to 16 are views showing images displayed to the upper image display panel 33 and the lower image display panel 16 provided in the slot machine 10.

In the figures, a numeral 15 (15L, 15C, 15R) denotes a display window. A numeral 31 denotes a number-of-credits display portion. A numeral 32 denotes a number-of-payouts display portion. A symbol L denotes a winning line.

[P01]

Figure 7A:
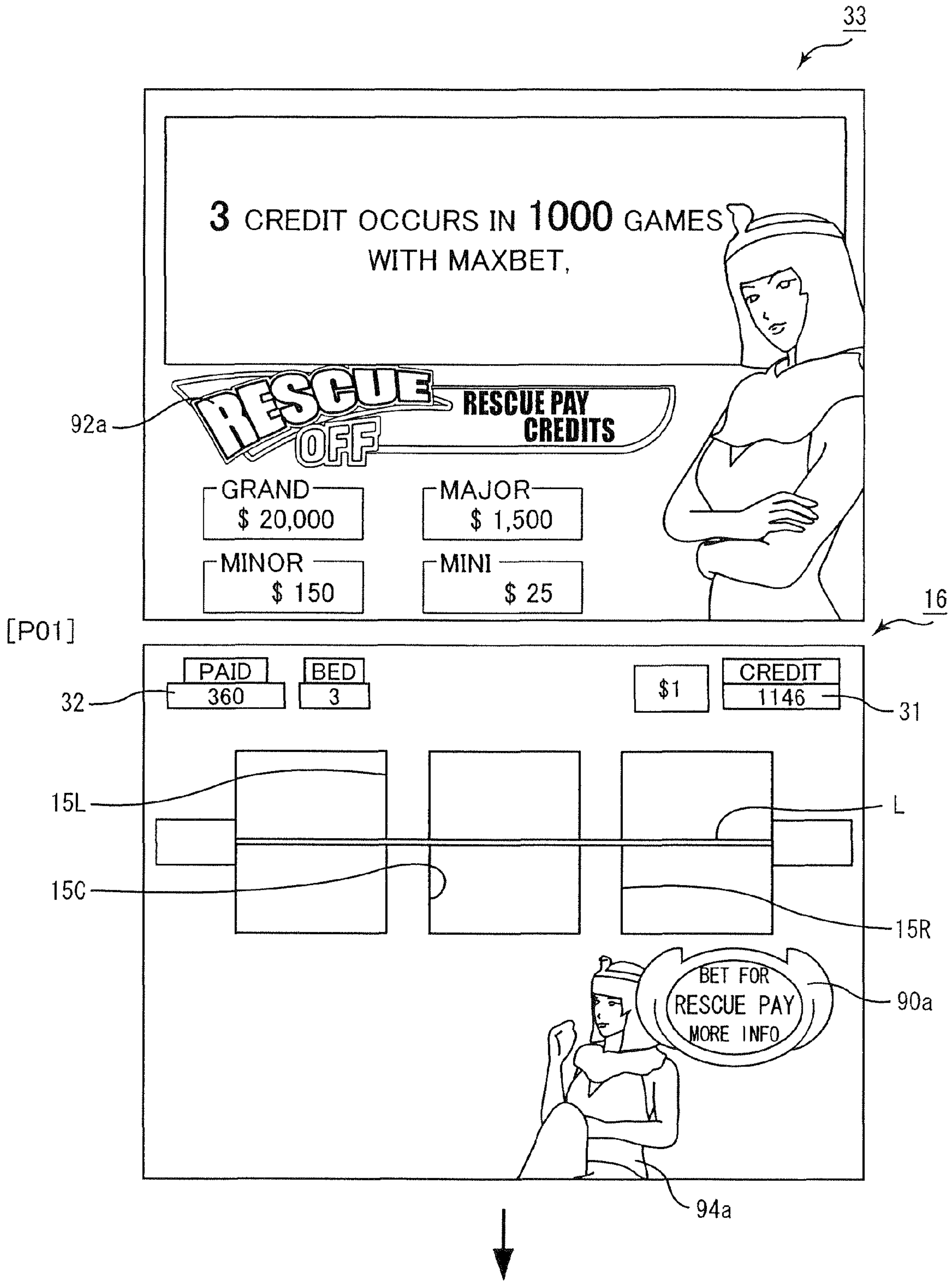
FIG. 7 is a view showing exemplary images displayed to the slot machine shown in FIG. 3.
Figure 7B:
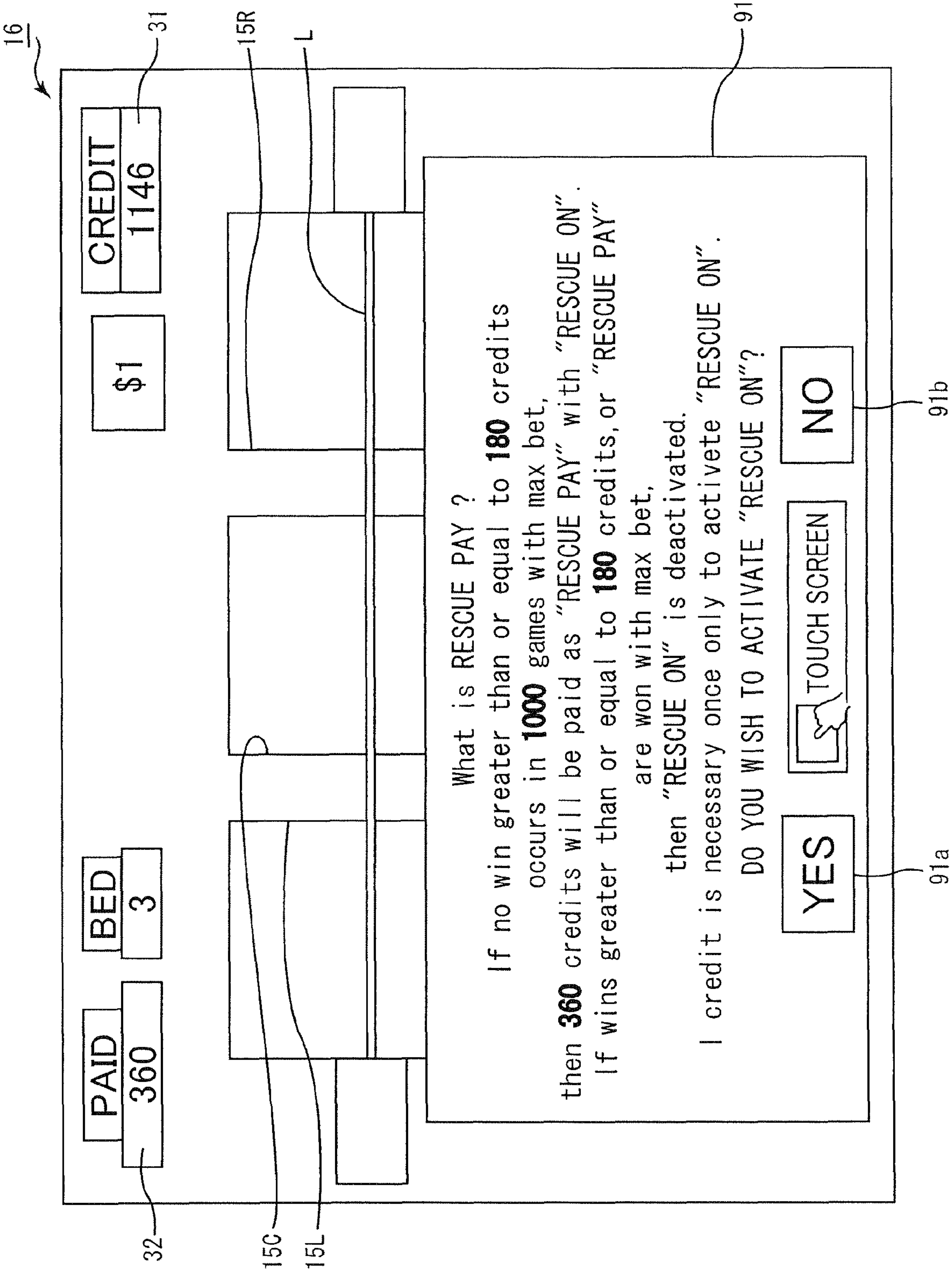

In the non-insurance mode, as shown in FIG. 7, an image 92*a* showing "RESCUE OFF" is displayed to the upper image display panel 33. The image 92*a* is an image showing that the current gaming state is the non-insurance mode.

Further, a normal effect image 94*a* is displayed to the lower image display panel 16.

Moreover, a button type image 90*a* showing "BET FOR RESCUE PAY MORE INFO" is displayed to the lower right portion of the lower image display panel 16. The image 90*a* is an image to request an input of a command to output information concerning the insurance mode. The player can input the command to output information concerning the insurance mode by touching a predetermined place of the touch panel 69 corresponding to the display area of the button type image 90*a*.

[P02]

When the above-mentioned command is inputted, an image 91 showing information concerning the insurance mode is displayed to the lower image display panel 16.

The image 91 includes information concerning the insurance mode as follows:

(I) the number of games to reach for paying out a predetermined number of coins, namely, a specific number (1000);

(II) the number (360) of coin-outs when the number of games reaches the specific number;

(III) clearing the number of games when a game with the MAXBET placed thereon and the number of coin-outs being equal to or more than 180 is played before the number of games reaches the specific number, namely, a number-of-games clearing condition;

(IV) shifting the mode from the insurance mode to the non-insurance mode when the game with the MAXBET placed thereon and the number of coin-outs being equal to or more than 180 is played before the number of games reaches the specific number, namely, an insurance canceling condition;

(V) counting the number of games with the MAXBET placed thereon, namely games to be counted; and (VI) the number (1) of credits necessary for shifting the mode from the non-insurance mode to the insurance mode.

Further, the image 91 includes information to make a request for an option as to whether or not to shift the mode from the non-insurance mode to the insurance mode, a button type image "YES" 91*a*, and a button type image "NO" 91*b*.

When a predetermined area of the touch panel 69 corresponding to the button type image "NO" 91*b* is touched by the player, an image shown in [P01] is displayed to the lower image display panel 16. On the other hand, when a predetermined area of the touch panel 69 corresponding to the button type image "YES" 91*a* is touched by the player, the mode is shifted from the non-insurance mode to the insurance mode.

[P03]

Figure 8A:
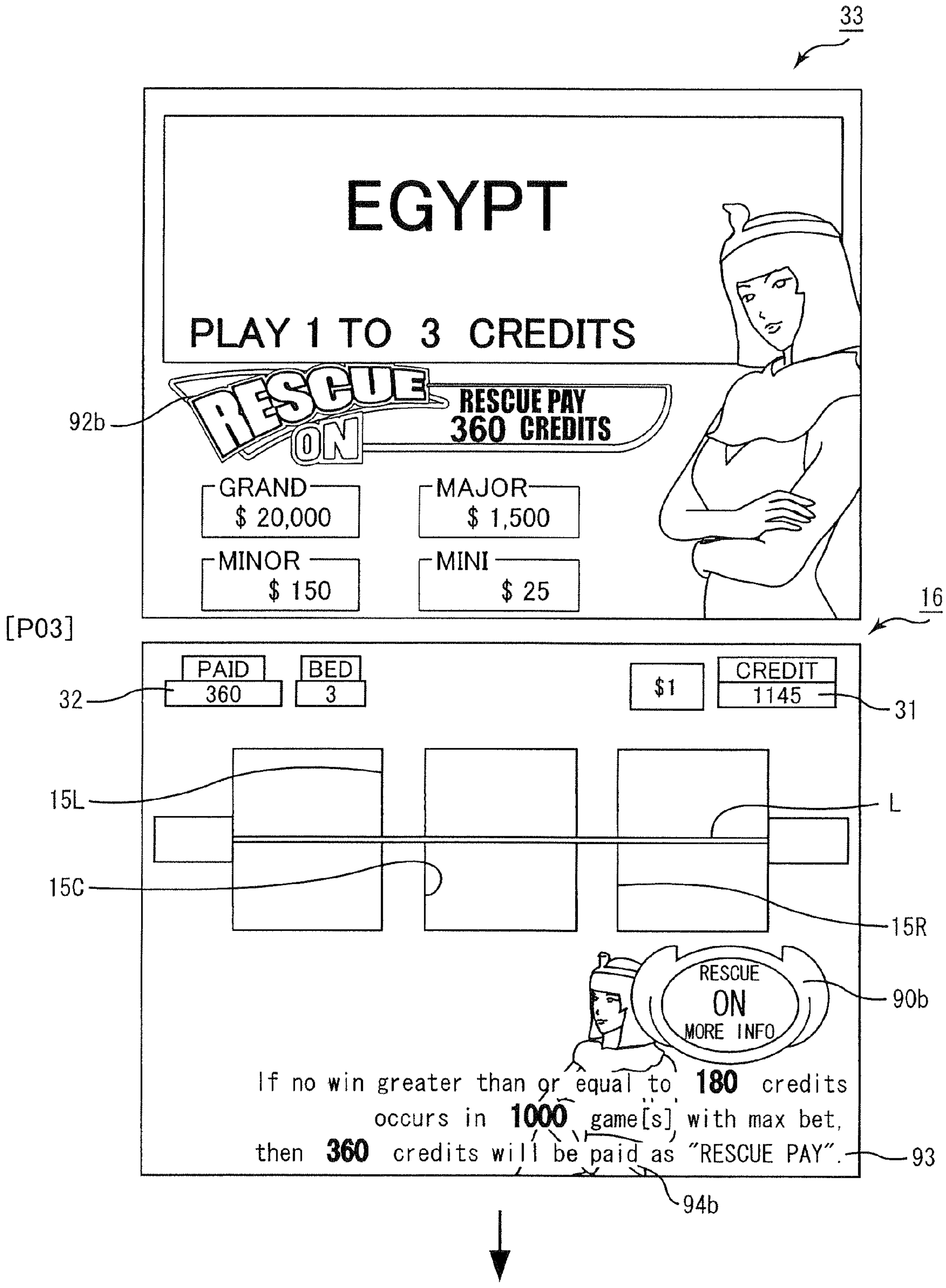
FIG. 8 is another view showing exemplary images displayed to the slot machine shown in FIG. 3.
Figure 8B:
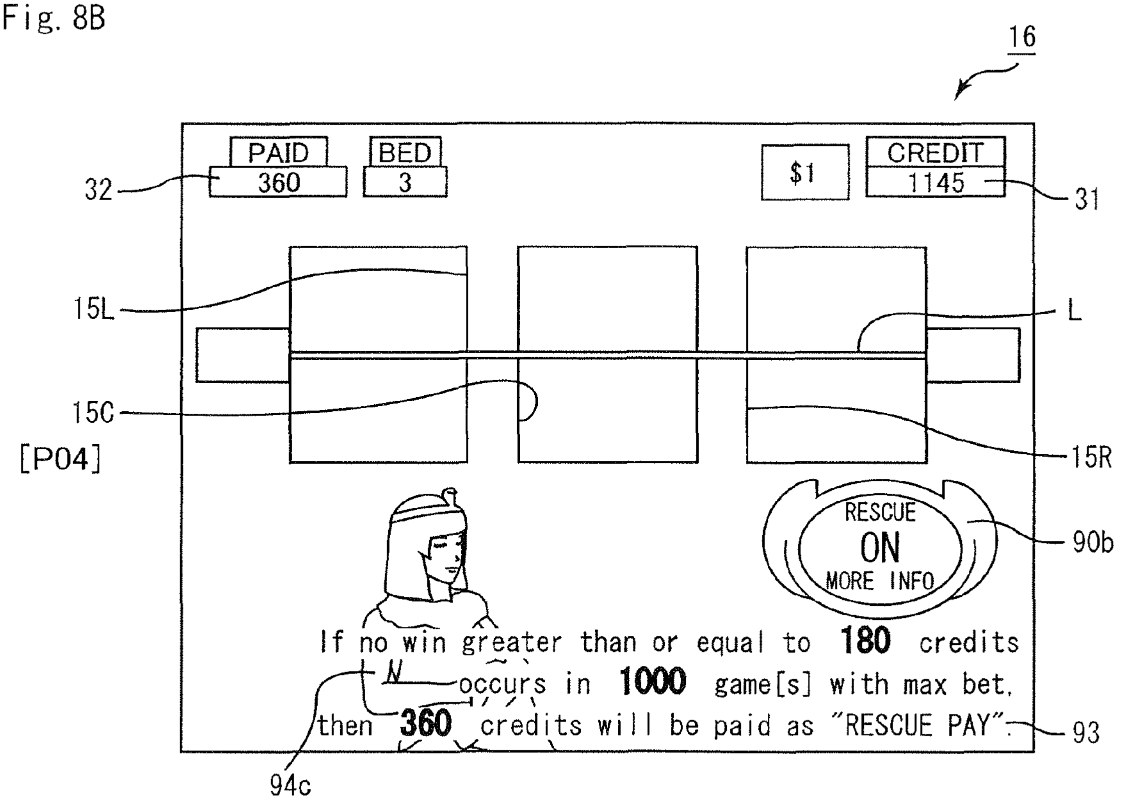
Figure 8B:
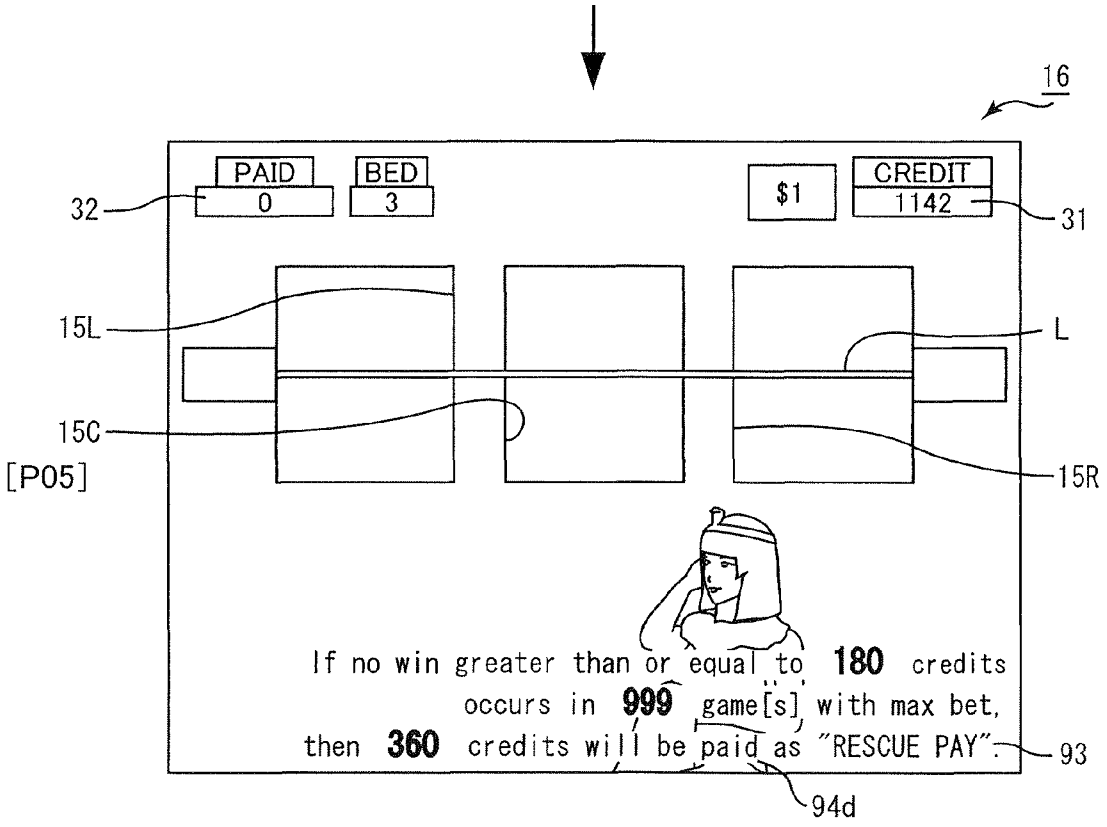

When the mode is shifted to the insurance mode, as shown in FIG. 8, an image 92*b* showing "RESCUE ON" is displayed to the upper image display panel 33. The image 92*b* is an image showing that the current gaming state is the insurance mode.

Further, a normal effect image 94*b* is displayed to the lower image display panel 16. While the normal effect image 94*b* in the insurance mode differs from a normal effect image 94*a* in the non-insurance mode, these are selected randomly by using random numbers, not based on whether the mode is the insurance mode or the non-insurance mode.

Further, a button type image 90*b* showing "RESCUE ON MORE INFORMATION" is displayed to the lower right portion of the lower image display panel 16. The button type image 90*b* is an image for showing that the current gaming state is the insurance mode and also for inputting a command to output information concerning the insurance mode.

When a predetermined place of the touch panel 69 corresponding to the display area of the button type image 90*b* is touched by the player, an image shown in [P02] is displayed to the lower image display panel 16.

Further, an image 93 is displayed below the button type image 90*b*, which shows that 360 coins are to be paid out when the number of games with the MAXBET placed thereon and the number of coin-outs being 2 or less (games to be counted) reaches a specific number.

[P04]

When the game is started in the insurance mode, in a first game in the insurance mode, a normal effect image 94*c* is displayed to the lower image display panel 16, and the button type image 90*b* and the image 93 are continuously displayed. The image 93 shows that 360 coins are to be paid out when the games to be counted are played 1000 times from now on.

[P05]

In a second game in the insurance mode, a normal effect image 94*d* is displayed and the image 93 is continuously displayed. The image 93 shows that 360 coins are to be paid out when the games to be counted are played 999 times from now on.

As thus described, in the slot machine 10, the image 93 is displayed to the lower image display panel 16, the image 93 showing the number of games to be played from the time point of starting the game in the insurance mode until the number of games to be counted reaches a specific number. Subsequently, the number of games left to be played is counted down on the image 93 so long as the above-mentioned number-of-games clearing condition or insurance canceling condition is not established. It is to be noted that as thus described, the normal effect image 94 is displayed in the insurance mode until the number of games reaches 990 (notice set value).

[P06]

Figure 9A:
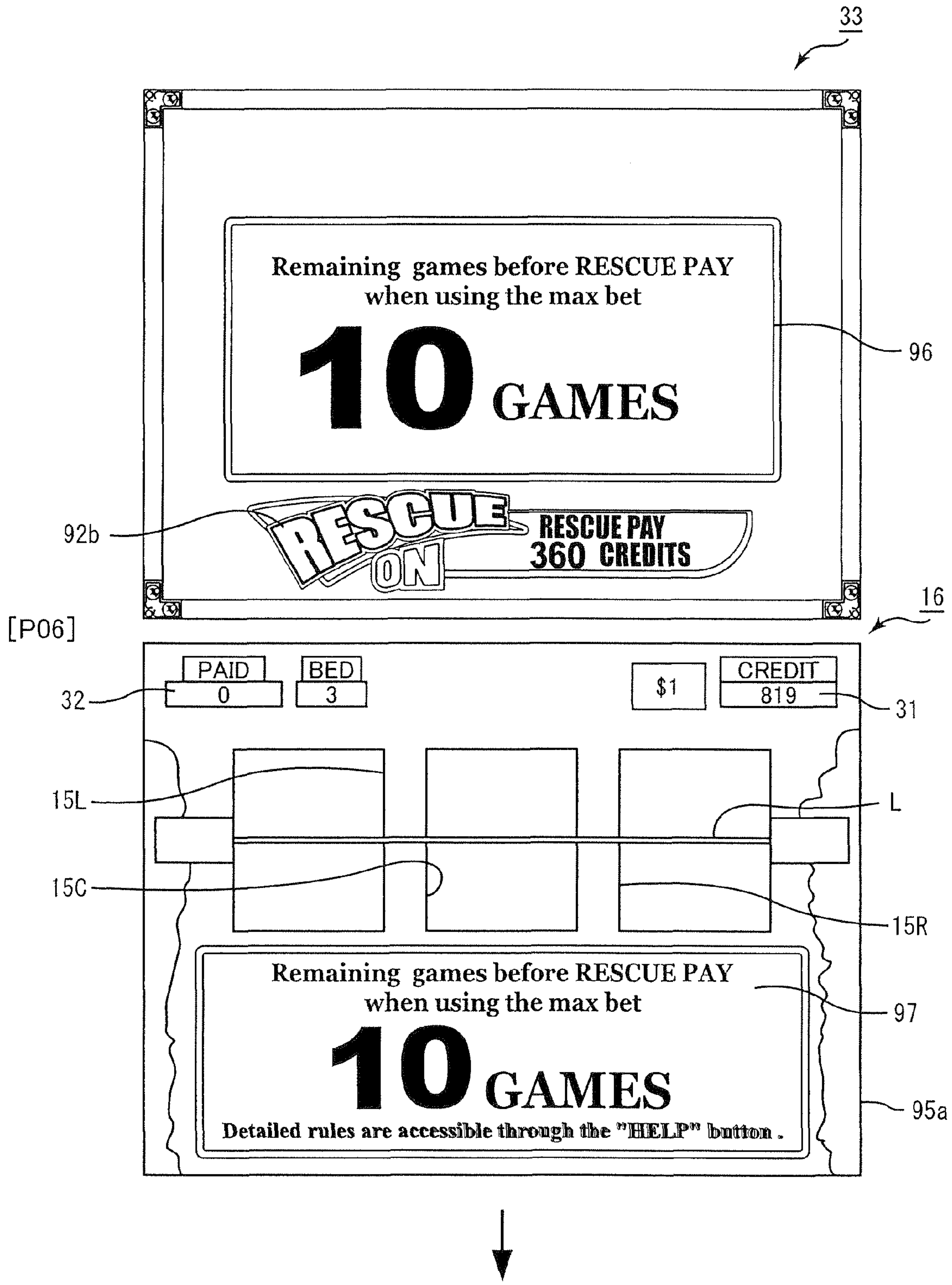
FIG. 9 is another view showing exemplary images displayed to the slot machine shown in FIG. 3.
Figure 9B:
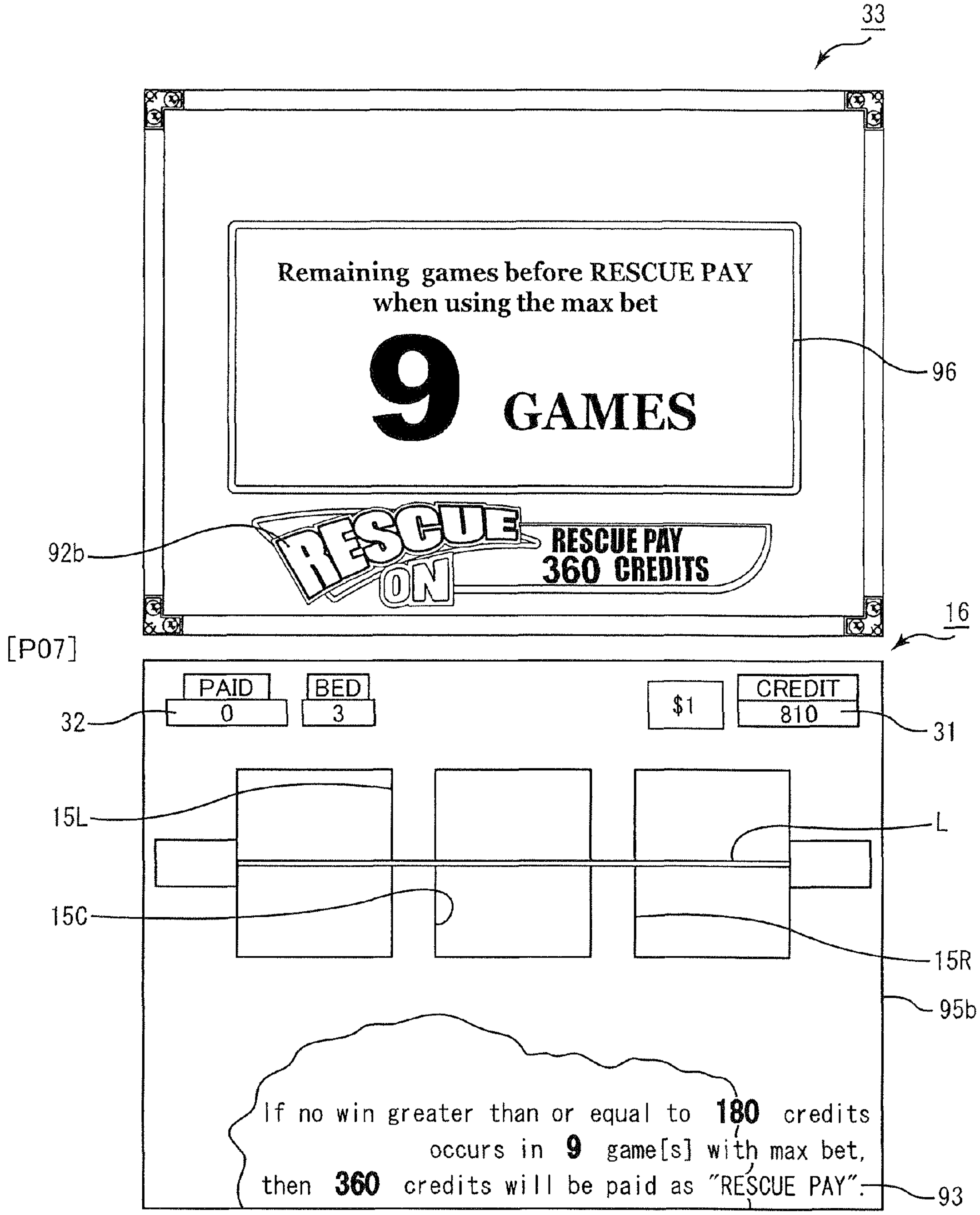

When the number of games in the insurance mode reaches 990 (notice set value), as shown in FIG. 9, to the upper image display panel 33, the image 92*b* is displayed which shows that the current gaming state is the insurance mode and an image 96 is displayed which shows that the number of games left to be played until the number of games to be counted reaches the specific number is ten.

Further, also to the lower image display panel 16, an image 97 is displayed which shows that the number of games left to be played until the number of games to be counted reaches the specific number is ten.

Moreover, a specific effect image 95*a* is displayed to the lower image display panel 16. The specific effect image 95 is displayed after the number of games to be counted has reached the notice set value, in the insurance mode.

[P07]

When the number of games played in the insurance mode becomes 991, the number of games left to be played which is shown by the image 96 displayed to the upper image display panel 33 changes from ten to nine.

Further, also to the lower image display panel 16, the image 93 is displayed which shows that the number of games left to be played until the number of games to be counted reaches the specific number is nine.

Moreover, a specific effect image 95*b* is displayed to the lower image display panel 16.

The specific effect image 95*b* is a video picture with its contents continued from the specific effect image 95*a* in [P06].

[P08] to [P15]

Subsequently, as the number of games in the insurance mode increases, the number of games left to be played shown by the image 96 displayed to the upper image display panel 33 gradually decreases as shown in FIGS. 10 to 13. Further, in the lower image display panel 16, the number of remaining games shown by image 93 is gradually decreased. Moreover, to the lower image display panel 16, specific effect images 95*c* to 95*j* are sequentially displayed according to the number of games left to be played.

The specific effect image 95 is a video picture where a character (angel) performs a series of actions (action of appearing and spreading her wings), and specific effect images 95*a* to 95*j* are made by dividing the specific effect image 95 into a plurality of images along the time axis.

[P16]

When the number of games in the insurance mode reaches the specific number, 360 coins (credits) are paid out.

Figure 14A:
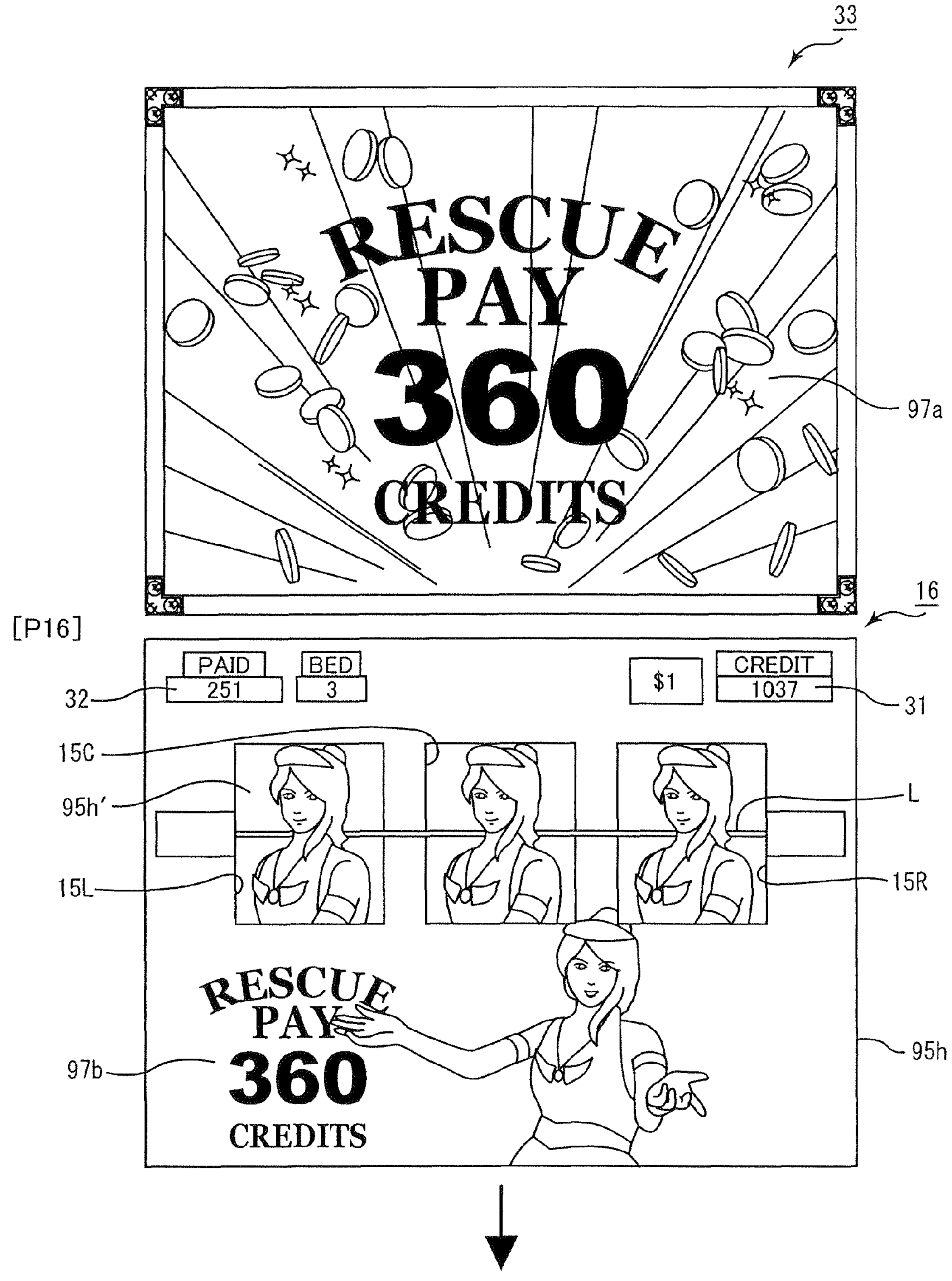
FIG. 14 is another view showing exemplary images displayed to the slot machine shown in FIG. 3.
Figure 14B:
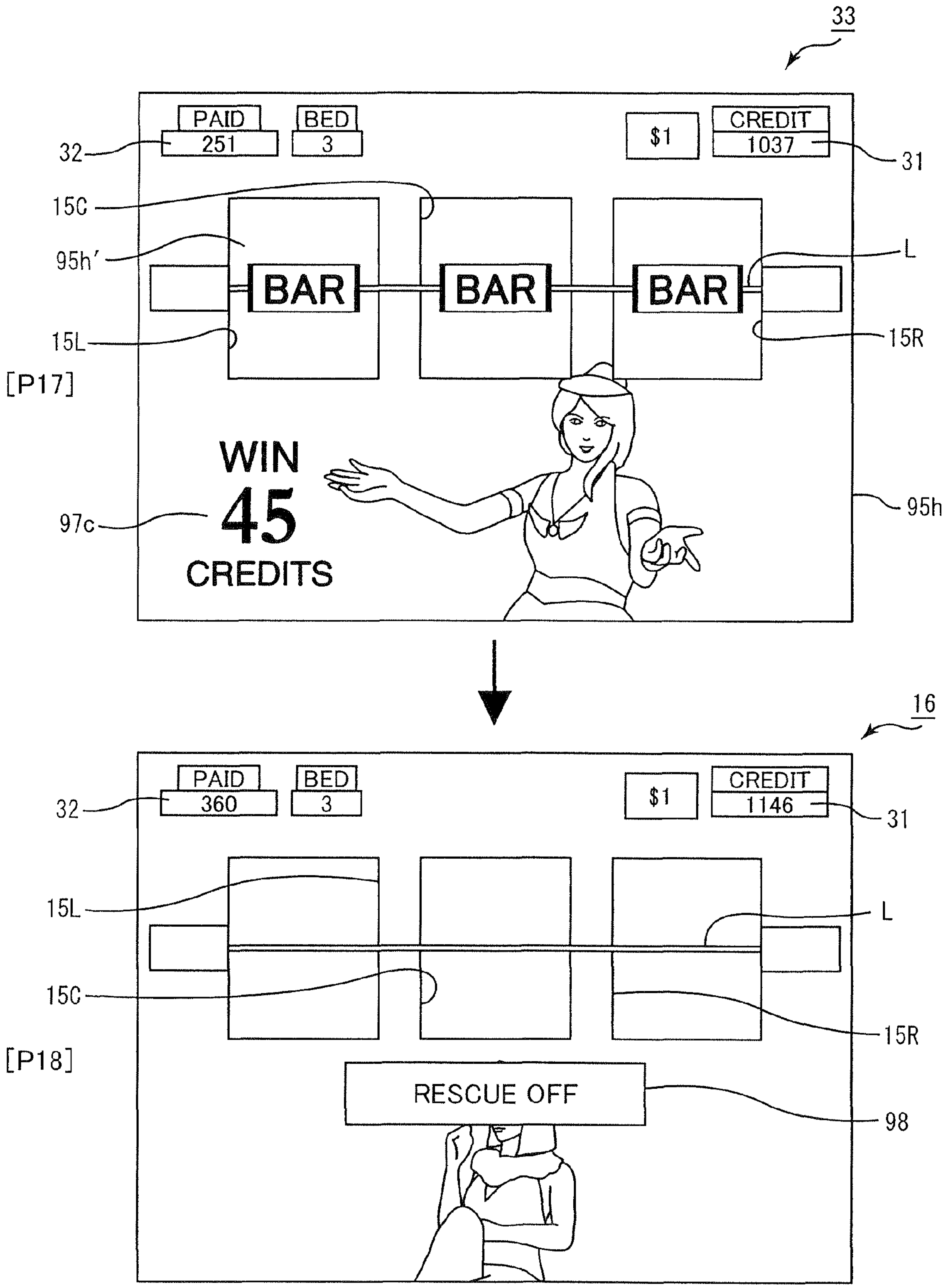

At this time, as shown in FIG. 14, an image 97*a* is displayed to the upper image display panel 33, the image 97*a* showing that coins are being paid out based on that the number of games in the insurance mode has reached the specific number. Further, a similar image 97*b* is also displayed to the lower left side of the lower image display panel 16.

Moreover, to the lower image display panel 16, a specific effect image 95*h* with its contents continued from the specific effect images 95*a* to 95*j*. Furthermore, a specific effect image 95*h*' is displayed in the display windows 15 (15L, 15C, 15R).

[P17]

It should be noted that, when a predetermined winning combination is established in a game with which the number of games in the insurance mode has reached the specific number, coins are paid out based on that the number of games has reached the specific number, and thereafter, coins are paid out based on the above-mentioned winning combination.

At this time, while the specific effect image 95*h* is continuously displayed to the lower image display panel 16, the specific effect image 95*h*' in the display windows 15 disappears so that the reels 14 becomes visible.

Further, an image 97*c* is displayed to the lower left side of the lower image display panel 16, the image 97*c* showing that coins are being paid out according to the above-mentioned winning combination.

[P18]

At the end of the game with which the number of games in the insurance mode has reached the specific number, the number of games is cleared, and the mode is shifted from the insurance mode to the non-insurance mode.

At this time, an image 98 showing "RESCUE OFF" is displayed to the lower image display panel 16. The image 98 is an image showing that the mode has been shifted from the insurance mode to the non-insurance mode.

[P19]

Figure 15A:
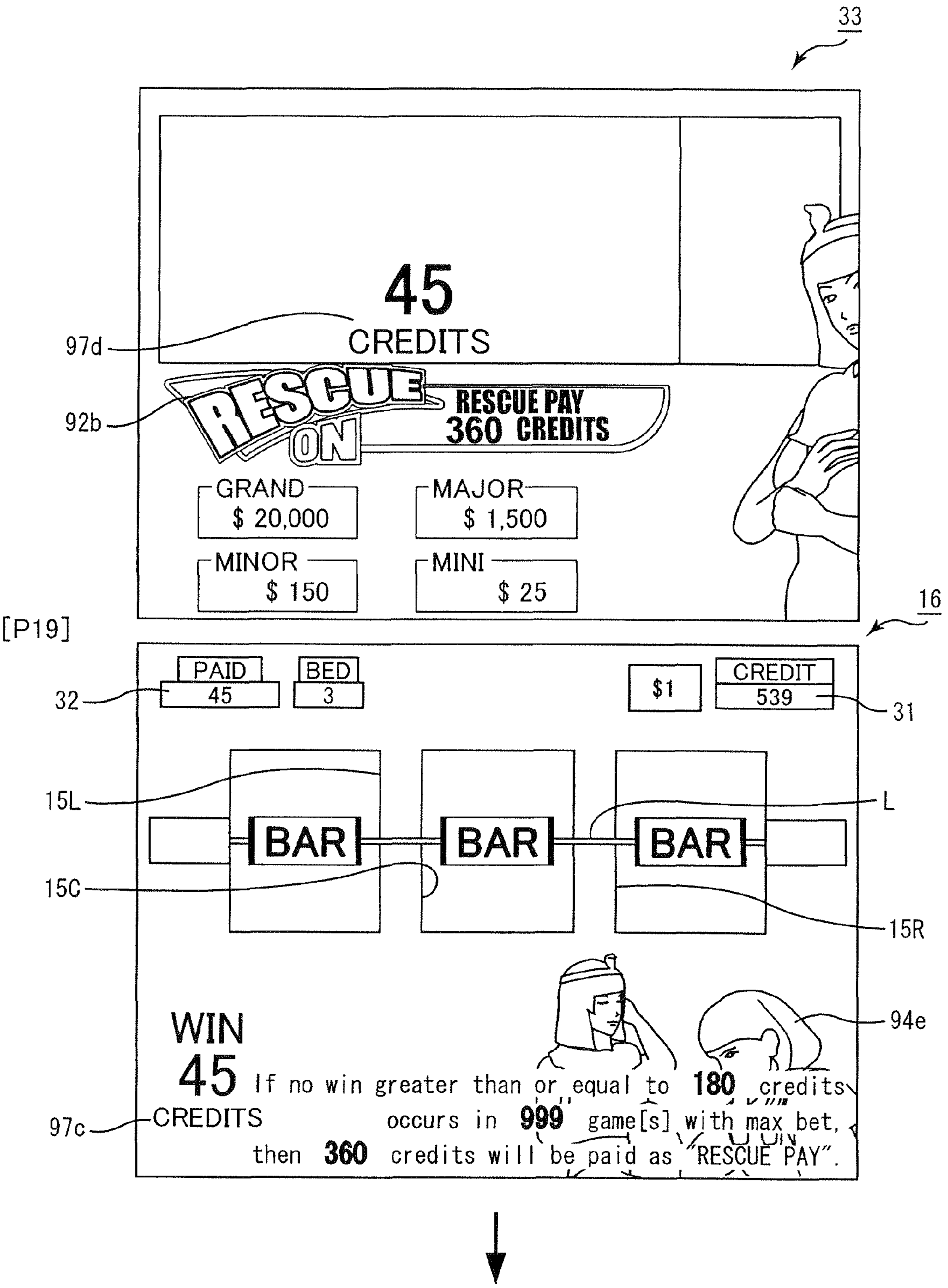
FIG. 15 is another view showing exemplary images displayed to the slot machine shown in FIG. 3.
Figure 15B:
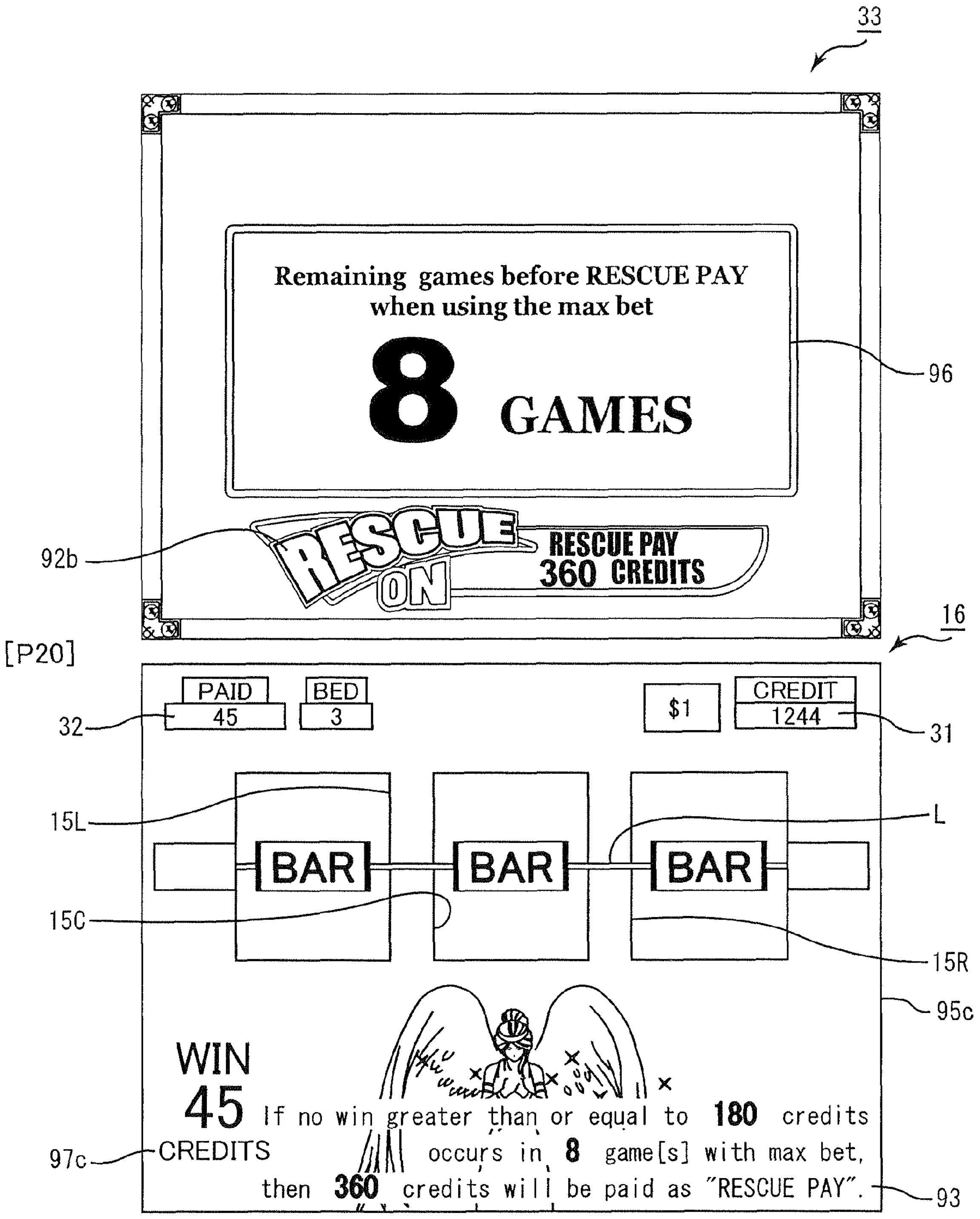

In a case where the number of games has not reached 990 (notice set value) in the insurance mode, when the combination of symbols "BAR"-"BAR"-"BAR" accompanied by coin-outs is established, an image 97*d* showing "45 CREDITS" is displayed to the upper image display panel 33 as shown in FIG. 15.

The image 97*d* is an image showing the number of coins to be paid out according to the combination of symbols "BAR"-"BAR"-"BAR".

Further, the image 92*b* showing "RESCUE ON" is displayed to the upper image display panel 33. The image 92*b* is an image showing that the current gaming state is the insurance mode.

An effect image 94*e* corresponding to "BAR"-"BAR"-"BAR" is displayed to the lower image display panel 16.

Moreover, to the lower image display panel 16, the image 93 is displayed which shows the number of games left to be played until the number of games to be counted reaches the specific number, and the image 97*c* is displayed which shows the number of coin-outs according to the combination of symbols "BAR"-"BAR"-"BAR".

[P20]

After the number of games has reached 990 (notice set value), when the combination of symbols "BAR"-"BAR"-"BAR" accompanied by coin-outs is established in the insurance mode as in [P19], the image 97*c* is displayed to the lower image display panel 16, the image 97*c* showing the number of coin-outs according to the combination of symbols "BAR"-"BAR"-"BAR".

Figure 10A:
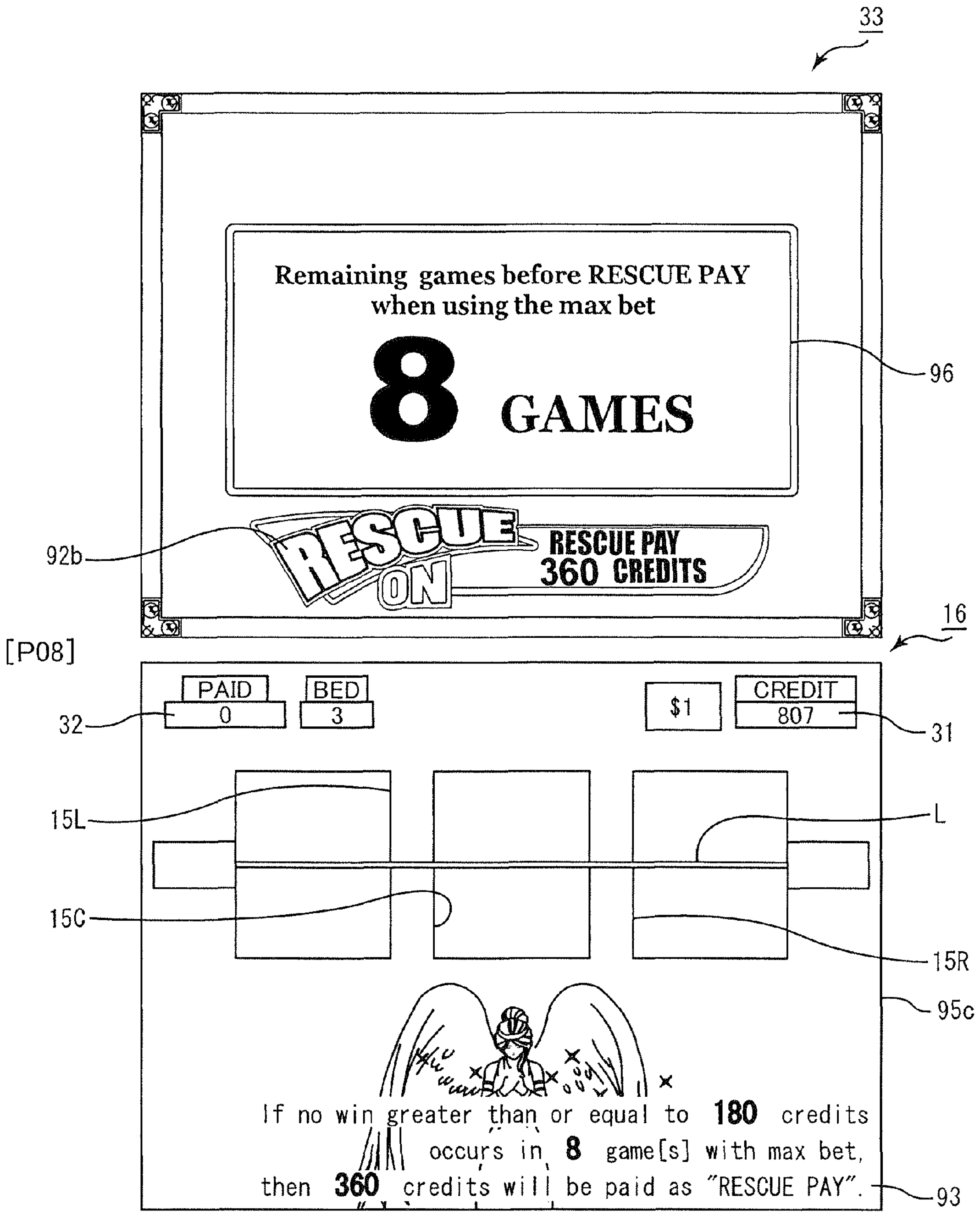
FIG. 10 is another view showing exemplary images displayed to the slot machine shown in FIG. 3.
Figure 10B:
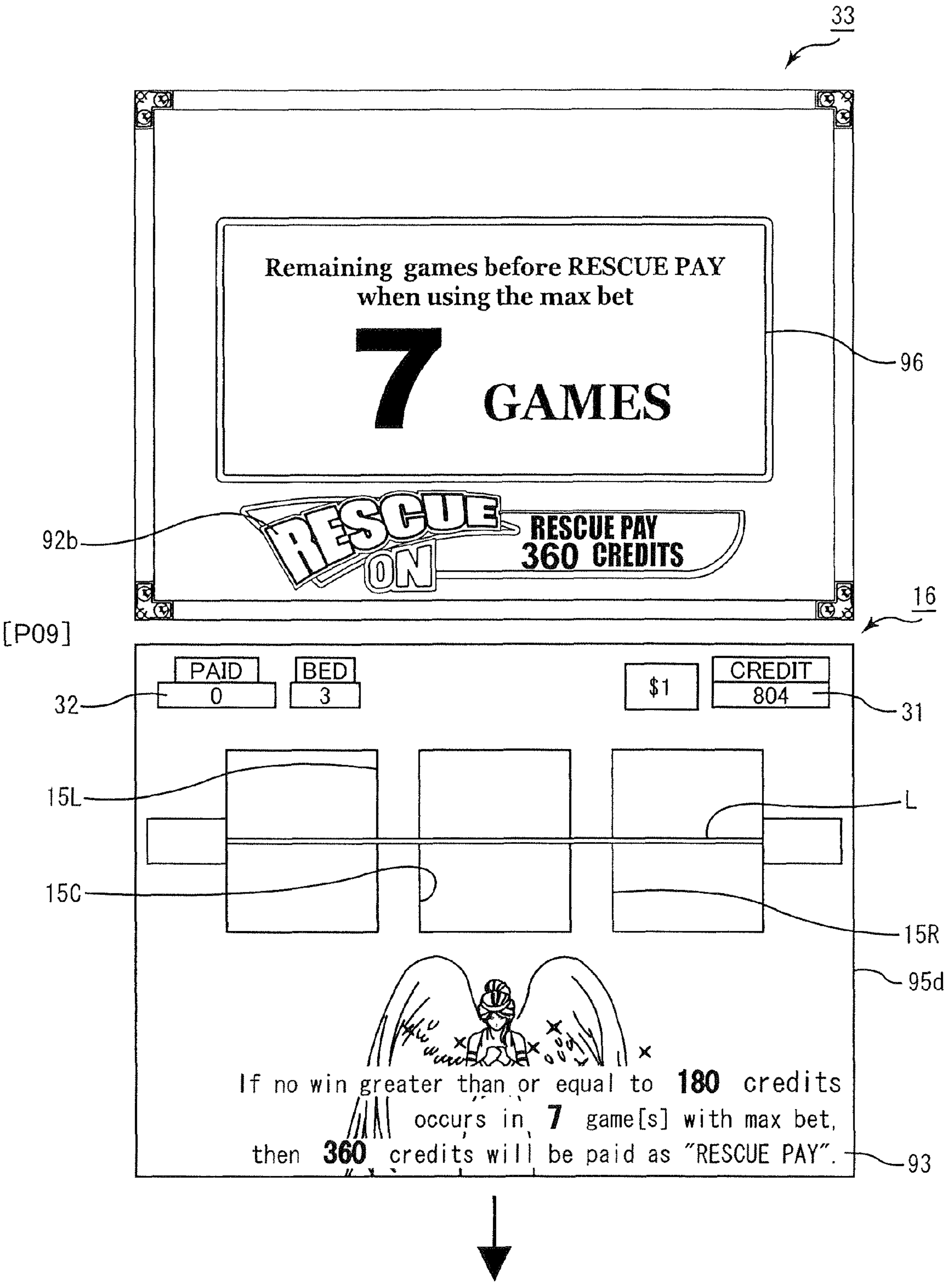
Figure 10C:
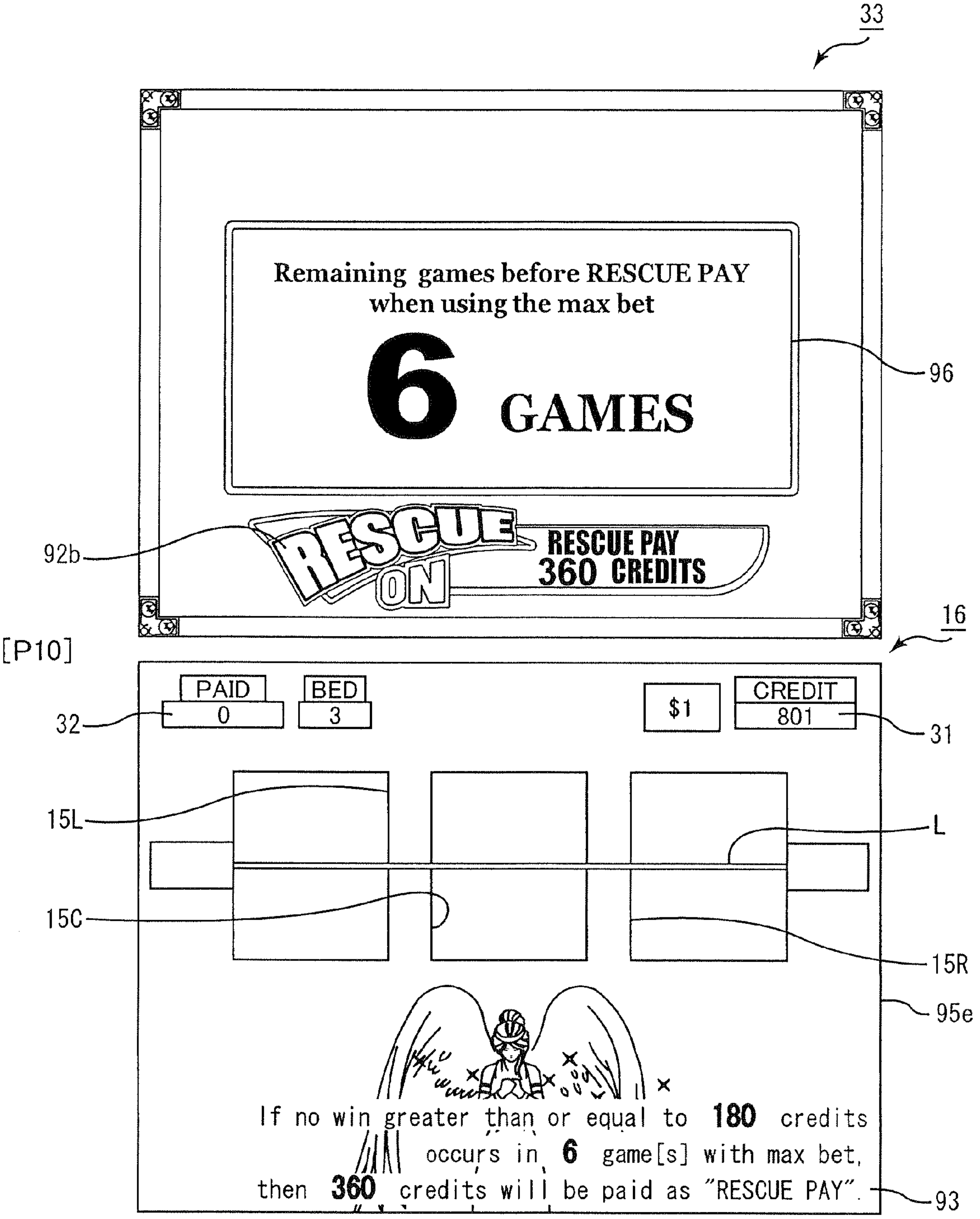
Figure 11A:
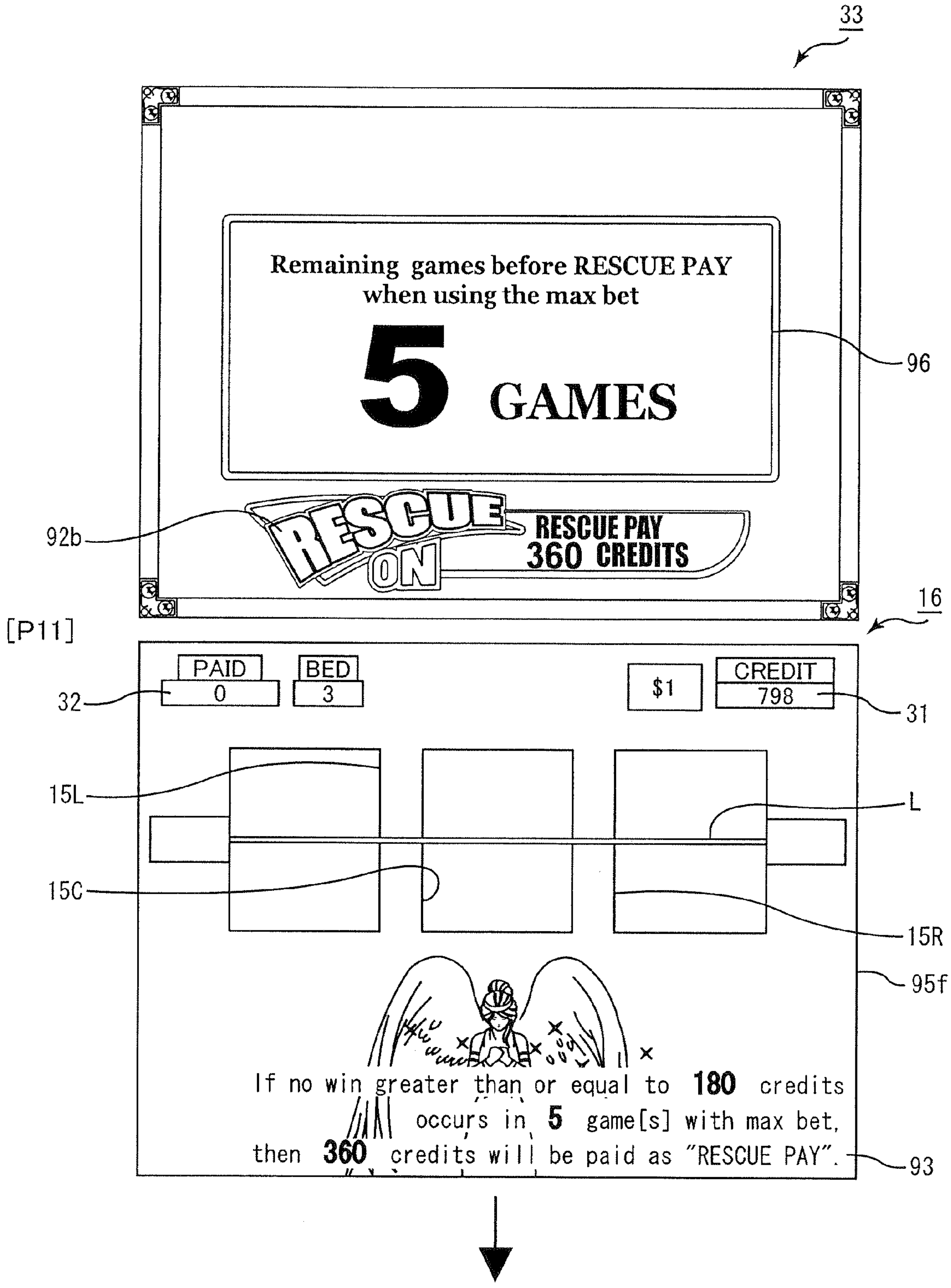
FIG. 11 is another view showing exemplary images displayed to the slot machine shown in FIG. 3.
Figure 11B:
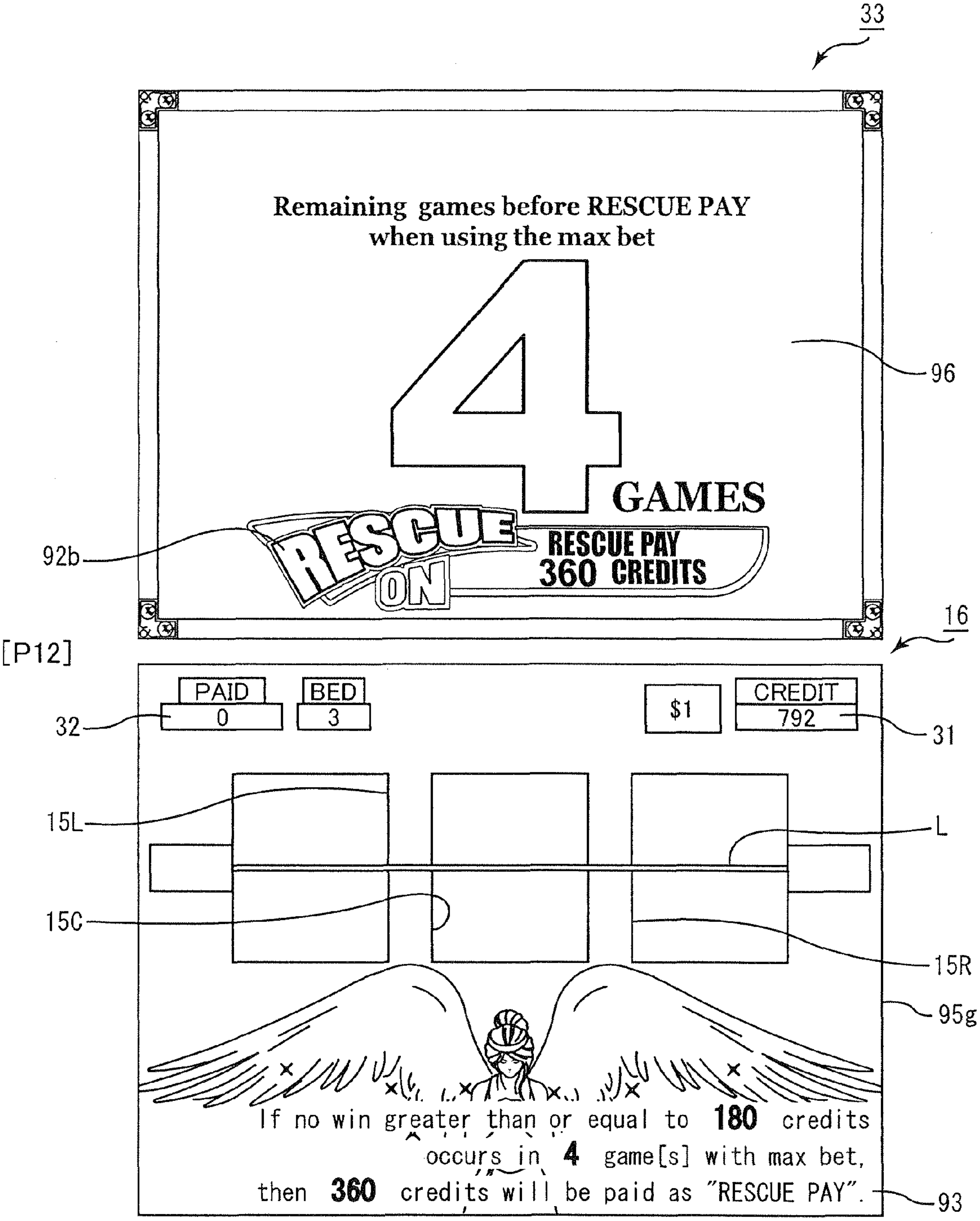
Figure 12A:
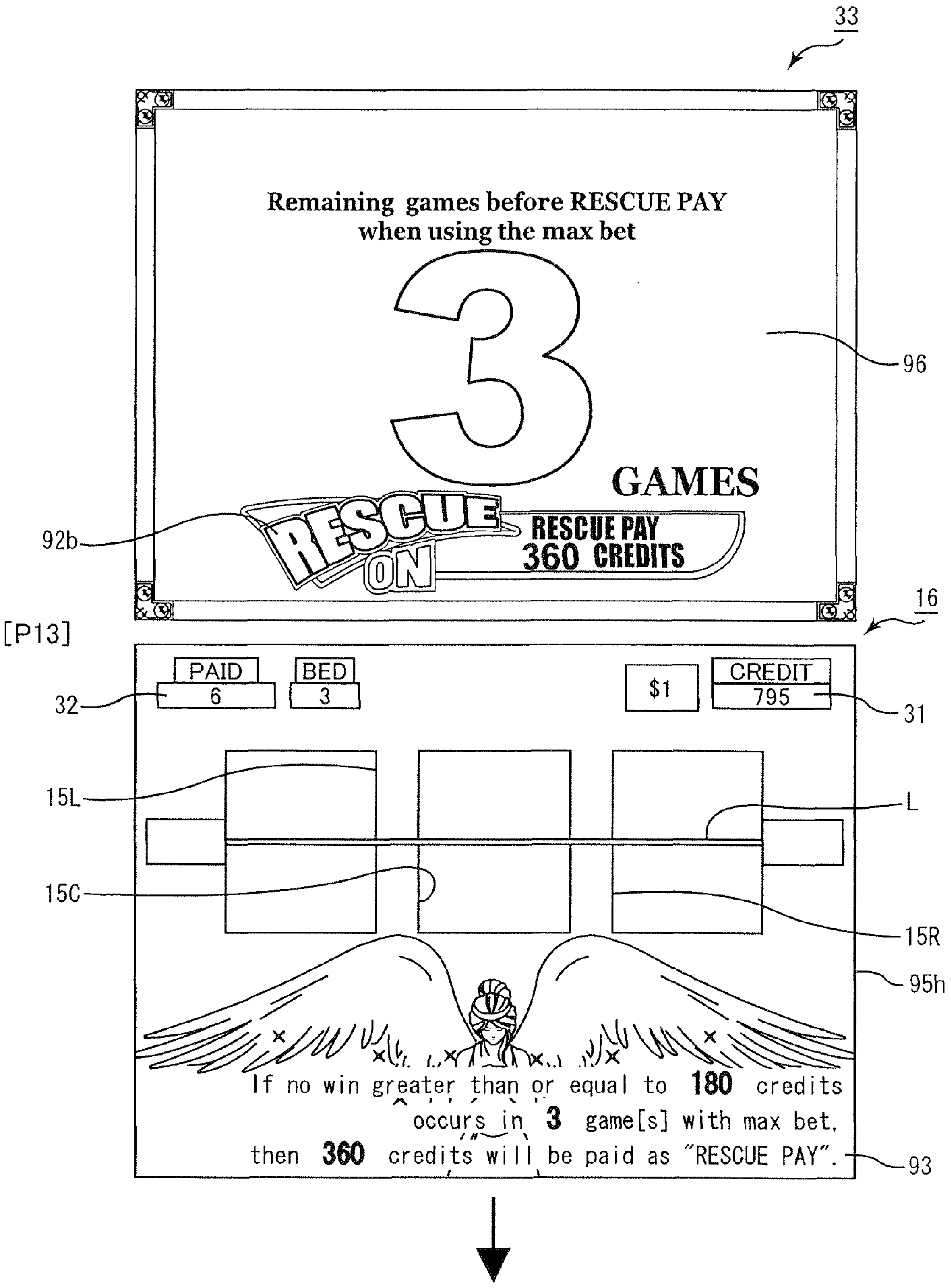
FIG. 12 is another view showing exemplary images displayed to the slot machine shown in FIG. 3.
Figure 12B:
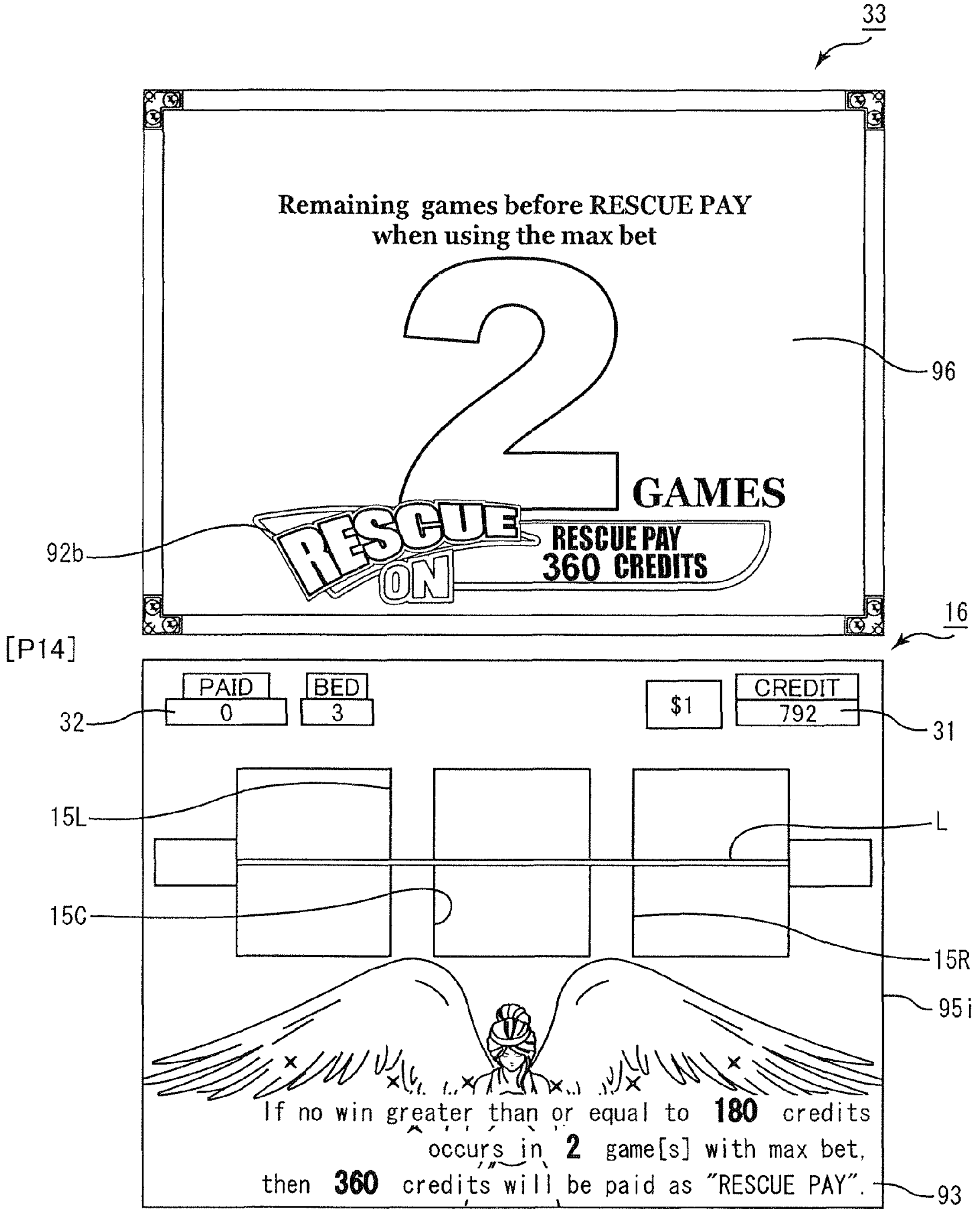
Figure 13:
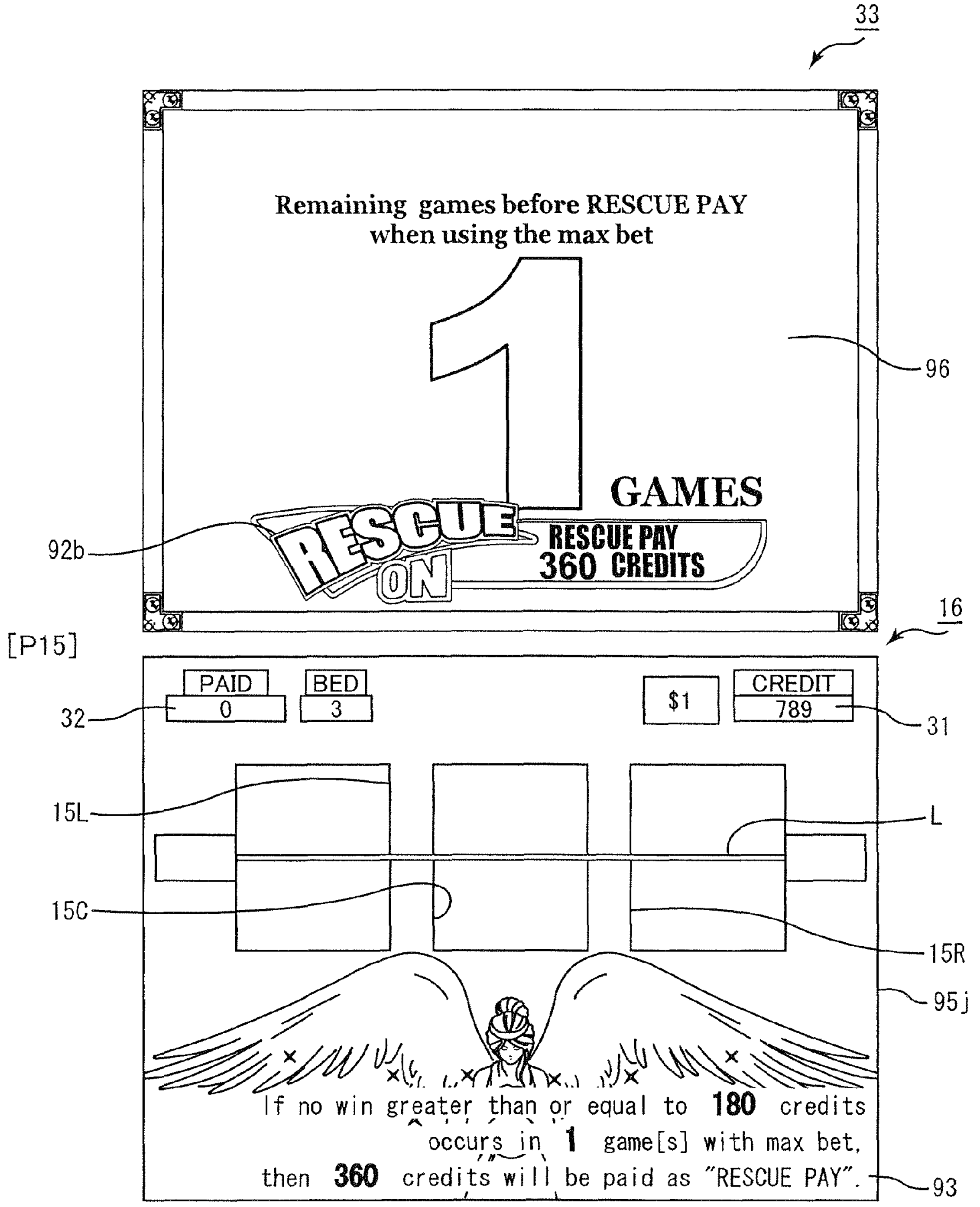
FIG. 13 is another view showing exemplary images displayed to the slot machine shown in FIG. 3.

However, an effect image 94*e* corresponding to the combination of symbols "BAR"-"BAR"-"BAR" is not displayed, and the specific effect image 95*c* is displayed as in [P08] (see FIG. 10). Other images are also displayed as in [P08].

[P21]

Figure 16A:
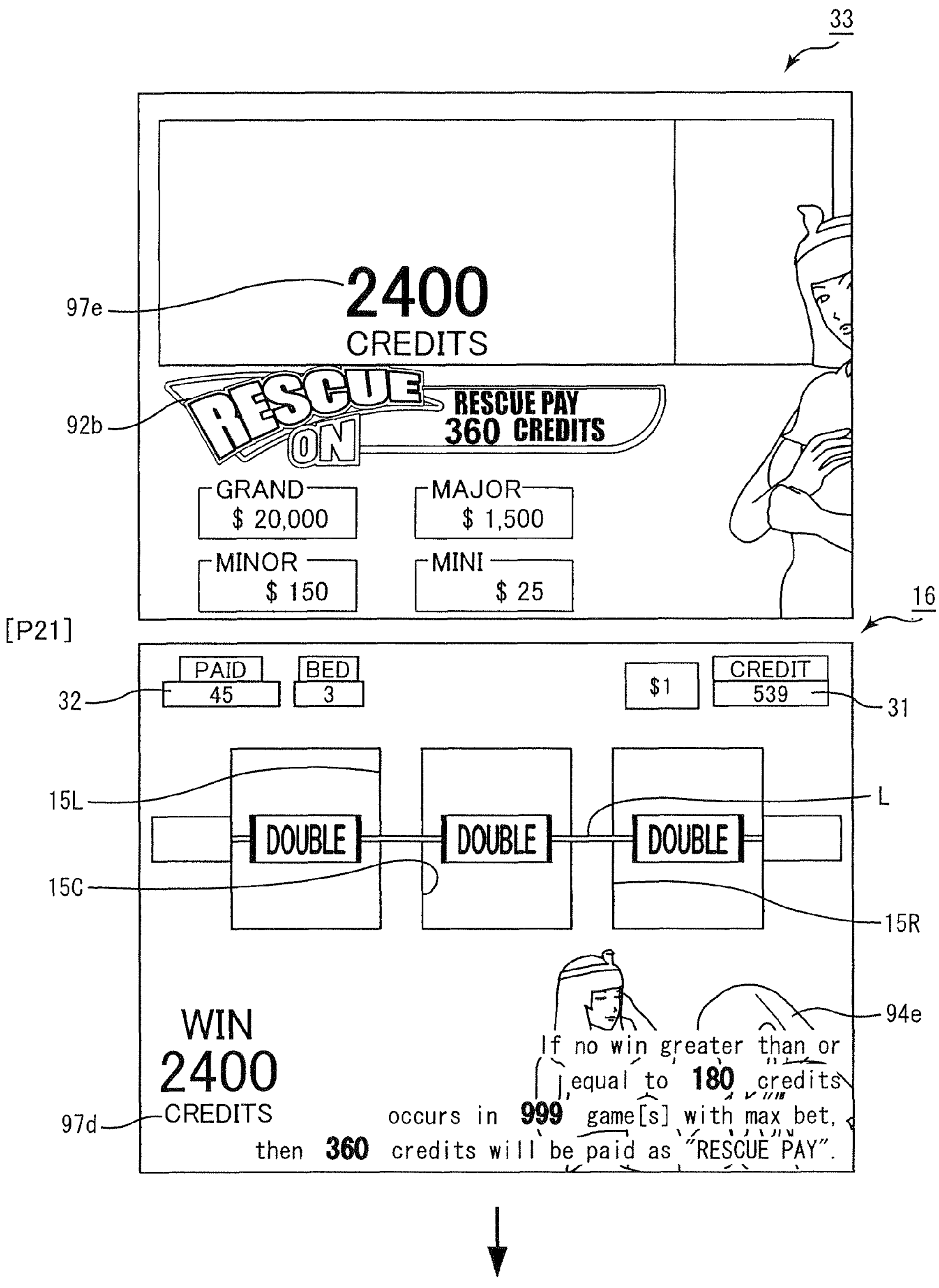
FIG. 16 is another view showing exemplary images displayed to the slot machine shown in FIG. 3.
Figure 16B:
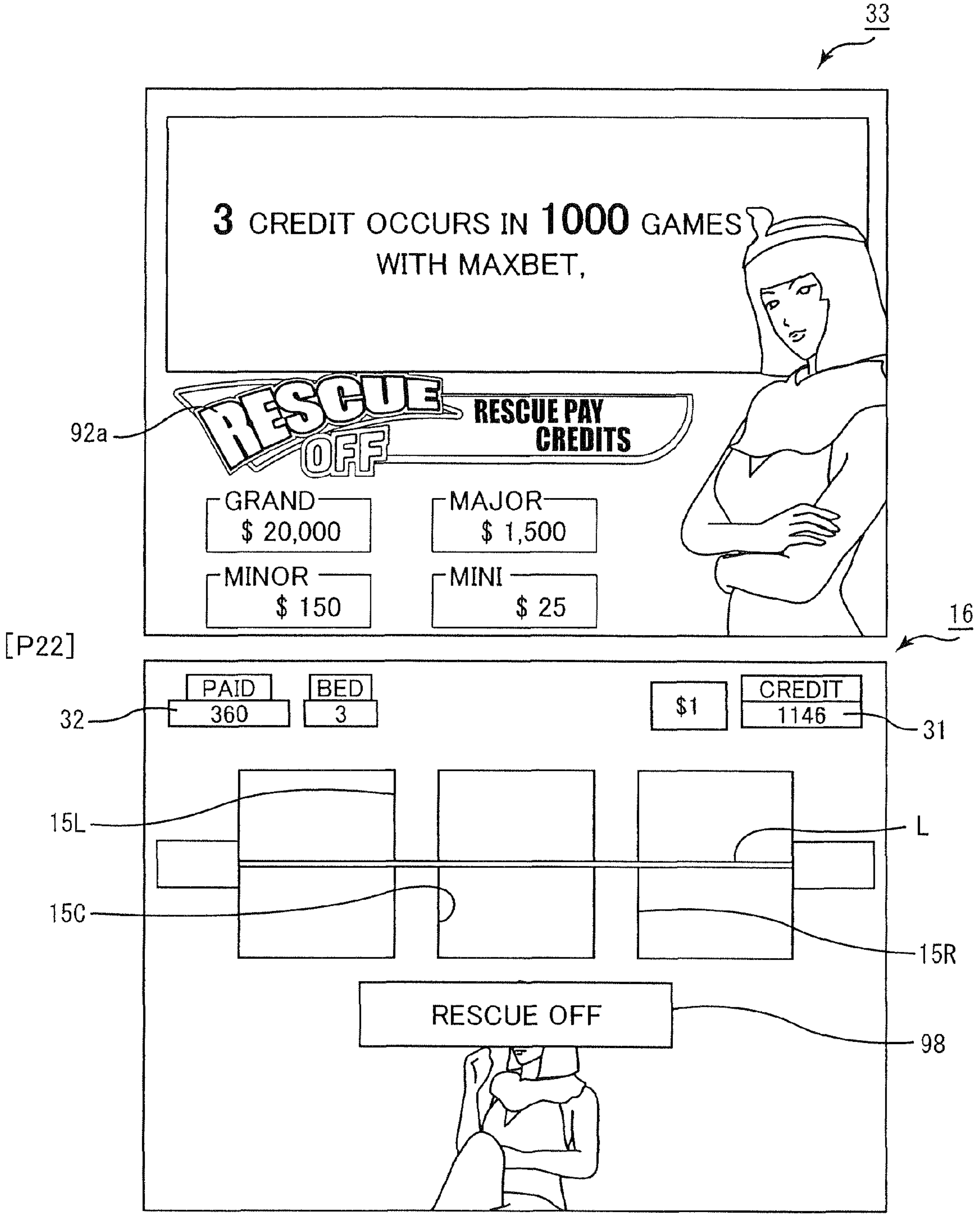

In the insurance mode, when a combination of symbols "DOUBLE"-"DOUBLE"-"DOUBLE" accompanied by a payout of equal to or more than 180 coins is established, an image 97*e* showing "2400 CREDITS" is displayed to the upper image display panel 33 as shown in FIG. 16. The image 97*e* is an image showing the number of coins to be paid out according to the combination of symbols "DOUBLE"-"DOUBLE"-"DOUBLE".

Further, the image 92*b* showing "RESCUE ON" is displayed to the upper image display panel 33. The image 92*b* is an image showing that the current gaming state is the insurance mode.

An effect image 94*e* corresponding to the combination of symbols "DOUBLE"-"DOUBLE"-"DOUBLE" is displayed to the lower image display panel 16. Also, to the lower image display panel 16, there are displayed the image 93 showing the number of games left to be played until the number of games to be counted reaches a specific number, and an image 97*d* showing the number of coins to be paid out according to the combination of symbols "DOUBLE"-"DOUBLE"-"DOUBLE".

[P22]

In the insurance mode, when a combination of symbols accompanied by a payout of equal to or more than 180 coins is established, the mode is shifted from the insurance mode to the non-insurance mode.

At this time, the image 92*a* showing "RESCUE OFF" is displayed to the upper image display panel 33. The image 92*a* is an image showing that the current gaming state is the non-insurance mode.

Further, the image 98 showing "RESCUE OFF" is displayed to the lower image display panel 16. The image 98 is an image showing that the mode has been shifted from the insurance mode to the non-insurance mode.

Next, processing conducted in the slot machine 10 are described.

[Main Processing]

Figure 17:
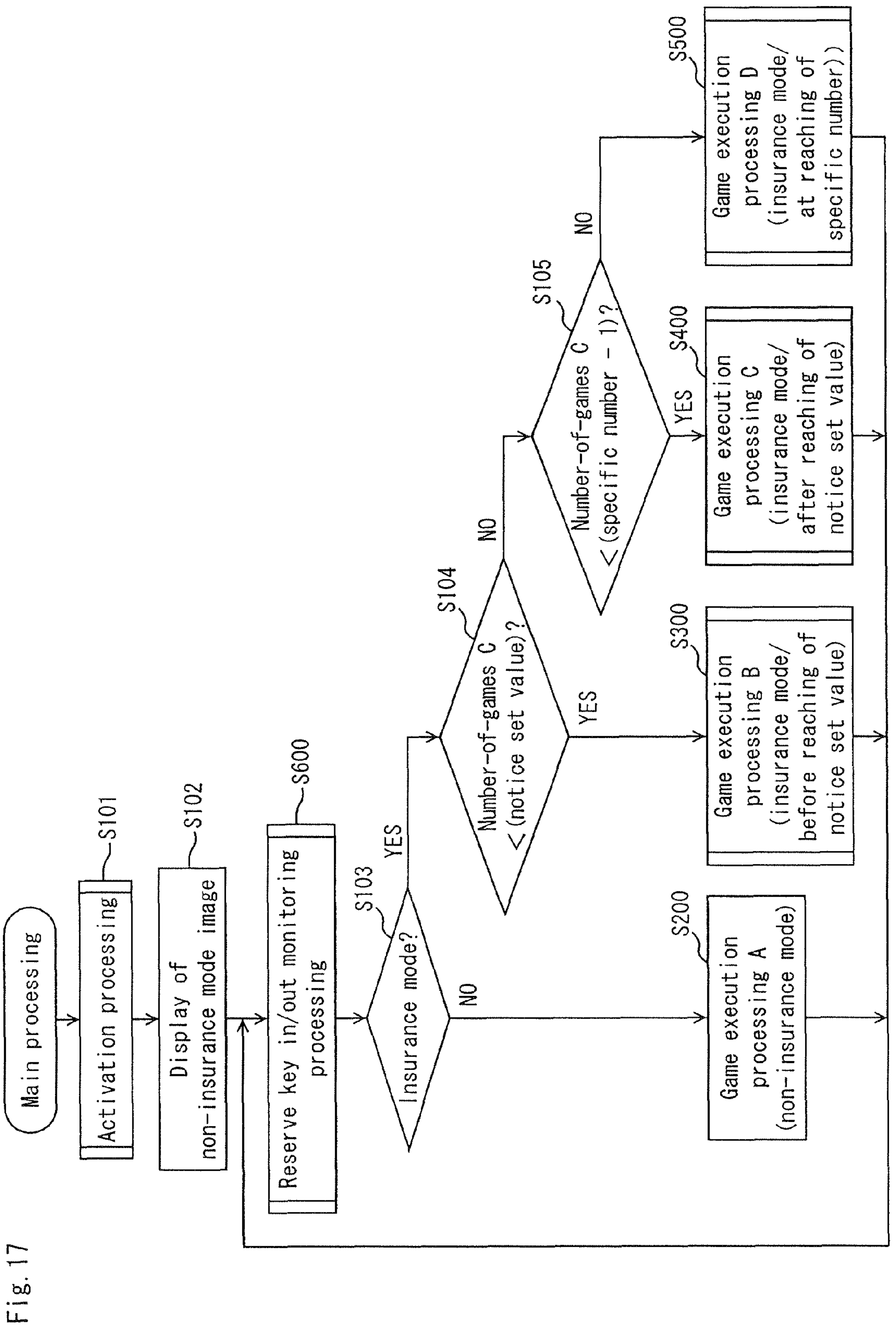
FIG. 17 is a flowchart showing main processing executed in the slot machine shown in FIG. 3.

FIG. 17 is a flowchart showing main processing performed in the slot machine 10.

First, activation processing is conducted in the slot machine 10 (step S101). The activation processing is specifically described later by using FIG. 26.

It is to be noted that, upon receipt of a detection signal outputted from the coin counter 21C when a coin inserted into the coin receiving slot 21 is detected by the coin counter 21C after the activation processing, the main CPU 41 conducts processing for adding the amount of inserted coins to the number of credits stored in the RAM 43 as interruption processing.

After the processing of step S101, the non-insurance mode is displayed in the slot machine 10 (step S102). In this processing, the main CPU 41 transmits a drawing command of the non-insurance mode image to the graphic board 68. On the graphic board 68, based on the above-mentioned drawing command, the VDP extracts image data from the RAM 43, expands it into a video RAM, generates image data of one frame, and outputs this image data to the upper image display panel 33 and the lower image display panel 16. This results in display of an image, for example as shown in [P01] (see FIG. 7), to the upper image display panel 33 and the lower image display panel 16.

The main CPU 41 then executes the reserve key in/out monitoring processing (step S600). The reserve key in/out monitoring processing has already been described by using FIG. 1, thus the descriptions thereof will be omitted here.

Next, the main CPU 41 determines whether or not the current gaming state is the insurance mode, namely whether or not the insurance mode flag stored in the RAM 43 is "ON" (step S103)

When determining that the current gaming state is not the insurance mode in step S103, the main CPU 41 executes game execution processing A (non-insurance mode) (step S200), and then returns the processing to step S103. The game execution processing A is specifically described later by using FIG. 21.

On the other hand, when determining that the current gaming state is the insurance mode in step S103, the main CPU 41 then determines whether or not the number-of-games C stored in the RAM 43 is less than the notice set value (990 in the present embodiment) (step S104).

When determining that the number-of-games C is less than the notice set value in step S104, the main CPU 41 executes game execution processing B (insurance mode/before reaching the notice set value) (step S300), and then returns the processing to step S103. The game execution processing B is specifically described later by using FIG. 22.

On the other hand, when determining that the number-of-games C is not less than the notice set value in step S104, namely the number-of-games C is equal to or more than the notice set value, the main CPU 41 determines whether or not the number-of-games C stored in the RAM 43 is less than a value (999) smaller than the specific number by one (step S105).

When determining that the number-of-games C is less than the value smaller than the specific number by one in step S105, the main CPU 41 executes game execution processing C (insurance mode/after reaching the notice set value) (step S400) since the number-of-games C will not reach the specific number in the next game, and then main CPU 41 returns the processing to step S103. The game execution processing C is specifically described later by using FIG. 23.

When determining that the number-of-games C is the value smaller than the specific number by one in step S105, the main CPU 41 executes game execution processing D (insurance mode/at reaching of specific number) (step S500) since the number-of-games C may reach the specific number in the next game, and then the main CPU 41 returns the processing to step S103. The game execution processing D is specifically described later by using FIG. 24.

Figure 18:
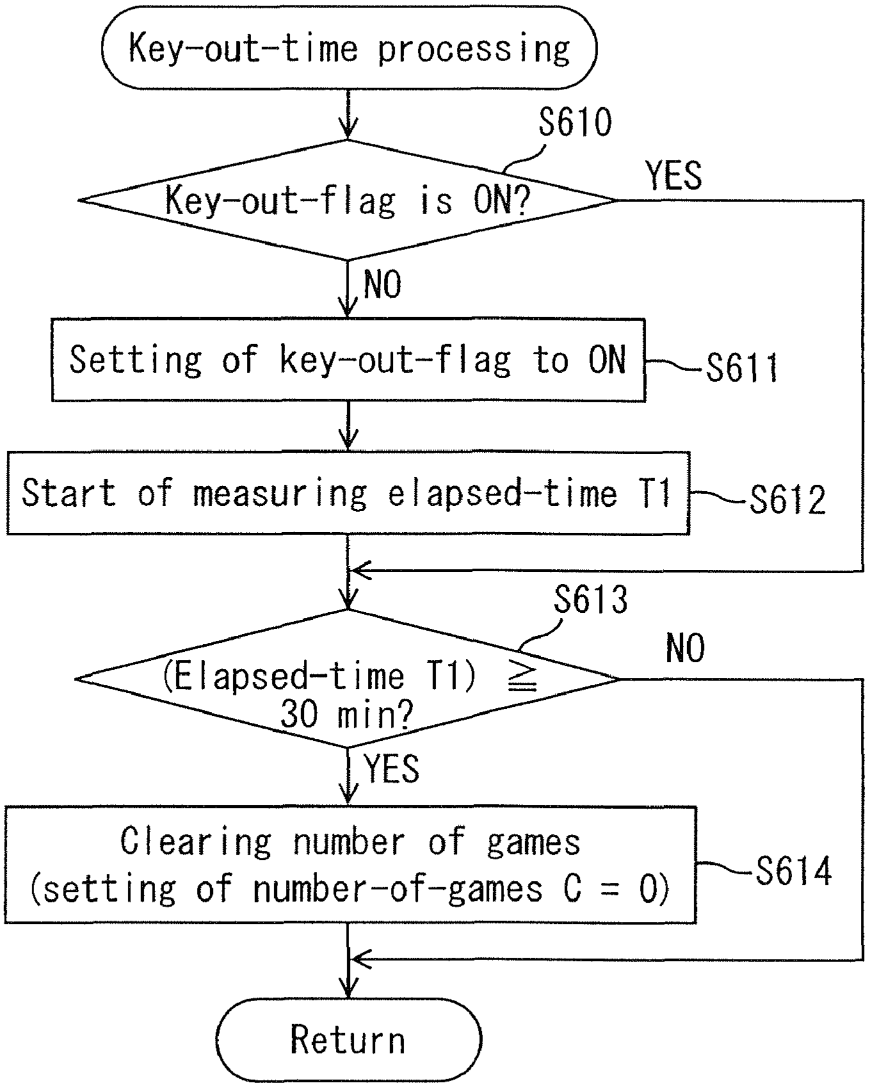
FIG. 18 is a flowchart showing a subroutine of key-out-time processing executed in the slot machine shown in FIG. 3.

FIG. 18 is a flowchart showing a subroutine of key-out-time processing executed in the slot machine shown in FIG. 3.

First, the main CPU 41 determines whether or not a key-out-flag is set to "ON" (step S610). The key-out-flag is set to "ON" if it is determined that the reserve key 112 is not inserted, and is set to "OFF" if it is determined that the reserve key 112 is inserted. When determining that the key-out-flag is not set to "ON", the main CPU 41 sets the key-out-flag to "ON" (step S611), and starts measuring the elapsed-time T1 (step S612). The elapsed-time T1 corresponds to the elapsed time in the first aspect of the present invention.

When determining in step S610 that the key-out-flag is set to "ON", or after the processing of step S612, the main CPU 41 determines whether or not the elapsed-time T1 has reached 30 minutes (the first predetermined time) or more (step S613). When determining that the elapsed-time T1 has reached 30 minutes or more, the main CPU 41 clears the number of games by setting the number-of-games C to zero (C=0) in the storage area of data on the number-of-games C, the storage area being provided in the RAM 43 (step S614). When determining in step S613 that the elapsed-time T1 has not reached 30 minutes or more, or after the processing of step S614, the main CPU 41 terminates the present subroutine.

As described above, in the key-out-time processing, the number of games counted is cleared when the elapsed-time T1 since removal of the reserve key 112 reaches 30 minutes (the first predetermined time) or more. Accordingly, the player having removed the reserve key 112 and left the slot machine 10 must return to the slot machine 10 to return the reserve key 112 within 30 minutes (the first predetermined time), in order that the number of games may not be cleared. As a result, it is possible to improve the operating efficiency of the slot machine 10.

Moreover, the player having removed the reserve key 112 and left the slot machine 10 can start the game from the state before leaving the slot machine 10 without the number of games being cleared, so long as the player returns the reserve key 112 within 30 minutes (the first predetermined time). As a result, a player who desires to acquire coins to be paid out by the number of games reaching the specific number can leave the slot machine 10 at ease for the restroom, a break or the like during the game.

Figure 19:
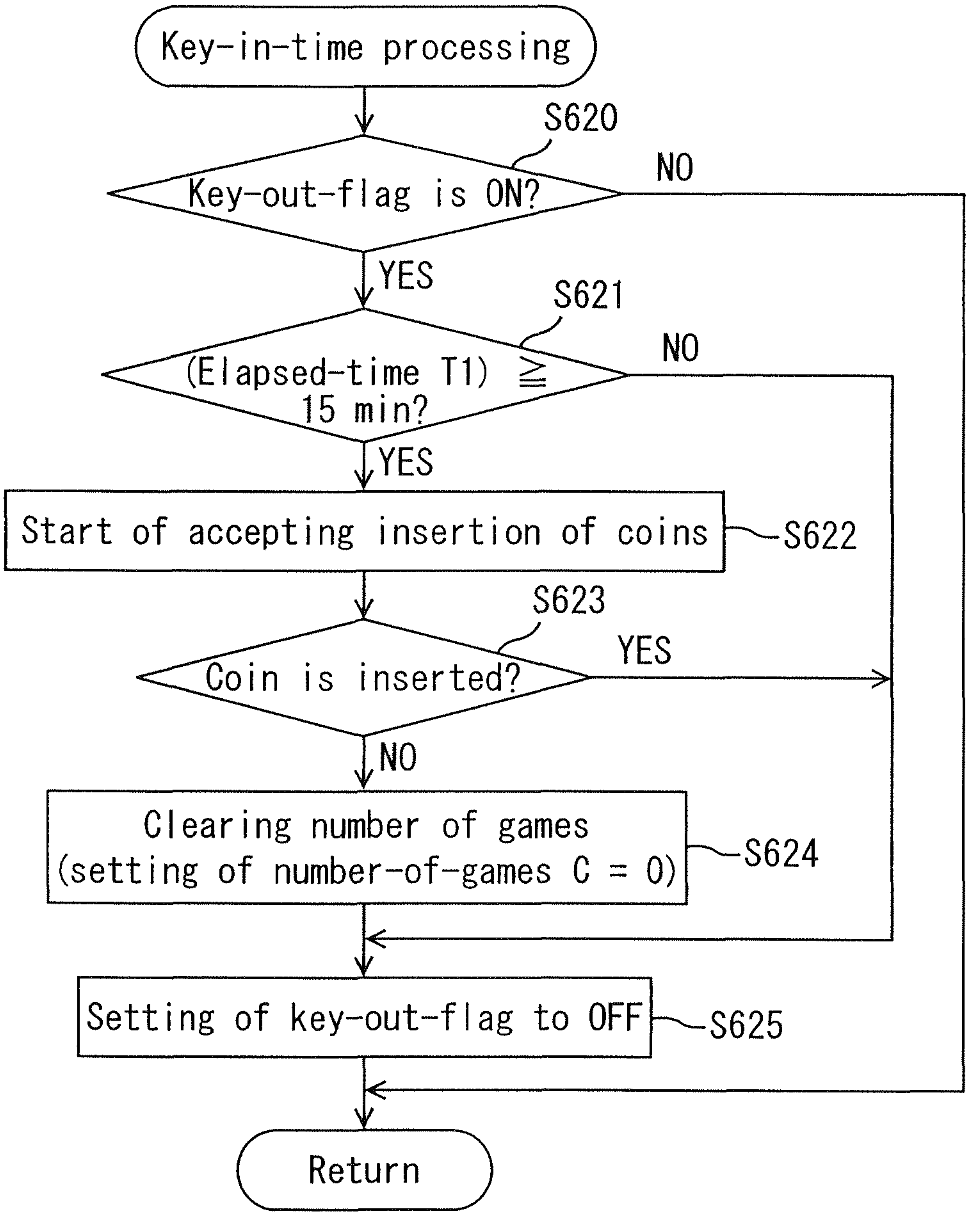
FIG. 19 is a flowchart showing a subroutine of key-in-time processing executed in the slot machine shown in FIG. 3.

FIG. 19 is a flowchart showing a subroutine of key-out-time processing executed in the slot machine shown in FIG. 3.

First, the main CPU 41 determines whether or not the key-out-flag is set to "ON" (step S620). When determining that the key-out-flag is set to "ON", the main CPU 41 determines whether or not the elapsed-time T1 has reached 15 minutes or more (step S621). When determining that the elapsed-time T1 has reached 15 minutes or more, the main CPU 41 starts accepting insertion of coins (step S622). In the processing of step S622, the main CPU 41 executes the processing for displaying a coin insertion image to the lower image display panel 16. The coin insertion image is for notifying the player that the game can be continued without the number of games being cleared, on condition that the player inserts 5 coins within the predetermined period (within 1 minute in the present invention). Further, in the processing of step S622, the main CPU 41 executes the processing for accepting, during the predetermined period of time (1 minute), 5 coins for preventing the number of games from being cleared. It is to be noted that, if the 5 coins are inserted or if an input of not inserting the 5 coins is entered, the main CPU 41 shifts the processing to step S623 even if the predetermined period (1 minute) has not elapsed.

After the processing of step S622, the main CPU 41 determines whether or not 5 coins for preventing the number of games from being cleared are inserted (step S623). When determining that the 5 coins are not inserted, the main CPU 41 clears the number of games by setting the number-of-games C to zero (C=0) in the storage area of data on the number-of-games C, the storage area being provided in the RAM 43 (step S624).

When determining in step S621 that the elapsed-time T1 has not reached 30 minutes or more, when determining in step S623 that the 5 coins are inserted, or after the processing of step S624, the main CPU 41 sets the key-out-flag to "OFF". When determining in step S620 that the key-out-flag is not set to "ON" or after the processing of step S625, the main CPU 41 terminates the present subroutine.

As described above, in the key-in-time processing, insertion of 5 (the predetermined number) coins is accepted when the reserve key 112 is returned before the elapsed time T1 reaches 30 minutes (the first predetermined time) after having reached 15 minutes (the second predetermined time) 15 minutes that is shorter than 30 minutes (the first predetermined time); and the number-of-games C is cleared when 5 (the predetermined number) coins are not inserted.

Accordingly, the player who has left the slot machine 10 for a longer period of time than 15 minutes (the second predetermined time) is required to insert 5 coins, as the condition of starting the game from the state before leaving the slot machine 10; thereby the game provider side can secure its profit of the period during which the games are not played.

Furthermore, since counting is restarted from the number-of-games C counted before leaving the slot machine 10 even without inserting coins when the reserve key 112 is returned before 15 minutes (the second predetermined time) elapses; thus, it is possible to encourage the player to return to the slot machine 10 soon.

In the slot machine 10, insurance setting processing is conducted in a predetermined cycle when the non-insurance mode image is displayed (see [P01] in FIG. 7) as described above.

Figure 20:
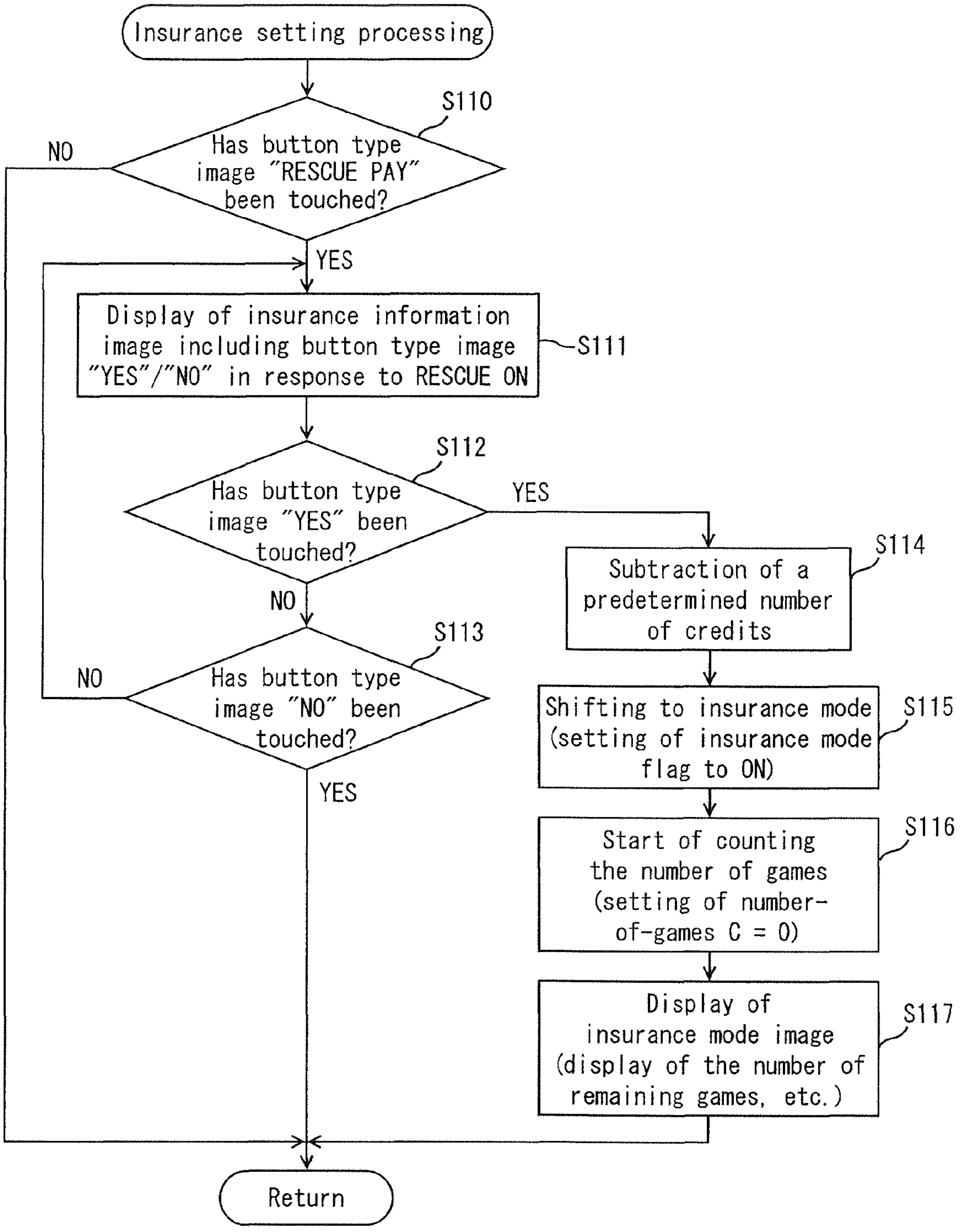
FIG. 20 is a flowchart showing a subroutine of insurance setting processing.

FIG. 20 is a flowchart showing a subroutine of the insurance setting processing.

First, the main CPU 41 determines whether or not the button type image "RESCUE PAY" 90*a* included in the image shown in [P01] displayed to the lower image display panel 16 has been touched, namely, whether or not to have received a detection signal that is outputted from the touch panel 69 when a predetermined place of the touch panel 69 corresponding to the display area of the button type image 90*a* is touched (step S110). When the main CPU 41 determines that the button type image 90*a* has not been touched, the present subroutine is terminated.

On the other hand, when determining that the button type image 90*a* has been touched, the main CPU 41 displays an insurance information image (see [P02] in FIG. 7), including the button type image "YES" 91*a* and the button type image "NO" 91*b* for responding to "RESCUE ON", to the lower image display panel 16 (step S111).

Next, the main CPU 41 determines whether or not the button type image "YES" 91*a* has been touched (step S112). When determining that the button type image "YES" 91*a* has not been touched in step S112, the main CPU 41 then determines whether or not the button type image "NO" 91*b* has been touched (step S113). When the main CPU 41 determines that the image "NO" 91*b* has been touched, the present subroutine is terminated. On the other hand, when the main CPU 41 determines that the image "NO" 91*b* has not been touched, the processing is returned to step S111.

When the button type image "YES" 91*a* has been touched in step S112, the main CPU 41 conducts processing for subtracting a predetermined number of credits (1 in the present embodiment) from the number of credits stored in the RAM 43 (step S114).

It should be noted that bills or coins that correspond to the number of credits may be inserted in place of subtracting the number of credits.

Next, the main CPU 41 sets the insurance mode flag stored in the RAM 43 to "ON" so as to shift the mode to the insurance mode (step S115).

The main CPU 41 then sets the number-of-games C to zero (the number-of-games C=0) in the data storage area showing the number-of-games C which is provided in the RAM 43, and starts counting the number of games (step S116).

Subsequently, the main CPU 41 displays the insurance mode images shown in [P03] (see FIG. 8) to the upper image display panel 33 and the lower image display panel 16 (step S117). The insurance mode image includes the image 93 showing the number of games left to be played until the number of games to be counted reaches the specific number, and some other images. After the processing of step S117, the present subroutine is terminated.

[Game Execution Processing A (Non-insurance Mode)]

Figure 21:
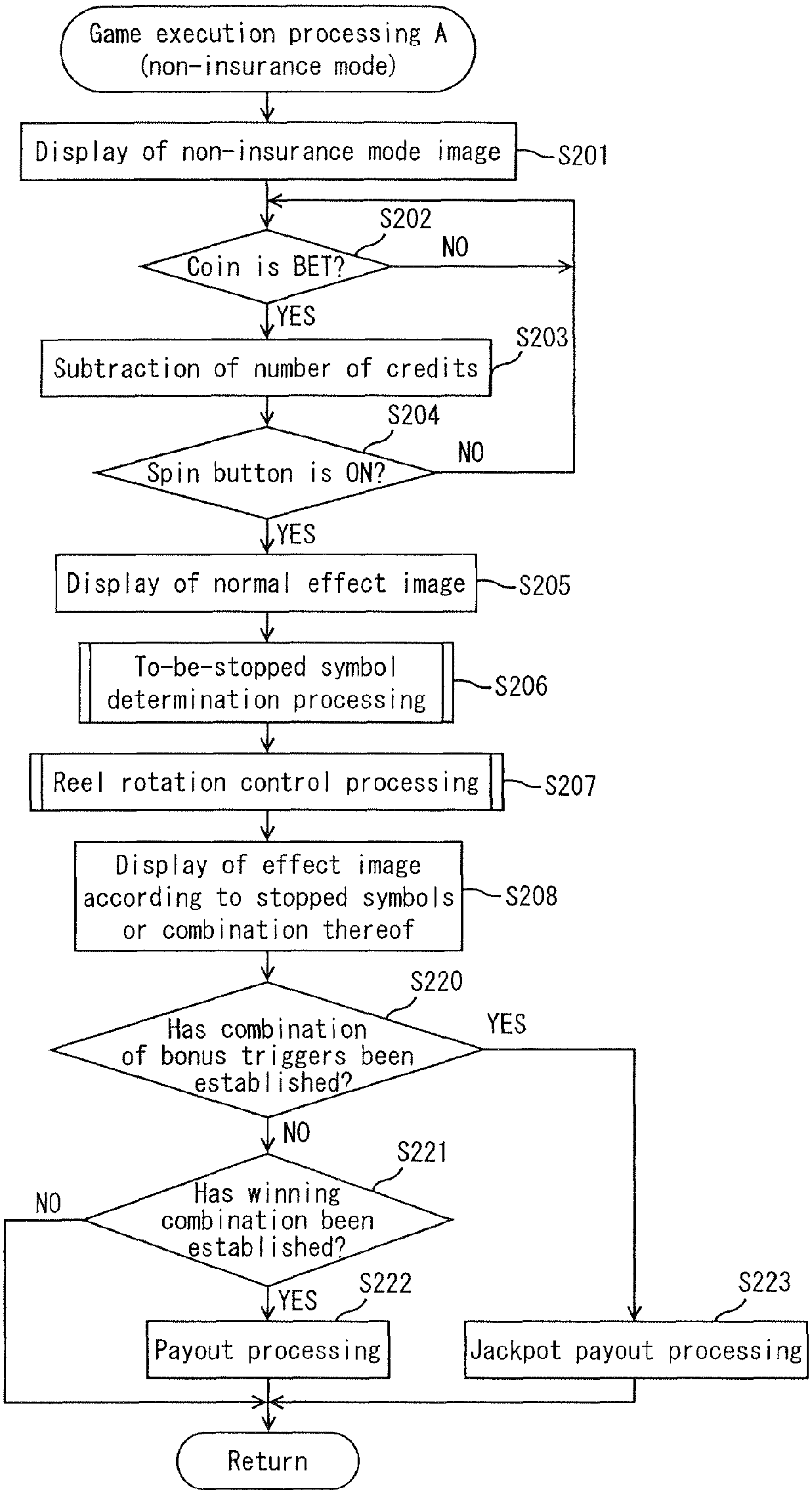
FIG. 21 is a flowchart showing game execution processing A (non-insurance mode).

FIG. 21 is a flowchart showing a subroutine of the game execution processing A called and executed in step S200 of the subroutine shown in FIG. 20.

First, the main CPU 41 conducts processing for displaying the non-insurance mode image (see [P01] in FIG. 7) to the upper image display panel 33 and the lower image display panel 16 (step S201).

Next, the main CPU 41 determines whether or not a coin has been BET (step S202). In this processing, the main CPU 41 determines whether or not to have received an input signal that is outputted from the 1-BET switch 26S when the 1-BET button 26 is operated, or an input signal that is outputted from a maximum BET switch 27S when the maximum BET button 27 is operated. When the main CPU 41 determines that the coin has not been BET, the processing is returned to step S202.

On the other hand, when determining that the coin has been BET in step S202, the main CPU 41 conducts processing for making a subtraction from the number of credits stored in the RAM 43 according to the number of coins BET (step S203). It is to be noted that, when the number of coins BET is larger than the number of credits stored in the RAM 43, the main CPU 41 does not conduct the processing for making a subtraction from the number of credits stored in the RAM 43, and the processing is returned to step S202. Further, when the number of coins BET exceeds the upper limit of the number of coins that can be BET in one game (three coins in the present embodiment), the main CPU 41 does not conduct the processing for making a subtraction from the number of credits stored in the RAM 43, and the processing is proceeded to step S204.

Next, the main CPU 41 determines whether or not the spin button 23 has been turned ON (step S204). In this processing, the main CPU 41 determines whether or not to have received an input signal that is outputted from the spin switch 23S when the spin button 23 is pressed.

When the main CPU 41 determines that the spin button 23 has not been turned on, the processing is returned to step S202.

It is to be noted that, when the spin button 23 is not turned ON (e.g. when the spin button 23 is not turned ON and a command to end the game is inputted), the main CPU 41 cancels a subtraction result in step S203.

In the present embodiment, a case is described where, after a coin is BET (step S202), the processing for making a subtraction from the number of credits is conducted (step S203) before it is determined whether or not the spin button 23 has been turned ON (step S204). However, the present invention is not limited to this example. For example, it may be determined whether or not the spin button 23 has been turned ON (step S204) after a coin is BET (step S202), and when it is determined that the spin button 23 has been turned ON (step S204: YES), the processing for making a subtraction from the number of credits may be conducted (step S203).

On the other hand, when determining that the spin button 23 has been turned ON in step S204 in FIG. 21, the main CPU 41 conducts processing for displaying a normal effect image (e.g. the normal effect image 94*a*). In the present embodiment, the normal effect image 94 had been displayed before the spin button 23 is turned ON, and another normal effect image 94 is displayed after the spin button 23 is turned ON. It should be noted that, in the present invention, the normal effect image 94 may be displayed after the spin button 23 is turned ON.

Next, the main CPU 41 conducts to-be-stopped symbol determination processing (step S206). In this to-be-stopped symbol determination processing, the main CPU 41 (arithmetic processing unit) executes a to-be-stopped symbol determination program stored in the RAM 43 (storage device) so as to determine a code No. in stopping the reels 14. Thereby, a combination of symbols to be rearranged is determined. This processing is specifically described later by using FIGS. 27 and 30.

It should be noted that, in the present embodiment, a case is described where a combination of symbols to be rearranged is determined so as to determine one winning combination out of a plurality of types of winning combinations. However, in the present invention, for example, a random number may be used first so as to determine one winning combination to be selected randomly from the plurality of types of winning combinations, and thereafter, a combination of symbols to be rearranged may be determined based on the above-mentioned winning combination.

Next, the main CPU 41 conducts reel rotation control processing (step S207). This is the processing for starting rotation of all the reels 14 and then stopping rotation of the reels 14 so that the combination of symbols corresponding to the winning combination determined in step S206 is rearranged along the winning line L. This processing is specifically described later by using of FIGS. 28 to 30. Next, the main CPU 41 displays to the lower image display panel 16 an effect image according to rearranged symbols or a combination thereof (step S208).

Next, the main CPU 41 determines whether or not a combination of bonus triggers has been established (step S220). When it is determined that the combination of bonus triggers has been established, a single jackpot is selected out of four types of jackpots "GRAND", "MAJOR", "MINOR" and "MINI", and the number of coins set with respect to the selected jackpot is paid out (step S223). In the case of accumulating coins, the main CPU 41 conducts processing for adding a predetermined number of credits to the number of credits stored in the RAM 43. On the other hand, in the case of paying out coins, the main CPU 41 transmits a control signal to the hopper 66 in order to pay out a predetermined number of coins. At that time, the coin detecting portion 67 counts the number of coins paid out from the hopper 66, and when the counted value reaches a designated number, the coin detecting portion 67 transmits a payout completion signal to the main CPU 41. Thereby, the main CPU 41 stops driving of the hopper 66 and ends the coin payout processing. Thereafter, the present subroutine is terminated.

On the other hand, in step S220, when determining that the combination of bonus triggers has not been established, the main CPU 41 determines whether or not a winning combination has been established (step S221). When determining that the winning combination has been established, the main CPU 41 pays out coins according to the number of BETs and the winning combination (step S222). When it is determined that any of winning combinations has not been established in step S221, or when the processing of step S222 or S223 is executed, the present subroutine is terminated.

[Game Execution Processing B (Insurance Mode/Before Reaching of Notice Set Value)]

Figure 22:
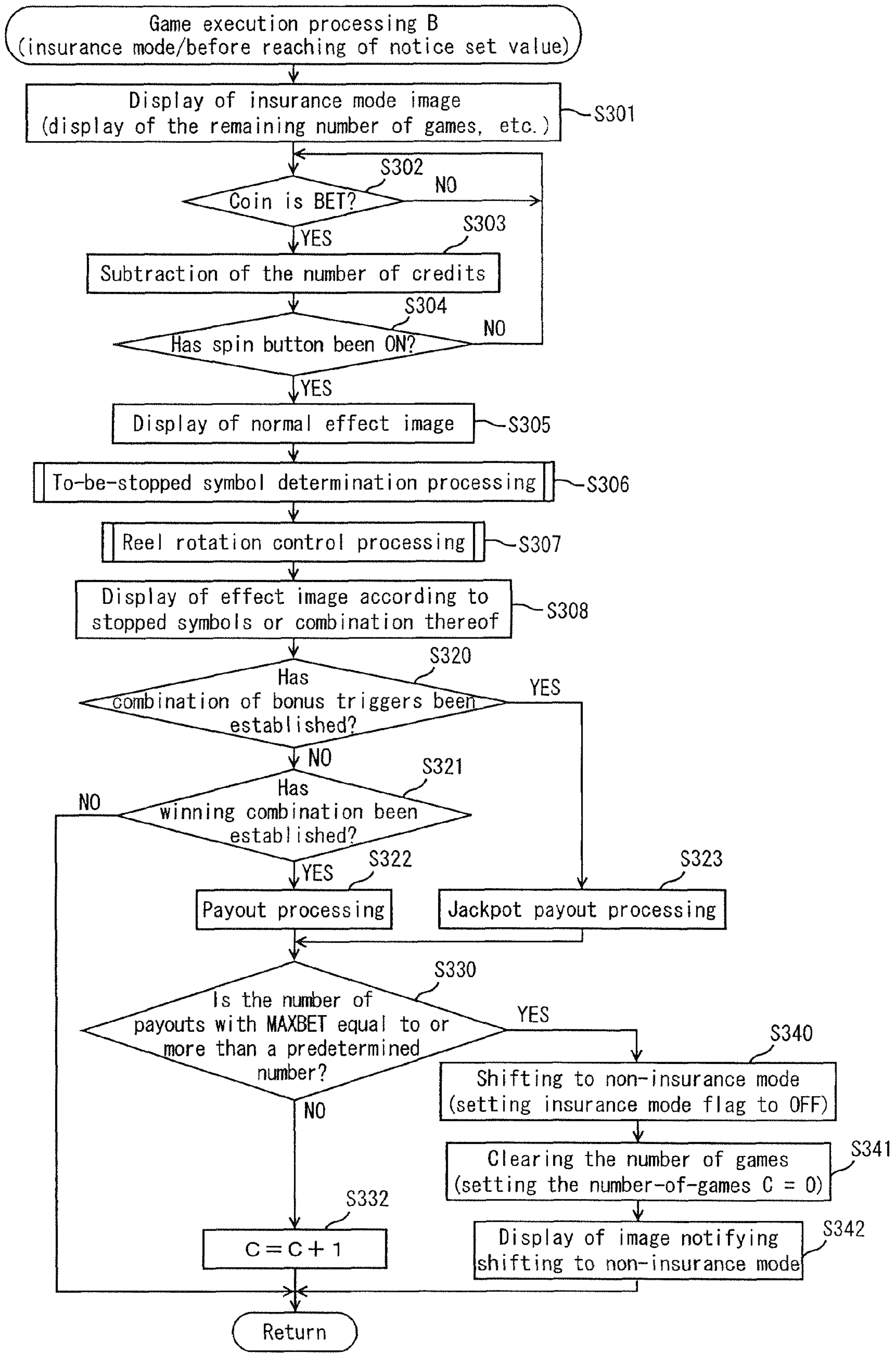
FIG. 22 is a flowchart showing game execution processing B (insurance mode/before reaching of notice set value).

FIG. 22 is a flowchart showing a subroutine of the game execution processing B which is called and executed in step S300 of the subroutine shown in FIG. 20.

First, the main CPU 41 conducts processing for displaying the insurance mode image (see [P03 in FIG. 8]) to the upper image display panel 33 and the lower image display panel 16 (step S301).

Subsequently, processing of steps S302 to S307 are conducted, and the processing are similar to the processing of steps S202 to S207 shown in FIG. 20.

Next, the main CPU 41 displays to the lower image display panel 16 an effect image (see [P04], [P05] in FIG. 8) according to rearranged symbols or a combination thereof (step S308).

Next, the main CPU 41 determines whether or not a combination of bonus triggers has been established (step S320), and when determining that the combination of bonus triggers has been established, the main CPU 41 conducts jackpot payout processing (step S323).

On the other hand, when determining that the combination of bonus triggers has not been established in step S320, the main CPU 41 determines whether or not a winning combination has been established (step S321). When determining that the winning combination has been established, the main CPU 41 pays out coins according to the number of BETs and the winning combination (step S322). When it is determined that any winning combination has not been established in step S321, the processing is shifted to step 330.

When executing the processing of step S322 or S323, the main CPU 41 determines whether or not the current game is a game with a MAXBET and the number of coin-outs in step S322 or step S323 is equal to or more than a predetermined number (180 in the present embodiment) (step S330).

In step S330, when determining that the current game is a game with a MAXBET and the number of coin-outs is not equal to or more than the predetermined number, the main CPU 41 adds the number-of-games C (C=C+1) stored in the RAM 43 (step S332), and ends the present subroutine.

In step S330, when determining that the current game is a game with a MAXBET and the number of coin-outs is equal to or more than the predetermined number (180), the main CPU 41 sets the insurance mode flag stored in the RAM 43 to "OFF", to shift the mode to the non-insurance mode (step S340).

Next, in the storage area of data showing the number-of-games C which is provided in the RAM 43, the main CPU 41 sets the number-of-games C to zero (C=0) so as to clear the number of games (step S341).

Subsequently, the main CPU 41 displays, to the lower image display panel 16, the image 98 (see [P22] in FIG. 16) showing that the mode has been shifted from the insurance mode to the non-insurance mode (step S342), and ends the present subroutine.

[Game Execution Processing C (Insurance Mode/After Reaching of Notice Set Value)]

Figure 23:
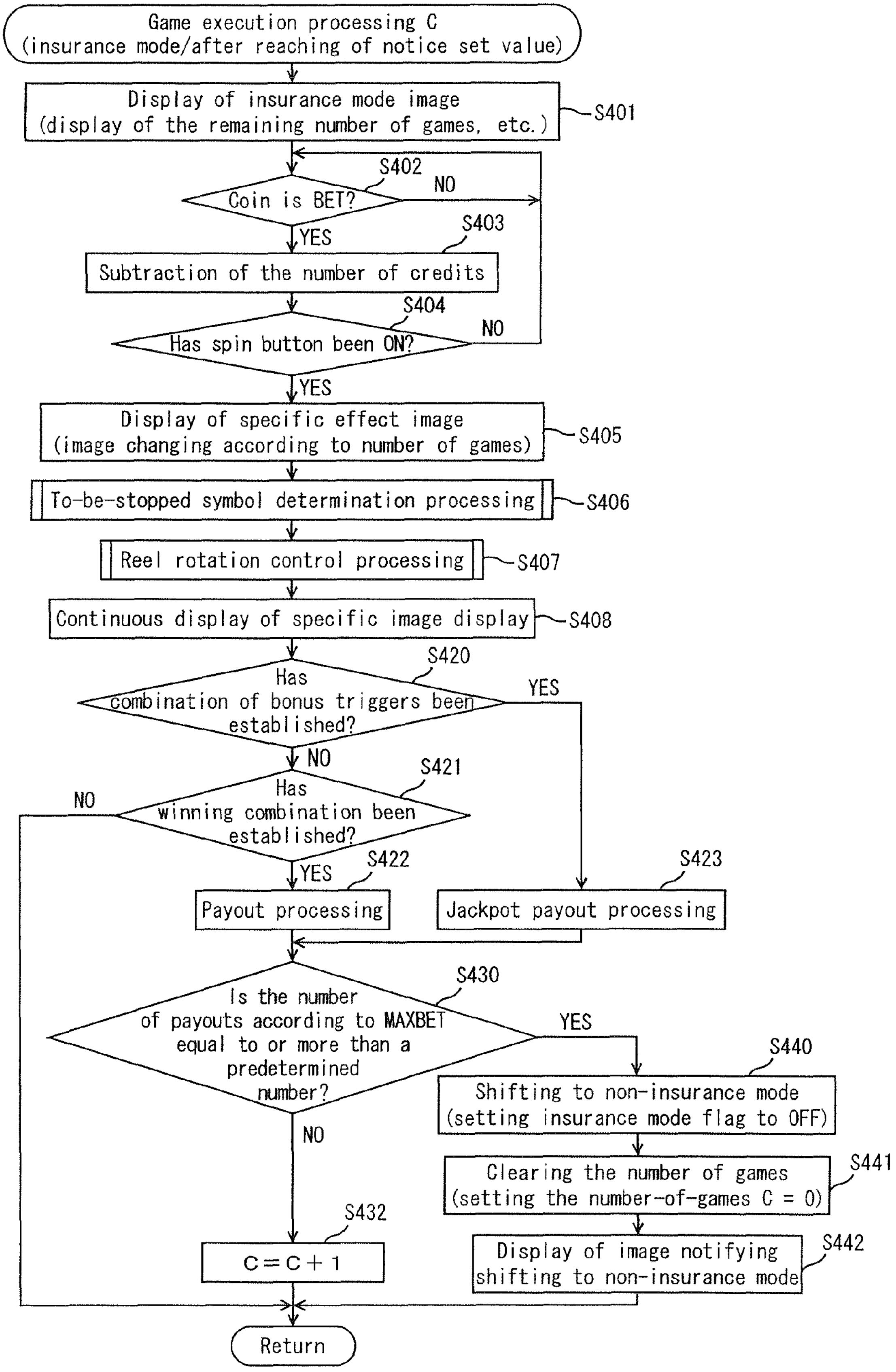
FIG. 23 is a flowchart showing game execution processing C (insurance mode/after reaching of notice set value).

FIG. 23 is a flowchart showing a subroutine of the game execution processing C which is called and executed in step S400 of the subroutine shown in FIG. 20.

First, the main CPU 41 conducts processing for displaying the insurance mode image to the upper image display panel 33 and the lower image display panel 16 (step S301).

Subsequently, processing of steps S402 to S404 are conducted, and the processing of those steps is similar to the processing of steps S202 to S204 shown in FIG. 20.

Next, the main CPU 41 displays specific effect images 95*a* to 95*i* (see [P06] to [P14] in FIGS. 9 to 12) to the lower image display panel 16 (step S405).

As described above, the specific effect image 95 is a video picture of an action of an angel as a character who appears and spreads her wings, and the specific effect images 95*a* to 95*j* are made by dividing the specific effect image 95 into a plurality of images along the time axis.

Therefore, with increase in number of games, the action of the angel as the character who appears and gradually spreads her wings is displayed by the specific effect image 95.

Subsequently, processing for steps S406 and S407 are performed, and the processing of these steps is similar to the processing of steps S206 and S207 shown in FIG. 20.

After the processing of step S407, the main CPU 41 conducts processing for continuously displaying the specific effect image 95 even after rotation of the reels 14 has been stopped (step S408).

It is to be noted that, in the processing shown in FIG. 23, when symbols or a combination thereof, accompanied by coin-outs, is established, the main CPU 41 does not display the effect image 94*e* which is displayed according to the symbols or the combination thereof as shown in [P19] (see FIG. 15). In place of that, the main CPU 41 displays the image 97*c* showing the number of coin-outs according to the symbols or the combination thereof while displaying the specific effect image 95 as shown in [P20] (see FIG. 15).

Thereafter, processing of steps S420 to S423, S430 to S432, and S440 to S442, which correspond to the respective processing of steps S320 to S323, S330 to S332, and S340 to S342 shown in FIG. 21 are carried out.

[Game Execution Processing D (Insurance Mode/at Reaching of Specific Number)]

Figure 24:
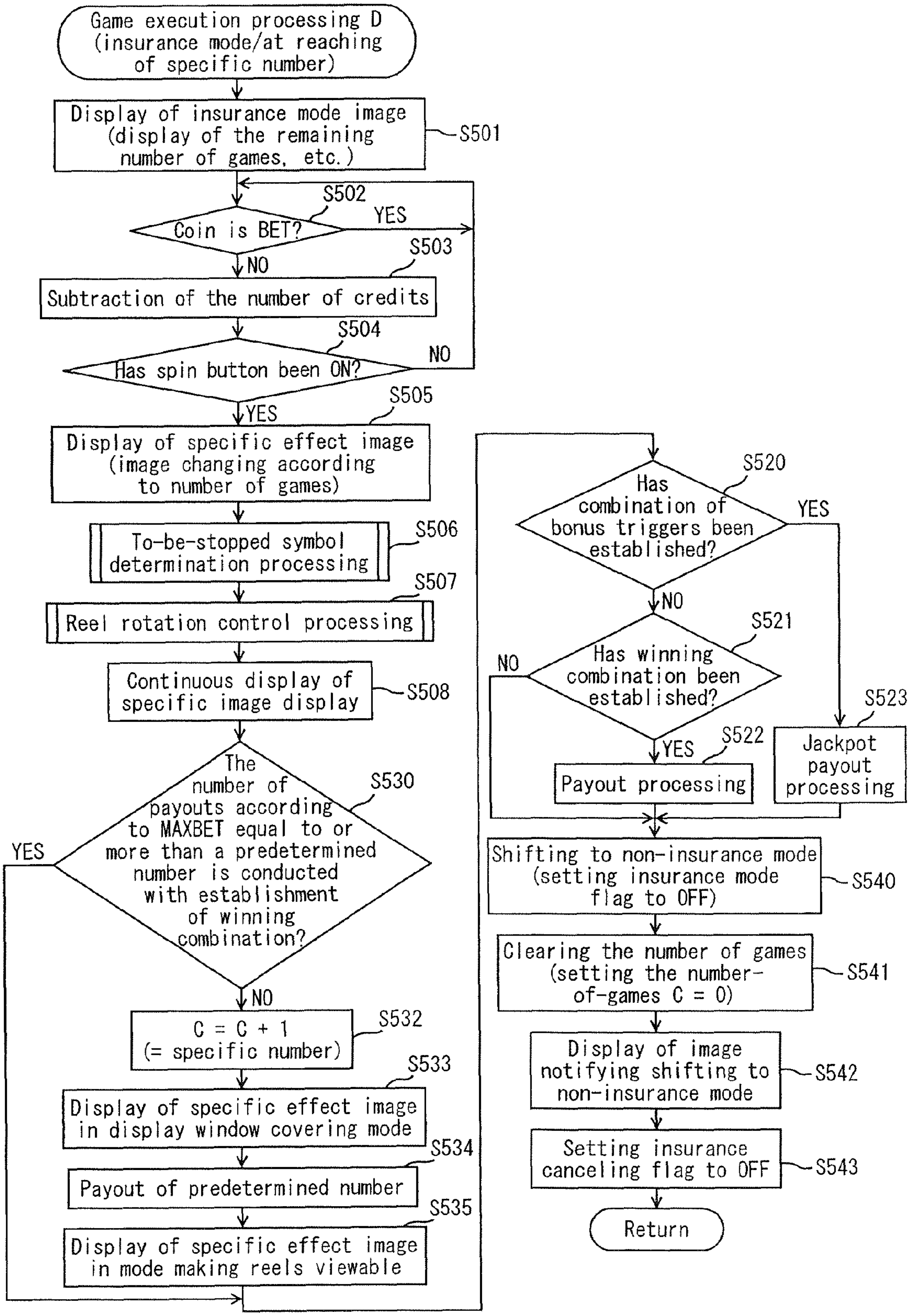
FIG. 24 is a flowchart showing game execution processing D (insurance mode/at reaching of a specific number).

FIG. 24 is a flowchart showing a subroutine of the game execution processing D which is called and executed in step S500 of the subroutine shown in FIG. 20.

First, the main CPU 41 conducts processing for displaying the insurance mode image to the upper image display panel 33 and the lower image display panel 16 (step S501).

Subsequently, processing of steps S502 to S504 are conducted, and the processing of these steps is similar to the processing of steps S202 to S204 shown in FIG. 20.

Next, the main CPU 41 displays a specific effect image 95*j* (see [P15] in FIG. 13) to the lower image display panel 16 (step S505).

The specific effect image 95*j* has contents continued from the specific effect images 95*a* to 95*i*, and displays an action of the angel as the character having spread her wings.

Subsequently, processing of steps S506 to S508 is conducted, and the processing of these steps is similar to the processing of steps S206 to S208 shown in FIG. 20.

After the processing of step S507, the main CPU 41 conducts processing for continuously displaying the specific effect image 95*j* even after rotation of the reels 14 has stopped (step S508).

It is to be noted that in the processing shown in FIG. 24, as in FIG. 23, when symbols or a combination thereof, accompanied by coin-outs (the symbols or a combination thereof with which the number of coin-outs reaches less than the predetermined number), is established, the main CPU 41 displays the image 97*c* showing the number of coin-outs according to the symbols or the combination thereof while displaying the specific effect image 95 as shown in [P20] (see FIG. 15).

Next, the main CPU 41 determines whether or not the current game is a game with a MAXBET and a game where coins are paid out in number equal to or more than a predetermined number (180 in the present embodiment) (step S530)

In step S530, when determining that the current game is a game with a MAXBET and is not a game where coins are paid out in number equal to or more than a predetermined number, the main CPU 41 adds the number-of-games C (=999) (step S532) stored in the RAM 43. Thereby, the number-of-games C reaches the specific number 1000.

Next, the main CPU 41 displays an image shown in [P16] to the upper image display panel 33 and the lower image display panel 16 (step S533).

Namely, the image 97*a* is displayed to the upper image display panel 33, the image 97*a* showing that coins are being paid out based on that the number of games in the insurance mode has reached a specific number, and the similar image 97*b* is also displayed to the lower left side of the lower image display panel 16.

Moreover, the specific effect image 95*h* with contents continued from the specific effect images 95*a* to 95*j* is displayed to the lower image display panel 16. Furthermore, the specific effect image 95*h*' is displayed in the display windows 15 (15L, 15C, 15R).

Subsequently, the main CPU 41 pays out a predetermined number (360 in the present embodiment) of coins while displaying the image shown in [P16] (step S534).

After the processing of step S534, the main CPU 41 stops display of the specific effect image 95*h*' in the display windows 15 while displaying the specific effect image 95*h* to the lower image display panel 16 so as to display the specific effect image 95 in such a manner as to make the reels 14 visible (step S535).

In step S530, when determining that the current game is a game with a MAXBET and a game where the number of coin-outs is equal to or more than the predetermined number, or when executing the processing of step S535, the main CPU 41 determines whether or not a combination of bonus triggers has been established, and when it determines that the combination of bonus triggers is established, the main CPU conducts jackpot payout processing (step S523).

On the other hand, in step S520, when determining that the combination of bonus triggers has not been established, the main CPU 41 determines whether or not a winning combination has been established (step S521), and when determining that the winning combination has been established, the main CPU 41 pays out coins according to the number of BETs and winning combination (step S522).

When determining that the winning combination has not been established in step S521 or executing the processing of step S522 or step S523, the main CPU 41 sets the insurance mode flag stored in the RAM 43 to "OFF" so as to shift the mode to the non-insurance mode(step S540).

Next, in the storage area of data showing the number-of-games C which is provided in the RAM 43, the main CPU 41 sets the number-of-games C to zero (C=0) so as to clear the number of games (step S541)

Subsequently, the main CPU 41 displays, to the lower image display panel 16, the image 98 (see [P18] in FIG. 14) showing that the mode has been shifted from the insurance mode to the non-insurance mode (step S542), and sets the insurance canceling flag to "OFF" (step S543) Thereafter, the present subroutine is terminated.

Further, the payout processing in step S534 and the payout processing in step S522 or S523 are not necessarily performed separately, but may be performed through a single payout processing by accumulating the number of coins to be paid out in advance and paying out the accumulated number of coins to be paid out through a single payout processing.

In the slot machine 10, elapsed time monitoring processing is conducted concurrently with the main processing.

Figure 25:
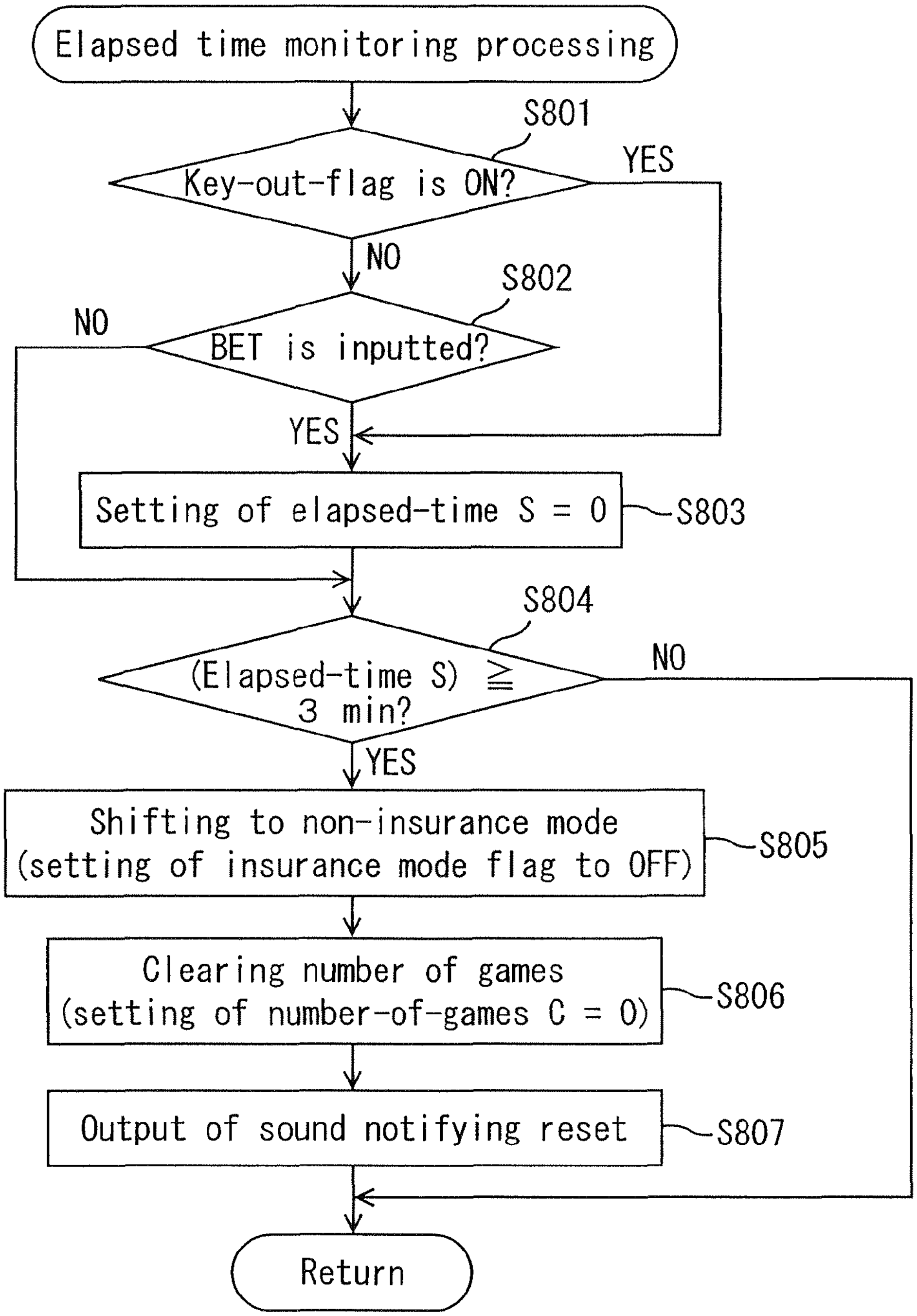
FIG. 25 is a flow chart showing elapsed-time monitoring processing.

FIG. 25 is a flow chart showing elapsed time monitoring processing.

First, the main CPU 41 determines whether or not the key-out-flag is set to "ON" (step S801). When the main CPU 41 determines that the key-out-flag is set to "ON", the main CPU 41 shifts the processing to step S803. On the other hand, when the main CPU 41 determines that the key-out-flag is not set to "ON", the main CPU 41 determines, after having determined that a BET has been last placed, whether or not the BET is further inputted (step S802). When the main CPU 41 determines that the BET is inputted, the main CPU 41 shifts the processing to step S803; meanwhile, when the main CPU 41 determines that the BET is not inputted, the main CPU 41 shifts the processing to step S804.

In step S803, the main CPU 41 sets an elapsed-time S to zero (S=0). Thereafter, the main CPU 41 shifts the processing to step S804.

In step S804, the main CPU 41 determines whether or not the elapsed-time S has reached 3 minutes or more. When the main CPU 41 determines that the elapsed-time S has reached 3 minutes or more, the main CPU 41 sets the insurance-mode flag stored in the RAM 43 to "OFF" to shift to the non-insurance mode (step S805). On the other hand, when the main CPU 41 determines that the elapsed-time S has not reached 3 minutes or more, the main CPU 41 terminates the present subroutine.

Next, the main CPU 41 sets the number-of-games C to zero (C=0) in the storage area of data on the number-of-games C, the storage area being provided in the RAM 43, to clear the number of games (step S806).

Next, the main CPU 41 outputs through the speaker 29 a sound indicating that the mode has been shifted to the non-insurance mode (that the insurance has been reset) (step S807) concurrently with clearing the number of games. At this time, the main CPU 41 also displays an image indicating that the mode has been shifted from the insurance mode to the non-insurance mode, to the lower image display panel 16. After conducting the processing of step S807, the main CPU 41 terminates the present subroutine.

[Activation Processing]

Figure 26:
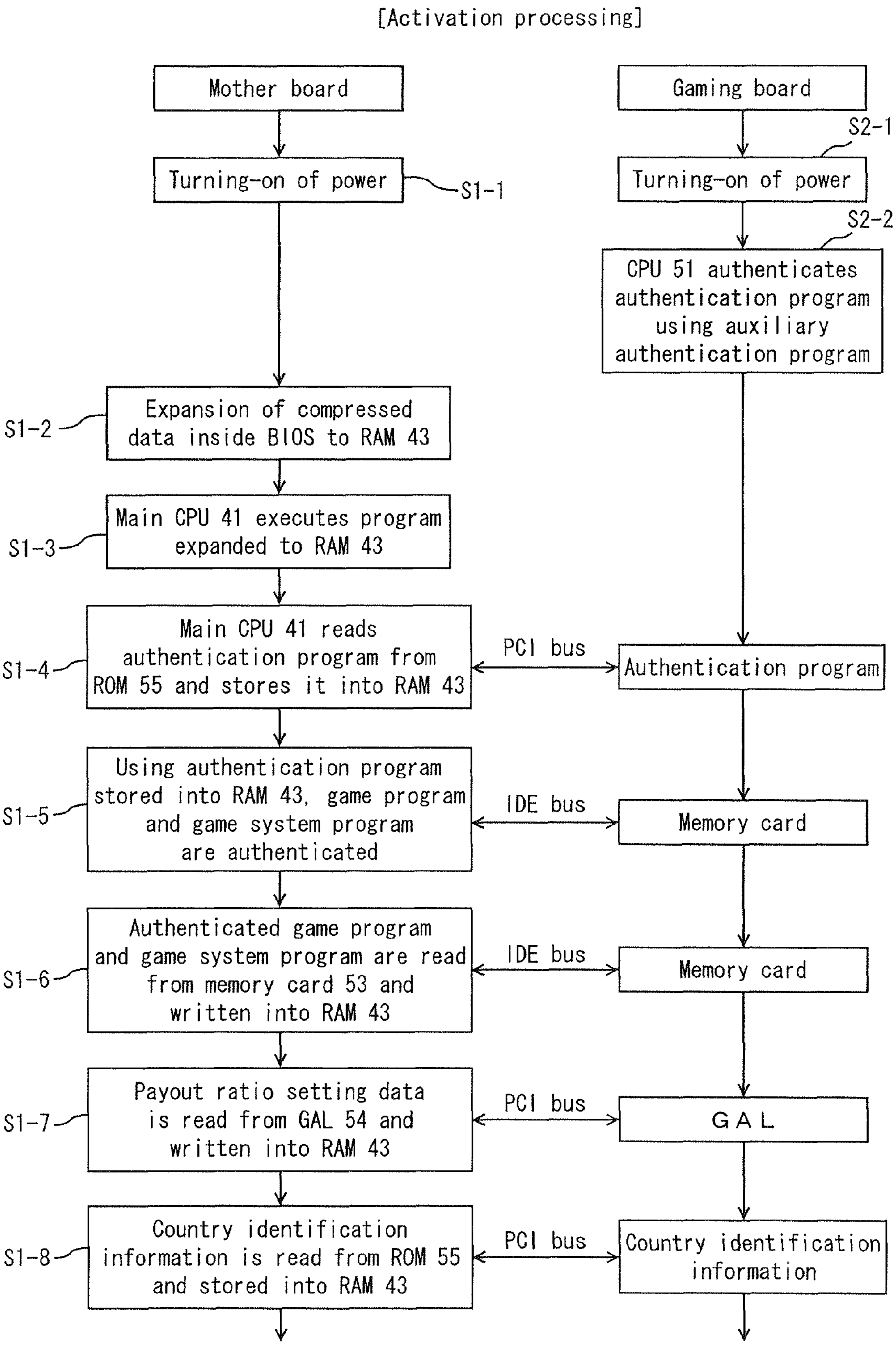
FIG. 26 is a chart showing a procedure of activation processing conducted by the mother board and the gaming board shown in FIG. 2.

FIG. 26 is a flowchart showing a procedure called and executed in step S101 of the flowchart shown in FIG. 20. This activation processing is the processing conducted by the mother board 40 and the gaming board 50. It should be noted that the memory card 53 is inserted into the card slot 53S in the gaming board 50, and the GAL 54 is mounted onto an IC socket 54S.

First, when a power switch is turned on (power is turned on) in the power supply unit 45, the mother board 40 and the gaming board 50 are activated (steps S1-1, S2-1). In activation of the mother board 40 and the gaming board 50, respective individual processing is executed in parallel. Namely, in the gaming board 50, the CPU 51 reads the auxiliary authentication program stored in the boot ROM 52, and conducts auxiliary authentication according to the read auxiliary authentication program, to previously check and prove that the authentication program is not falsified before loading the program to the mother board 40 (step S2-2). Meanwhile, in the mother board 40, the main CPU 41 executes the BIOS stored in the ROM 42, and expands compressed data which is incorporated in the BIOS into the RAM 43 (step S1-2). The main CPU 41 then executes the BIOS expanded into the RAM 43 to diagnose and initialize a variety of peripheral devices (step S1-3).

Since the ROM 55 of the gaming board 50 is connected to the main CPU 41 via the PCI bus, the main CPU 41 reads the authentication program stored in the ROM 55, and stores the read authentication program into the RAM 43 (steps S1-4). At this time, according to the standard BIOS function of BIOS, the main CPU 41 takes a checksum by ADDSUM system (normal checking system) and stores the authentication program into the RAM 43, while conducting processing for confirming whether or not the storage is certainly conducted.

Next, after confirming what is connected to the IDE bus, the main CPU 41 accesses, via the IDE bus, the memory card 53 inserted in the card slot 53S, to read a game program or a game system program from the memory card 53. In this case, the main CPU 41 reads data constituting the game program and the game system program by 4 bytes. Subsequently, the main CPU 41 conducts authentication to check and prove that the read game program and game system program have not been falsified, following the authentication program stored in the RAM 43 (step S1-5). When this authentication processing is normally completed, the main CPU 41 writes and stores the game program and the game system program, which have been the authentication targets (which have been authenticated), into the RAM 43 (step S1-6). Next, the main CPU 41 accesses, via the PCI bus, the GAL 54 mounted on the IC socket 54S, reads payout ratio setting data from the GAL 54, and writes and stores the data into the RAM 43 (step S1-7). Subsequently, the main CPU 41 conducts processing for reading country identification information stored in the ROM 55 of the gaming board 50 via the PCI bus, and writes and stores the read country identification information into the RAM 43 (step S1-8).

After conducting the above-mentioned processing, the main CPU 41 sequentially reads and executes the game program and the game system program, thereby execute the processing of step 101 shown in FIG. 20.

[To-be-stopped Symbol Determination Processing]

Figure 27:
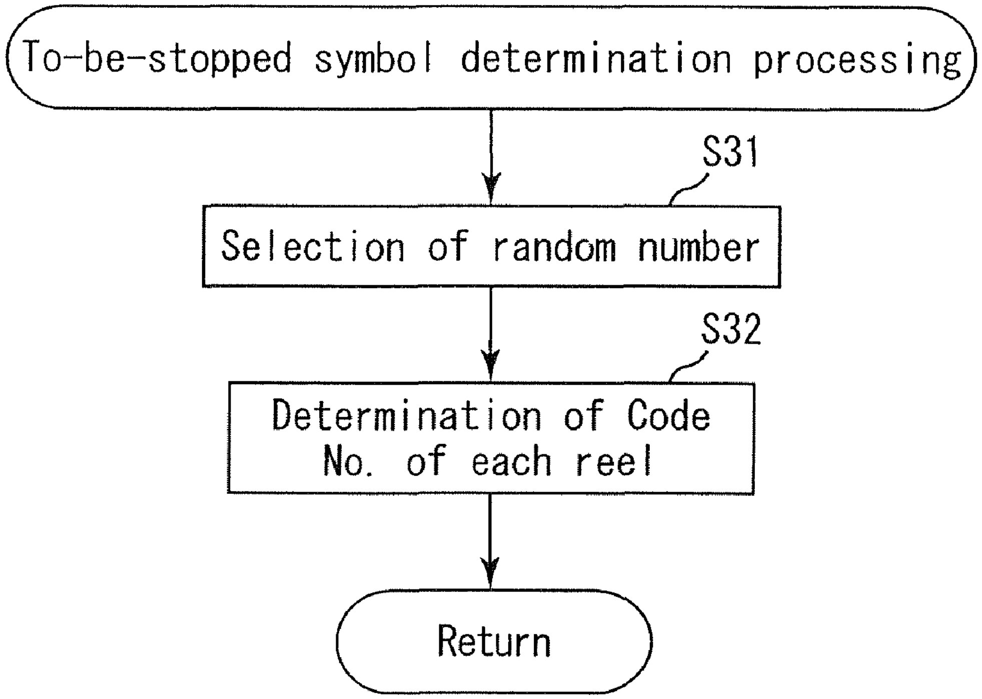
FIG. 27 is a flowchart showing a subroutine of to-be-stopped symbol determination processing.

FIG. 27 is a flowchart showing a subroutine of the to-be-stopped symbol determination processing called and executed in step S206 of the subroutine shown in FIG. 21. This is the processing conducted such that the main CPU 41 executes the to-be-stopped symbol determination program stored in the RAM 43.

First, the main CPU 41 executes a random number generation program included in the to-be-stopped symbol determination program, to select random numbers respectively corresponding to the three reels 14, out of the numbers falling in the numeric range of 0 to 255 (step S31). In the present embodiment, the case of generating random numbers on the program (the case of using a so-called software random number) is described. However, in the present invention, a random number generator may be provided and random numbers may be extracted from the random number generator (a so-called hardware random number may be used).

Next, the main CPU 41 (arithmetic processing unit) determines a code No. (see FIG. 30) of the respective reels 14 based on the selected three random numbers, by referring to symbol weighing data according to the payout ratio setting data outputted from GAL 54 and stored in the RAM 43 (storage device) (step S32). The code Nos. of the respective reels 14 correspond to code Nos. of symbols to be rearranged along the winning line L. It should be noted that later-described reel rotation control processing is conducted based on these code Nos. of the reels.

[Reel Rotation Control Processing]

Figure 28:
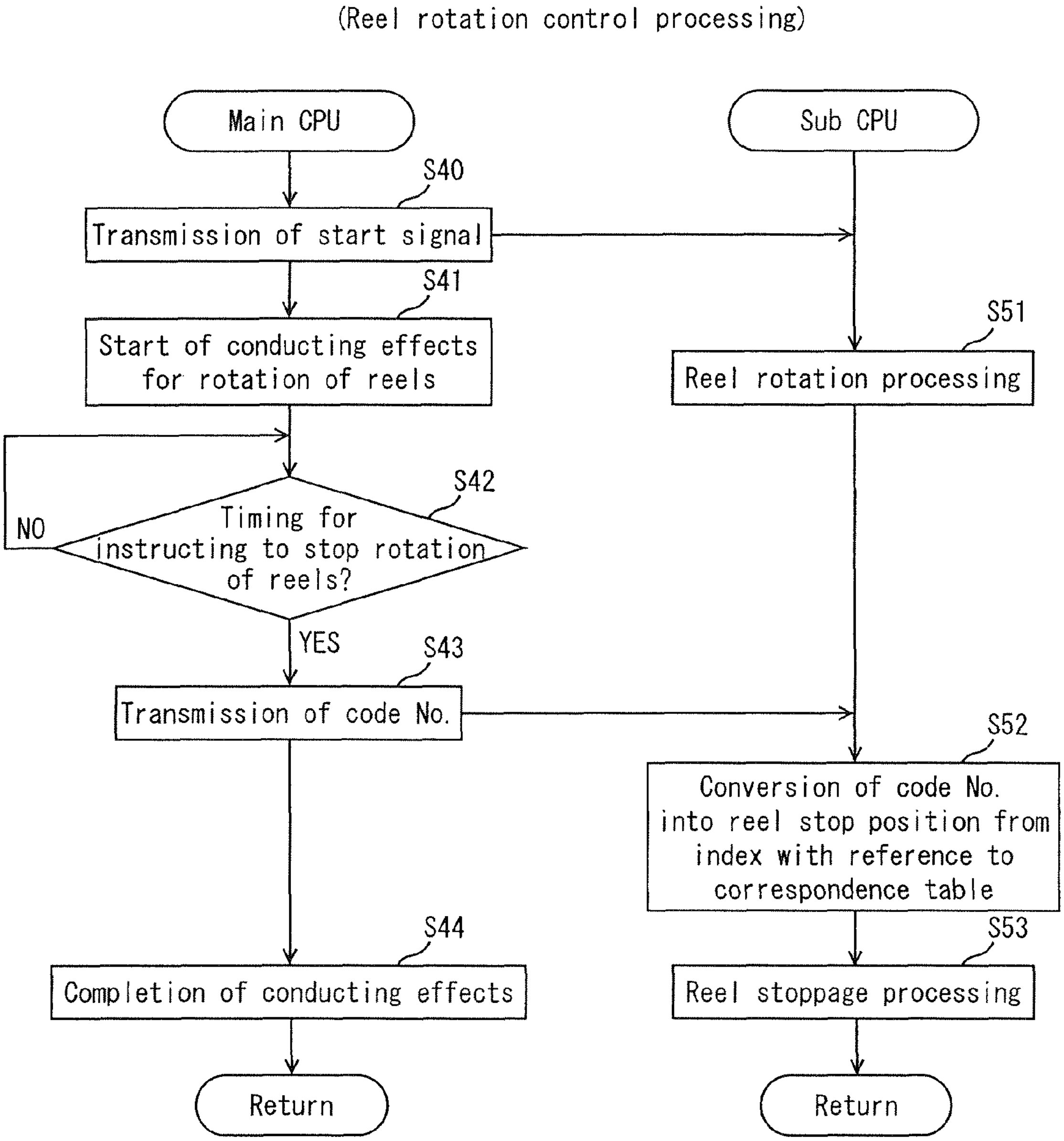
FIG. 28 is a flowchart showing a subroutine of reel rotation control processing.

FIG. 28 is a flowchart showing the reel rotation control processing called and executed in step S207 of the subroutine shown in FIG. 21. It is to be noted that this is the processing conducted between the main CPU 41 and the sub CPU 61.

First, the main CPU 41 transmits to the sub CPU 61 a start signal to start rotation of the reels (step S40). Upon receipt of the start signal from the main CPU 41, the sub CPU 61 conducts the reel rotation processing (step S51). In this processing, the sub CPU 61 supplies a pulse to the motor driving circuit 62. The pulse outputted from the sub CPU 61 is amplified by the driver 64, and then supplied to each of the stepping motors 70 (70L, 70C, 70R). This results in rotation of each of the stepping motors 70, along with which each of the reels 14 (14L, 14C, 14R) is rotated. In the one-two phase excitation stepping motor 70, a step angle is 0.9 degrees and the number of steps per rotation is 400. Therefore, when 400 pulses are supplied to the stepping motor 70, the reel 14 rotates one turn.

In starting rotation of the reels 14, the sub CPU 61 supplies a low frequency pulse to the motor driving circuit 62, and gradually increases the pulse frequency. Along with this, a rotational speed of the reels 14 increases. After a lapse of a predetermined period of time, the pulse frequency is made constant. This results in rotation of the reel 14 at a constant speed.

Here, the rotational operation of the reel 14 is described by using FIGS. 29A to 29D.

FIGS. 29A to 29D are side views for explaining the rotational operation of the reel 14.

Figure 29A:
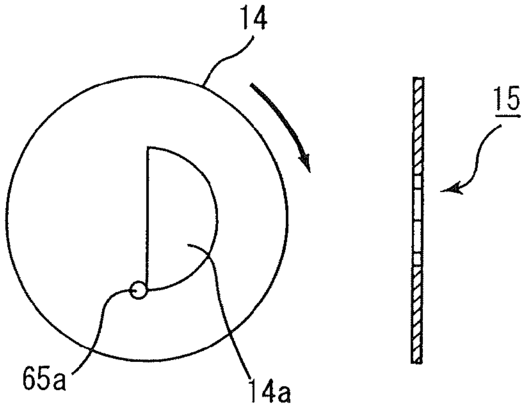
FIGS. 29A to 29D are side views for explaining the reel rotating operation.

As shown in FIG. 29A, a semicircular metal plate 14*a* is provided on the side face of the reel 14. The metal plate 14*a* is rotated along with the reel 14. Further, 22 symbols are provided on the peripheral face of the reel 14. Three symbols out of the 22 symbols drawn on the peripheral face of the reel 14 become visually identifiable via the display window 15 formed in front of the reel 14. In the figure, heavy-line arrows indicate the rotational direction of the reel 14. Further, an adjacent sensor 65*a* is provided on the side face of the reel 14. The adjacent sensor 65*a* is for detecting the metal plate 14*a*. The adjacent sensor 65*a* does not move or rotate along with rotation of the reel 14.

Figure 29B:
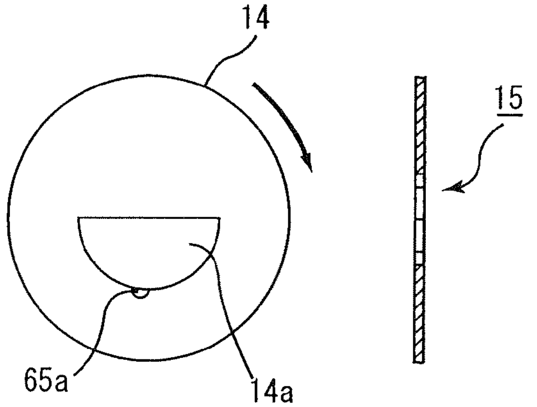
Figure 29C:
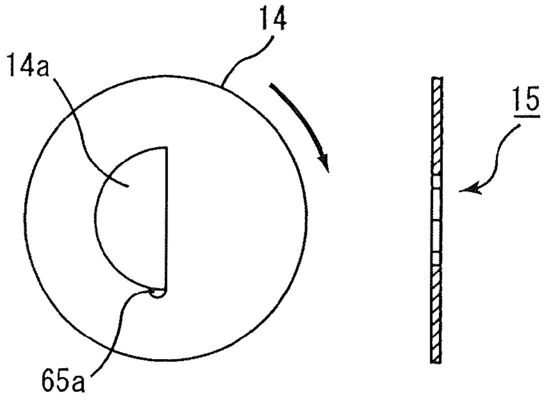

FIG. 29A shows a position (hereinafter also referred to as position A) of the metal plate 14*a* at the time point when the adjacent sensor 65*a* starts detecting the metal plate 14*a*. When the reel 14 rotates with the metal plate 14*a* located in the position A, the metal plate 14*a* moves to a position shown in FIG. 29B. FIG. 29B shows a position (hereinafter also referred to as position B) of the metal plate 14*a* when the adjacent sensor 65*a* is detecting the metal plate 14*a*. When the reel 14 rotates with the metal plate 14*a* located in the position B, the metal plate 14*a* moves to a position shown in FIG. 29C. FIG. 29C shows a position (hereinafter also referred to as position C) of the metal plate 14*a* at the time point when the adjacent sensor 65*a* stops detecting the metal plate 14*a*.

Figure 29D:
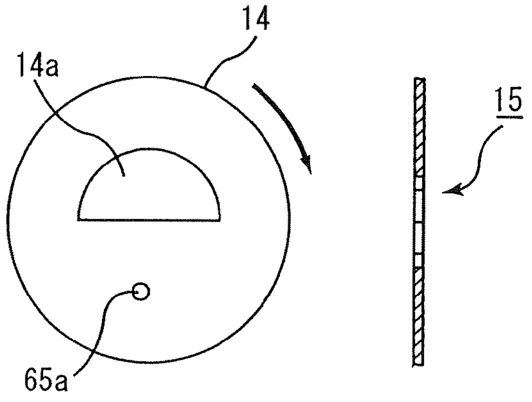

When the reel 14 rotates with the metal plate 14*a* located in the position C, the metal plate 14*a* moves to a position shown in FIG. 29D. FIG. 29D shows a position (hereinafter also referred to as position D) of the metal plate 14*a* when the adjacent sensor 65*a* is not detecting the metal plate 14*a*. When the reel 14 rotates with the metal plate 14*a* located in the position D, the metal plate 14*a* returns to the position A. As thus described, the position of the metal plate 14*a* changes sequentially from the position A, the position B, the position C, the position D, the position A, and so forth, along with rotation of the reel 14.

The adjacent sensor 65*a* constitutes the index detecting circuit 65 (see FIG. 5). Assuming that the state where the adjacent sensor 65*a* is detecting the metal plate 14*a* is referred to as "High" and the state where the adjacent sensor 65*a* is not detecting the metal plate 14*a* is referred to as "Low", the index detecting circuit 65 is in the "High" state when the metal plate 14*a* is located in the position A→the position B→the position C, and the index detecting circuit 65 is in the "Low" state when the metal plate 14*a* is located in the position C→the position D→the position A. It is to be noted that the sub CPU 61 identifies the rotational position of the reel 14 such that a leading edge from "Low" to "High" as index (original point) 1 and a falling edge from "High" to "Low" as index (original point) 2.

After transmitting a start signal to the sub CPU 61 in step S40, the main CPU 41 executes effects in rotation of the reels (step S41). This is the processing for displaying an image to the lower image display panel 16, outputting sound from the speaker 29, and the like, during a period (e.g. 3 seconds) set according to a result of the to-be-stopped symbol determination processing (FIG. 21, step S206) or the like.

Next, the main CPU 41 determines whether or not the current time point is the timing for instructing to stop rotation of the reels 14 (step S42).

Here, the timing for instructing to stop rotation of the reels 14 is the timing before the time point of stopping the performance of effects in rotation of the reels only by the minimum time required for stopping rotation of the reels 14. It is to be noted that the minimum time required for stopping rotation of the reels 14 is previously set.

In step S42, when determining that the current time point is not the timing for instructing to stop rotation of the reels 14, the main CPU 41 returns the processing to step S42, and continuously executes the performance of effects in rotation of the reels. On the other hand, when determining that the current time point is the timing for instructing to stop rotation of the reels 14 in step S42, the main CPU 41 transmits code No. stored in the RAM 43 to the sub CPU 61 (step S43). Upon receipt of code No. of the reels from the main CPU 41, the sub CPU 61 converts code No. into the stop position (the number of steps) of each reel from the index, based on the correspondence table of the number of steps stored in ROM (not shown) comprised in CPU 61 and code No. (step S52).

FIG. 30 is a schematic view showing a correspondence table of the number of steps and code No. Each code No. is corresponded to index and the number of steps.

It should be noted that each code No. corresponds to a symbol drawn on the peripheral face of the reel 14. Symbols of code No. "00" to "10" correspond to index 1. Symbols of code No. "11" to "21" correspond to index 2. Further, the numbers of steps in the correspondence table shown in FIG.

30 are the numbers of steps set with index 1 as a reference. For example, when code No. is "08", a position 145 steps from index 1 is the stop position of the reel. Further, when code No. is "12", a position 218 steps from index 1 is the stop position of the reel.

Next, the sub CPU 61 executes a reel stoppage processing (step S53). In this processing, the sub CPU 61 detects the leading edge (index 1) from "Low" to "High" of each reel 14 in the index detecting circuit 65, and supplies the index detecting circuit 65 with pulses corresponding to the number of steps into which code No. has been converted in step S52, at the timing of detecting index 1, and thereafter, the supply of the pulse is stopped.

For example, when it is determined that the stop position of the reel is a position 145 steps from index 1 in step S52, the sub CPU 61 supplies the index detecting circuit 65 with 145 pulses at the timing of detecting index 1, and then stops the supply of the pulse. Further, in step S52, when it is determined that the stop position of the reel is a position 218 steps from index 1, the sub CPU 61 supplies the index detecting circuit 65 with 218 pulses at the timing of detecting index 1. As a result, the reels 14 stop with the code numbers as determined in step S32 in FIG. 27, and a combination of symbols corresponding to the winning combination determined in step S32 in FIG. 27 is rearranged along the winning line L. Meanwhile, the main CPU 41 ends the performance of effects in rotation of the reels. After completing the processing of steps S44 and S53, the present processing is terminated.

It is to be noted that, when index corresponding to code No. transmitted in step S43 differs from index detected by the index detecting circuit 65 in stopping rotation of the reels 14, a loss of synchronism has occurred in the reels 14, and therefore, the main CPU 41 conducts processing for displaying an error message to the lower image display panel 16, or the like, to discontinue the game.

For example, when the index 1 is detected by the index detecting circuit 65 in stopping rotation of the reels 14 although the main CPU 41 conducts the processing for stopping reels 14 at code No. 12 which is corresponding to index 2, the game is discontinued.

In the above-described embodiment, a case has been described where the gaming machine in the present invention is a slot machine. However, the gaming machine in the present invention is not limited to this example. For example, the gaming machine may be the one offering a video poker game, a roulette game; or further, it may be the one offering a game in which the player controls a character and has the character to fight against another character (e.g., a baseball game, a soccer game, and a fighting game such as a boxing game).

In the above-described embodiment, a case has been described where the number-of-games C is cleared when the elapsed-time T1 exceeds 30 minutes (the first predetermined time). More specifically, in the above-described embodiment, the history of games in the first aspect of the present invention is the number of games. However, the history of games in the first aspect of the present invention is not limited to the number of games.

Examples of the history of games include the number of player's lost games in the case that the gaming machine offers a poker game. In this case, for example, if a configuration is adopted in which a predetermined number of game media are paid out when the number of player's lost games reaches a specific number, the player can leave the gaming machine at ease for a break or the like, even when the number of player's lost games is approaching the specific number. Further, for example, in the case that the gaming machine offers a bingo game, the history of games may be the winning numbers that have been determined until then. In this case, the player can restart forming the rest of the bingo pattern to be formed thereon. Furthermore, as another example, in the case that the gaming machine offers a fighting game, the history of games may be the data according to the intermediate fighting result; then, the player can leave the gaming machine at ease even when he or she is in the middle of fighting.

In the above-described embodiment, although a case has been described where each slot machine 10 has unique gaming machine identification data (GMID data), the identification information in the first aspect of the present invention may not be necessarily unique to each slot machine. For example, a gaming machine in another recreation facility may have identification information same as that of the gaming machine in this recreation facility, so long as each gaming machine has identification information different from each other in one recreation facility. Even with such a configuration, the player can prevent other players from playing games on this gaming machine.

Although a case has been described where the reserve key 112 is inserted into the reserve key slot 110*a* in the above-described embodiment, the key configuration of the first aspect of the present invention is not particularly limited so long as it is removable; for example, a configuration may be adopted in which the key is mounted onto a rectangular pedestal with a data reading device embedded therein.

In the above-described embodiment, the case has been described where the IC chip 112*a* storing GMID data is embedded in the reserve key 112, and it is determined that the reserve key 112 is not removed when the GMID data corresponding to each slot machine 10 is readable. However, the key in the first aspect of the present invention may be a physical key; if such a physical key is adopted, a cylinder that the key can be inserted and removed may be provided in the gaming machine. Then, it will be determined that the key is inside when the key is inserted into the cylinder or when the key inserted into the cylinder is turned to a predetermined direction, and it will be determined that the key is out when the key is removed from the cylinder.

As described above, the slot machine according to one embodiment of the first aspect of the present invention has been described in detail.

Next, detailed descriptions of the slot machine according to one embodiment of the second aspect of the present invention will be given.

The slot machine according to one embodiment of the second aspect of the present invention has the schematic views (see FIG. 3 and FIG. 4) and the circuit structure (see FIG. 5) that are substantially the same as those in the slot machine 10 according to one embodiment of the first aspect of the present invention, except that the reserve key reader 110 and the reserve key 112 are not provided. As for the flowcharts, they are substantially the same as the flowcharts for the slot machine 10 according to one embodiment of the first aspect of the present invention except that the card in/out monitoring processing is executed instead of the reserve key in/out monitoring processing (see FIG. 1 and FIG. 17). Therefore, descriptions for the configurations and the processing that are the same as those in the slot machine 10 according to one embodiment of the first aspect of the present invention will be omitted. Further, constituents corresponding to those of the slot machine 10 according to one embodiment of the first aspect of the present invention are provided with the same signs as in the slot machine 10 according to one embodiment of the first aspect of the present invention.

Figure 31:
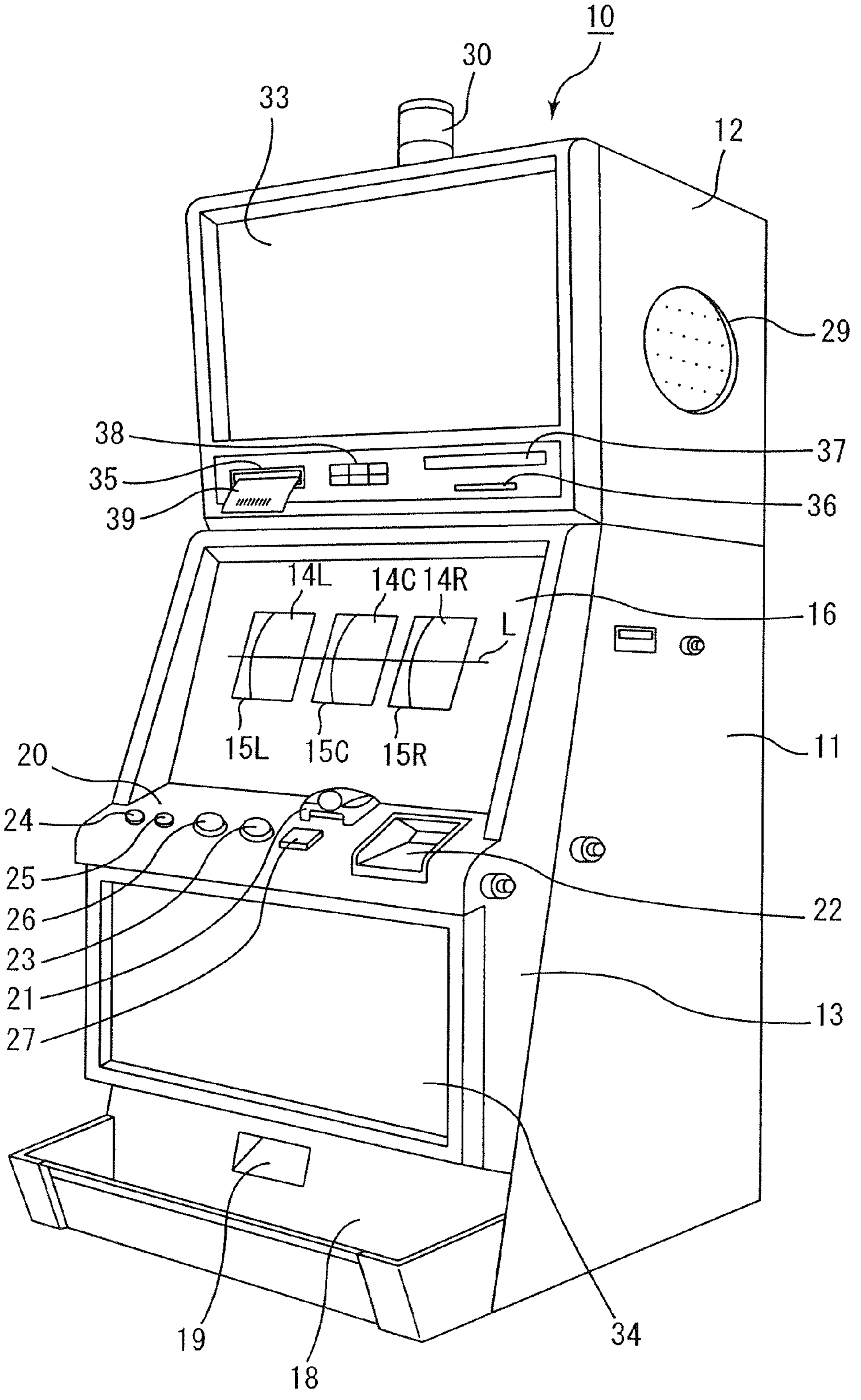
FIG. 31 is a perspective view schematically showing a slot machine according to one embodiment of a second aspect of the present invention.

FIG. 31 is a perspective view schematically showing a slot machine according to one embodiment of the second aspect of the present invention.

Figure 32:
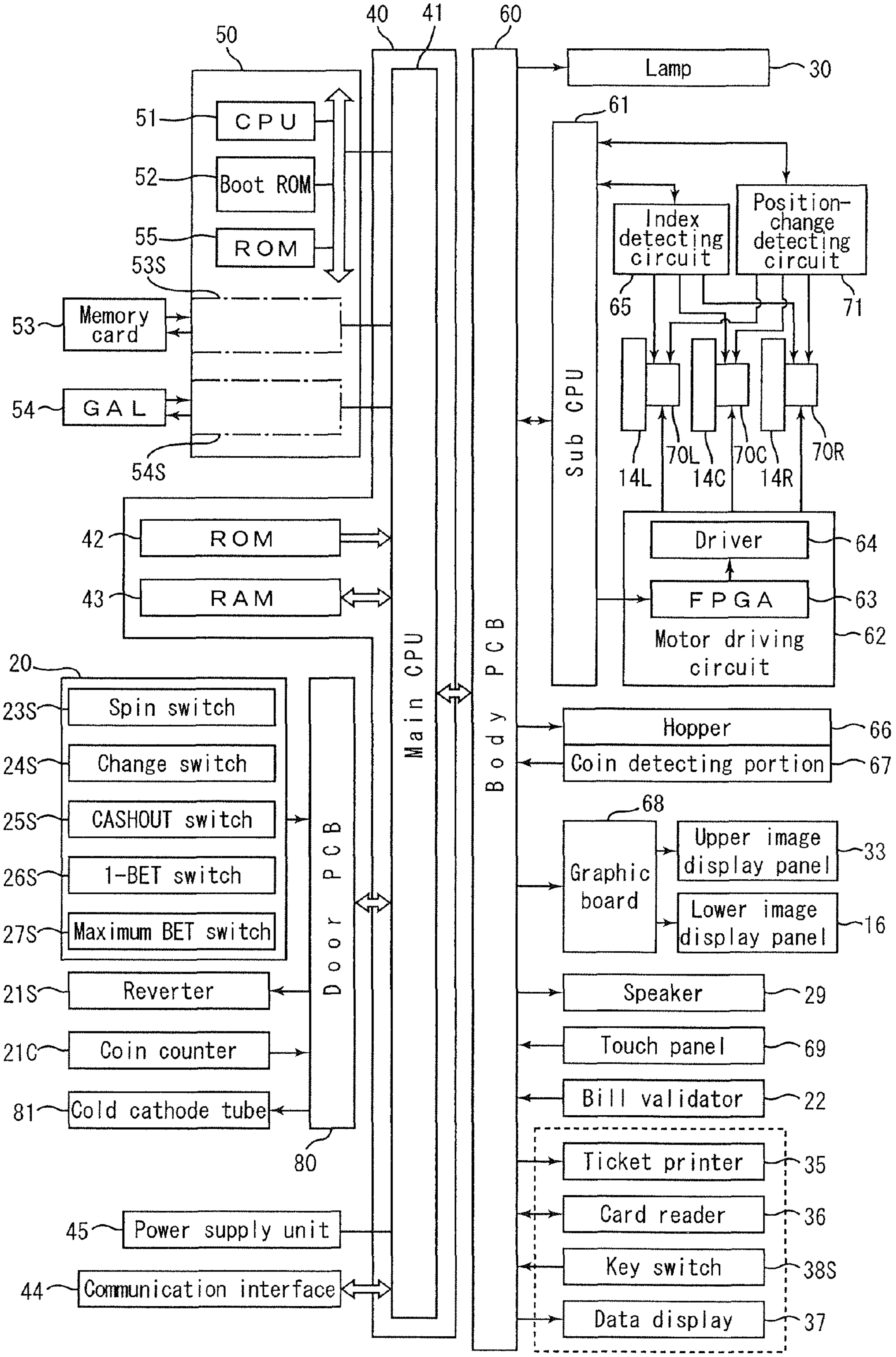
FIG. 32 is a block diagram showing the internal configuration of the slot machine shown in FIG. 31.

FIG. 32 is a block diagram showing the internal configuration of the slot machine shown in FIG. 31.

As described above, the slot machine 10 according to one embodiment of the second aspect of the present invention has the schematic views (see FIG. 3 and FIG. 4) and the circuit structure (see FIG. 5) that are substantially the same as those in the slot machine 10 according to one embodiment of the first aspect of the present invention, except that the reserve key reader 110 and the reserve key 112 are not provided; and since the constituents shown in FIG. 31 and FIG. 32 have been already described by using FIG. 3, FIG. 4, and FIG. 5, descriptions thereof will be omitted here.

Here, only the points different from the slot machine 10 according to one embodiment of the first aspect of the present invention will be described.

The main CPU 41 determines whether or not the smart card is inserted into the card slot 36*a*, every time a game is played. When determining that the smart card is not inserted, the main CPU 41 executes the card-out-time processing (see FIG. 34) and then executes again the processing for determining whether or not the smart card is inserted.

On the other hand, when determining that the smart card is inserted into the card slot 36*a*, the main CPU 41 executes the key-in-time processing (see FIG. 35) and then executes the game, except for a specific case. The specific case is the case where it is determined that ID data, which is different from the ID data read before interruption of the game, is read when the smart card is inserted into the slot machine in the game interrupted state. In the specific case, the main CPU 41 outputs a predetermined message and executes the processing for determining whether or not the smart card is inserted.

The card reader 36 corresponds to the reading device in the present invention.

The touch panel 69 corresponds to the input device with which interruption of the game or end of the game is to be inputted.

The smart card corresponds to the player information storage medium in the second aspect of the present invention.

Figure 33:
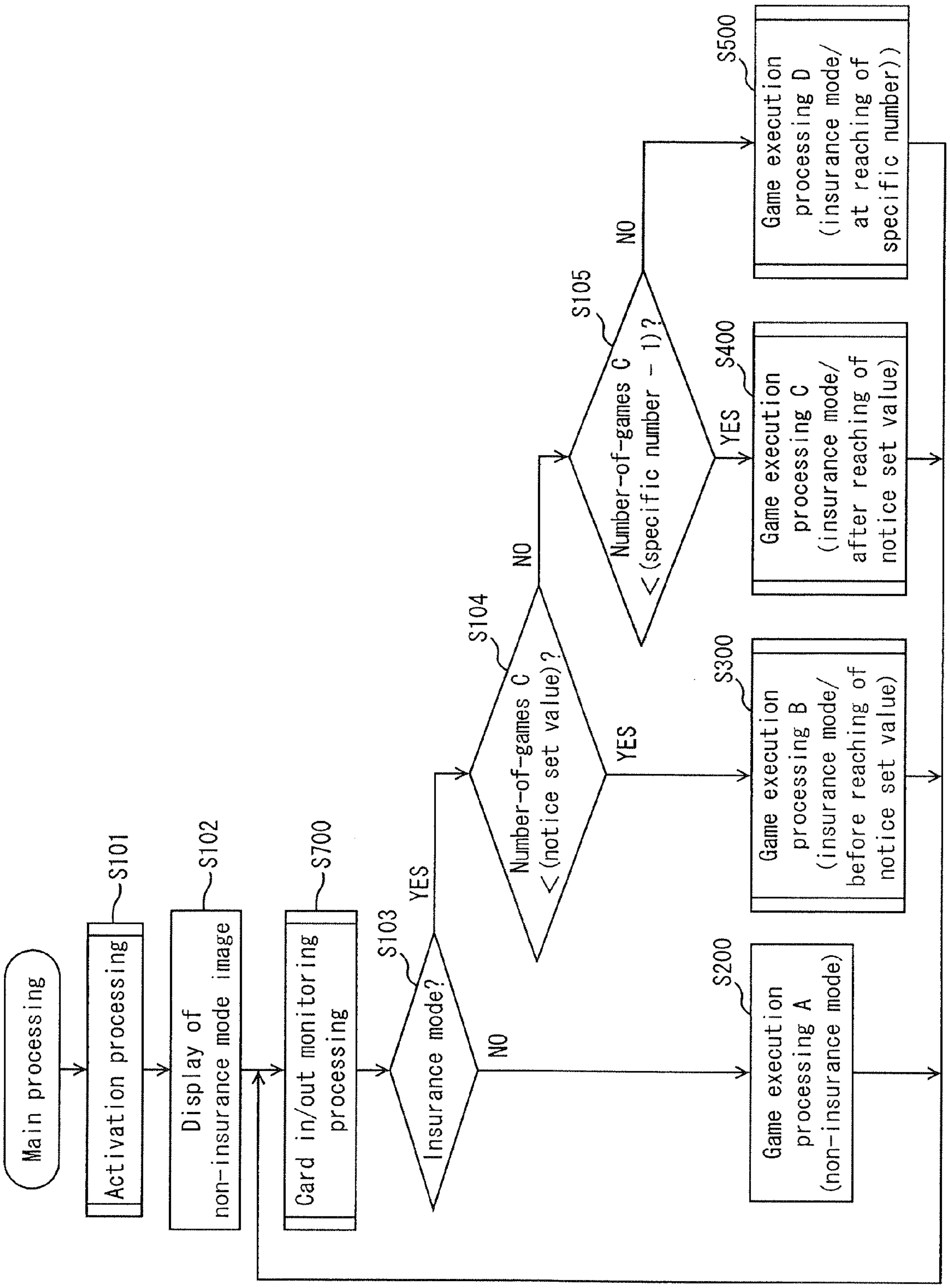
FIG. 33 is a flowchart showing main processing executed in the slot machine shown in FIG. 31.

FIG. 33 is a flowchart showing main processing executed in the slot machine shown in FIG. 31.

Since the processing for step S101 and step S102 has been already described by using FIG. 17, descriptions thereof will be omitted here.

After the processing of step S102, the main CPU 41 executes the card in/out monitoring processing (step S700). Since the card in/out processing has been already described by using FIG. 2, descriptions thereof will be omitted here. After the processing of step S700, the main CPU 41 shifts the processing to step S103.

The processing of step S103 to step S105, step S200, step S300, step S400, and step S500 has been already described by using FIG. 17, and descriptions thereof will be omitted here.

Figure 34:
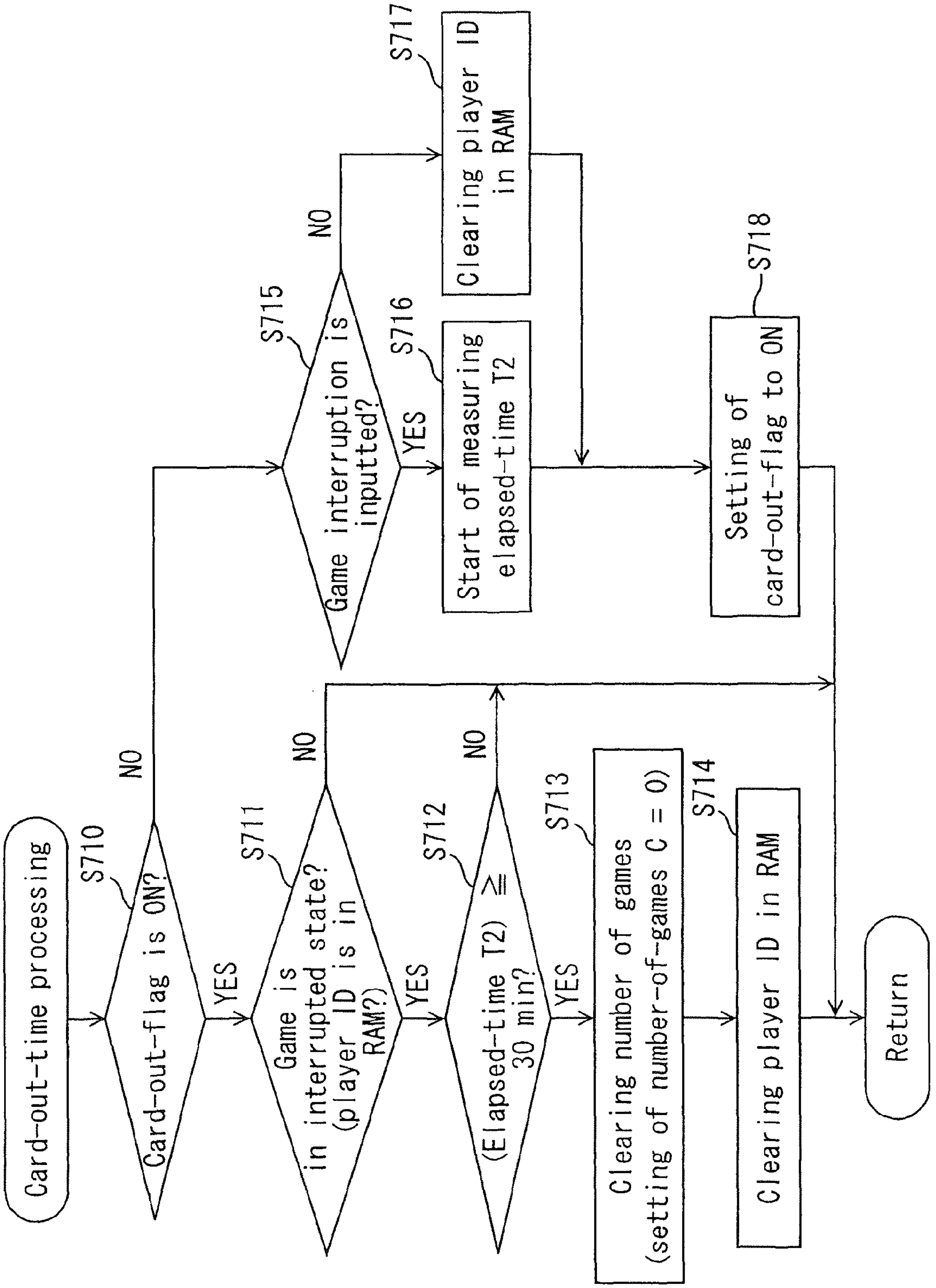
FIG. 34 is a flowchart showing a subroutine of card-out-time processing executed in the slot machine shown in FIG. 31.

FIG. 34 is a flow chart showing a subroutine of card-out-time processing executed in the slot machine shown in FIG. 31.

First, the main CPU 41 determines whether or not a card-out-flag is set to "ON" (step S710). The card-out-flag is set to "ON" when it is determined that the smart card is not inserted into the card slot 36*a*, and set to "OFF" when it is determined that the smart card is inserted into the card slot 36*a*. The main CPU 41 shifts the processing to step S711 when determining that the card-out-flag is set to "ON", while shifting the processing to step S715 when determining that the card-out-flag is not set to "ON".

The main CPU 41 determines in step S711 whether or not the game is interrupted. In the processing, the main CPU 41 determines that the game is interrupted when the player ID is stored in the RAM 43, and the main CPU 41 determines that the game is not interrupted (the game is ended) when the player ID is not stored in the RAM 43.

In the second aspect of the present invention, "the game is interrupted" implies that the player who has last played the game on this gaming machine is not currently playing the game, but he or she intends to restart playing the game on this gaming machine later. Further, "the game is ended" implies that the player who has last played the game on this gaming machine is not currently playing the game and not intending to restart playing the game on this gaming machine any more.

In the present embodiment, this slot machine 10 is turned to the state in which "the game is interrupted" if the player inputs interruption of the game when removing the smart card. Further, this slot machine 10 is turned to the state in which "the game is ended" if the player does not input interruption of the game (or if the player inputs end of the game) when removing the smart card.

Although more specific descriptions will be given later, the player ID read from the smart card at start of the game is stored into the RAM 43 in the present embodiment (see step S739 in FIG. 35). If interruption of the game is inputted thereafter, the player ID read at start of the game is not cleared but kept in the RAM 43. On the other hand, if interruption of the game is not inputted (or if the player inputs an end of the game), the player ID read at start of the game is cleared (see step S711 in FIG. 34). More specifically, when the smart card is removed in the present embodiment, it is determined that the game is interrupted if the player ID is stored in the RAM 43, and it is determined that the game is ended if the player ID is not stored in the RAM 43.

When determining instep S711 that the game is interrupted, the main CPU 41 determines whether or not the elapsed-time T2 has reached 30 minutes (the third predetermined time) or more (step S712). The elapsed-time T2 corresponds to the elapsed time in the second aspect of the present invention. When the main CPU 41 determines that the elapsed-time T2 has reached 30 minutes or more, the main CPU 41 clears the number of games by setting the number-of-games C to zero (C=0) in the storage area of data on the number-of-games C, the storage area being provided in the RAM 43 (step S713). Next, in step S714, the main CPU 41 clears the player ID stored in the RAM 43.

When determining in step S711 that the game is not interrupted, when determining instep S712 that the elapsed-time T2 has not reached 30 minutes or more, or after the processing of step S714, the main CPU 41 terminates the present subroutine.

In step S715, the main CPU 41 determines whether or not interruption of the game is inputted. In the processing of step S715, the main CPU 41 first executes the processing for displaying an image for inputting interruption of the game to the lower image display panel 16, concurrently with accepting the input of interruption of the game via a touch panel 69 for a predetermined period (1 minute in the present embodiment). When interruption of the game is inputted before the predetermined period elapses, the main CPU 41 determines that the game interruption input is entered. Meanwhile, when interruption of the game is not inputted before the predetermined period elapses, the main CPU 41 determines that the game interruption input is not entered. The main CPU 41 shifts the processing to step S716 when determining in step S715 that the game interruption is inputted, while shifting the processing to step S717 when determining in step S715 that the game interruption is not inputted. It is to be noted that the main CPU 41 shifts the processing to step S716 even if the predetermined period (1 minute) has not elapsed, when interruption of the game is inputted during the predetermined period.

Further, a configuration may be adopted in which the main CPU 41 shifts the processing to step S717 even if the predetermined time (1 minute) has not elapsed, when end of the game is inputted.

In step S716, the main CPU 41 starts measuring the elapsed-time T2.

In step S717, the main CPU 41 clears the player ID stored in the RAM 43.

After the processing of step S716, or after the processing of S717, the main CPU 41 sets the card-out-flag to "ON" and terminates the present subroutine.

As just described, in the card-out-time processing, the number of games counted is cleared when the elapsed-time T2 since last input of interruption of the game reaches the third predetermined time (30 minutes) or more. Accordingly, the player having inputted interruption of the game and left the slot machine 10 must return to the slot machine 10 to make the game executable (to make the player ID in the smart card readable by the card reader 36) within 30 minutes (the third predetermined time), in order that the number of games may not be cleared. As a result, it is possible to improve the operating efficiency of the slot machine 10.

Moreover, the player having inputted interruption of the game and left the slot machine 10 can start the game from the state before leaving the slot machine 10 without the number of games being cleared, so long as the player makes the game executable within 30 minutes (the third predetermined time). As a result, a player who desires to acquire coins to be paid out by the number of games reaching the specific number can leave the slot machine 10 at ease for the restroom, a break or the like during the game.

Figure 35:
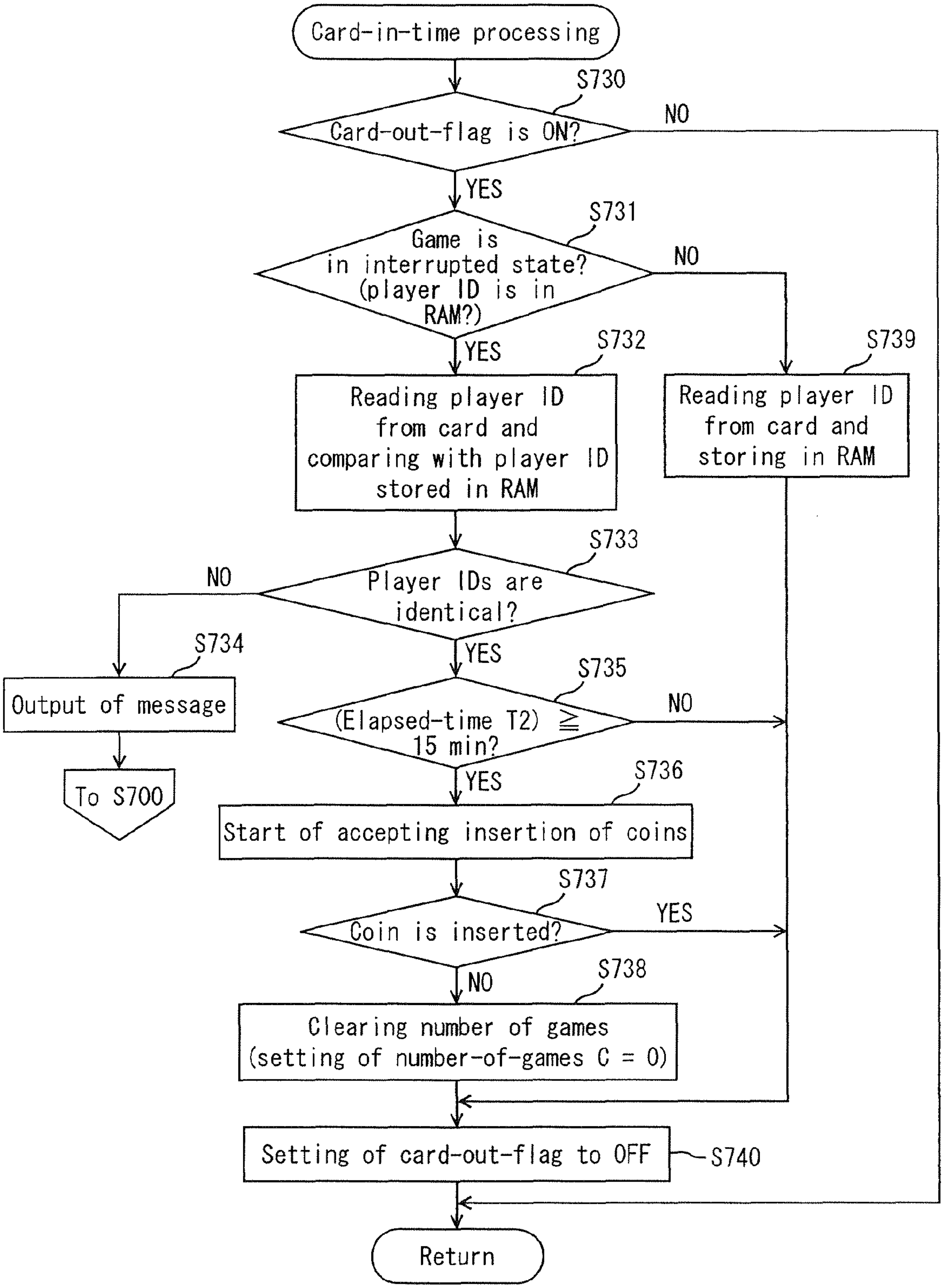
FIG. 35 is a flowchart showing a subroutine of card-in-time processing executed in the slot machine shown in FIG. 31.

FIG. 35 is a flowchart showing a subroutine of card-in-time processing executed in the slot machine shown in FIG. 31.

First, the main CPU 41 determines whether or not the card-in-flag is set to "ON" (step S730). When determining that the card-in-flag is not set to "ON", the main CPU 41 terminates the present subroutine.

When determining in step S730 that the card-in-flag is set to "ON", the main CPU 41 determines whether or not the game is interrupted (step S731). In the processing, the main CPU 41 determines that the game is interrupted when the player ID is stored in the RAM 43, and the main CPU 41 determines that the game is not interrupted (the game is ended) when the player ID is not stored in the RAM 43.

When determining in step S731 that the game is not interrupted, the main CPU 41 reads the player ID from the smart card and stores it into the RAM 43 (step S739). Thereafter, the main CPU 41 shifts the processing to step S740.

When determining in step S731 that the game is not interrupted, the main CPU 41 reads the player ID from the smart card and compares it with the player ID already stored in the RAM 43 (step S732). The main CPU 41 shifts the processing to step S735 when the two player IDs are identical to each other, while shifting the processing to step S734 when the two player IDs are not identical to each other.

In step S734, the main CPU 41 displays an image showing a predetermined message therein to the lower image display panel 16. Further, the main CPU 41 outputs a sound indicating a predetermined message through the speaker 29. Thereafter, the main CPU 41 returns the processing to step S700. Examples of the predetermined message include a message indicating that this slot machine 10 is locked by another player and not available, or that the player of this slot machine 10 is currently taking a break. As just described, in the case that the player ID read from the smart card is identical to the player ID stored in the RAM 43, the card in/out monitoring processing is executed again but the game is not executed.

The main CPU 41 determines in step S735 whether or not the elapsed-time T2 has reached 15 minutes (the fourth predetermined time) or more. When determining that the elapsed-time T2 has not reached 15 minutes or more, the main CPU 41 shifts the processing to step S740. On the other hand, when determining that the elapsed-time T2 has reached 15 minutes or more, the main CPU 41 starts accepting insertion of coins (step S736). In the processing of step S736, the main CPU 41 executes the processing for displaying a coin insertion image to the lower image display panel 16. The coin insertion image is for notifying the player that the game can be continued without the number of games being cleared, on condition that the player inserts 5 coins within the predetermined period (within 1 minute in the present invention). Further, in the processing of step S736, the main CPU 41 executes the processing for accepting, during the predetermined period of time (1 minute), 5 coins for preventing the number of games from being cleared. It is to be noted that, if the 5 coins are inserted or if an input of not inserting the 5 coins is entered, the main CPU 41 shifts the processing to step S737 even if the predetermined period (1 minute) has not elapsed.

In step S737, the main CPU 41 determines whether or not 5 coins for preventing the number of games from being cleared are inserted. When determining that the 5 coins are not inserted, the main CPU 41 clears the number of games by setting the number-of-games C to zero (C=0) in the storage area of data on the number-of-games C, the storage area being provided in the RAM 43 (step S738).

When determining in step S737 that the 5 coins are inserted, or after the processing of step S738, the main CPU 41 shifts the processing to step S740.

In step S740, the main CPU 41 sets the card-out-flag to "OFF", and then terminates the present subroutine.

As described above, in the card-in-time processing, insertion of 5 coins (the predetermined number) is accepted when the player ID same as the player ID read before interruption of the game is read before the elapsed-time T2 reaches 30 minutes (the third predetermined time) after the elapsed-time T2 has reached 15 minutes (the fourth predetermined time) that is shorter than 30 minutes (the third predetermined time); and the number-of-games C is cleared when 5 coins are not inserted. Accordingly, the player who has left the slot machine 10 for a longer period of time than 15 minutes (the fourth predetermined time) is required to insert 5 coins, as the condition of starting the game from the state before leaving the slot machine 10; thereby the game provider side can secure its profit of the period during which the games are not played.

Furthermore, since counting is restarted from the number-of-games C counted before leaving the slot machine 10 even without inserting coins when the player ID same as the player ID read before interruption of the game is read before 15 minutes (the fourth predetermined time) elapses; thus, it is possible to encourage the player to return to the slot machine 10 soon.

In the above-described embodiment, a case has been described where the number-of-games C is cleared when the elapsed-time T2 exceeds 30 minutes (the third predetermined time) More specifically, in the above-described embodiment, the history of games in the second aspect of the present invention is the number of games. However, the history of games in the second aspect of the present invention is not limited to the number of games.

Examples of the history of games include the number of player's lost games in the case that the gaming machine offers a poker game. In this case, for example, if a configuration is adopted in which a predetermined number of game media are paid out when the number of player's lost games reaches a specific number, the player can leave the gaming machine at ease for a break or the like, even when the number of player's lost games is approaching the specific number. Further, for example, in the case that the gaming machine offers a bingo game, the history of games may be the winning numbers that have been determined until then. In this case, the player can restart forming the rest of the bingo pattern to be formed thereon. Furthermore, as another example, in the case that the gaming machine offers a fighting game, the history of games may be the data according to the intermediate fighting result; then, the player can leave the gaming machine at ease even when he or she is in the middle of fighting.

In the second aspect of the present invention, the player information storage medium is not particularly limited so long as the player information for specifying the player is stored therein. In the second aspect of the present invention, the player information storage medium may be a house card that can be used only at specific shops and chain stores, or may be a card that the facility (e.g., a hotel) where this gaming machine is installed lends (for example, a dedicated card for the gaming machine use or a card for the gaming machine use with a hotel room key function). Further, the player information storage medium may be a credit card.

The slot machine 10 according to the above-described embodiment is a stand-alone type slot machine counting the number of games. However, in the present invention, the slot machine is not necessarily a stand-alone type slot machine, and a server connected to a plurality of slot machines via a network may count the number of games played in each slot machine.

Figure 36:
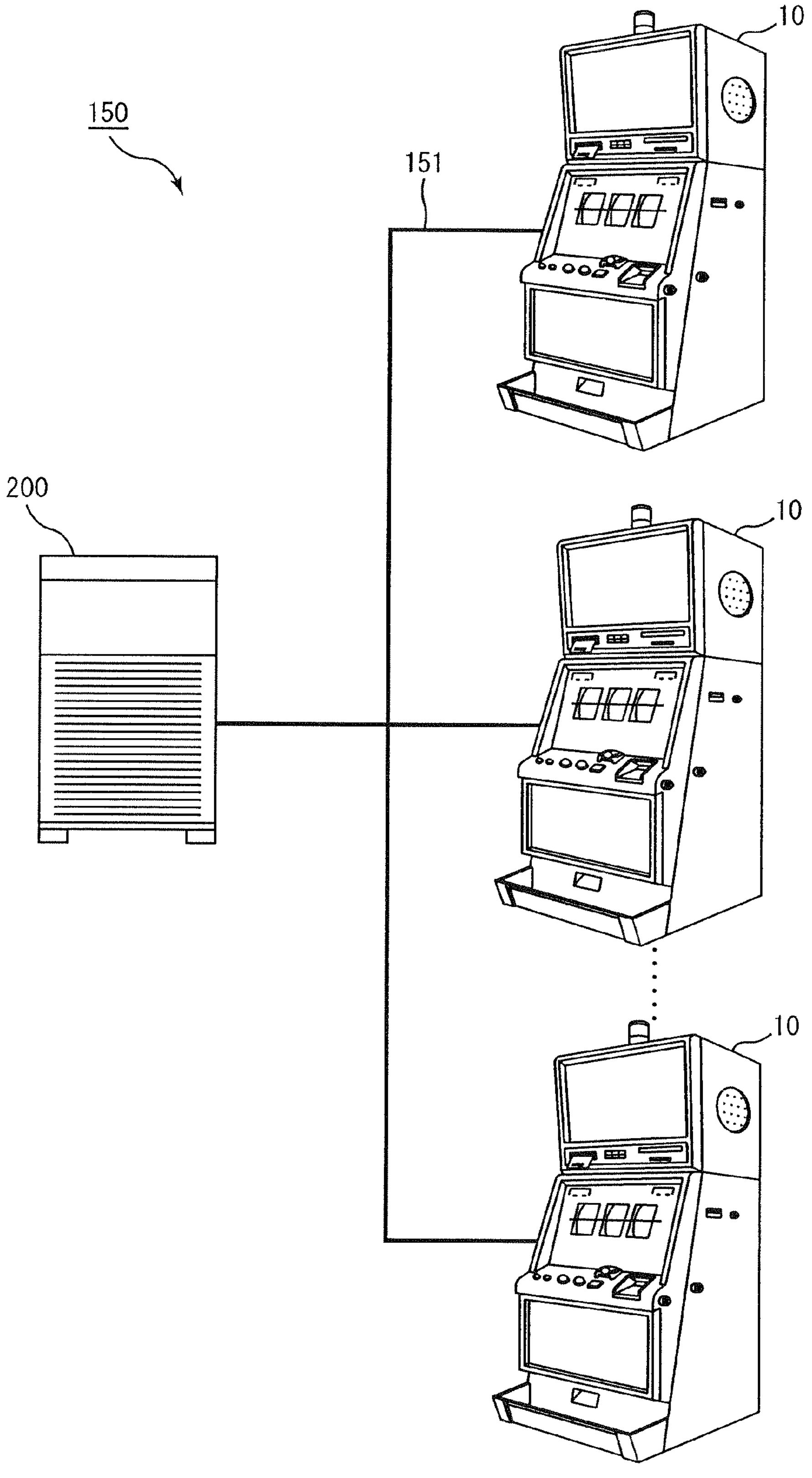
FIG. 36 is a schematic view showing an entire configuration of a game system according to one embodiment of the present invention.

FIG. 36 is a schematic view showing an entire configuration of a game system according to one embodiment of the present invention.

A game system 150 comprises a plurality of slot machines 10 and a server 200 connected with these slot machines 10 via a predetermined communication line 151. Such a game system 100 may be constructed inside one recreation facility where a variety of games can be played, such as a bar or a casino, or constructed among a plurality of recreation facilities. In the case of constructing the game system inside one recreation facility, the game system 150 may be constructed on each floor or in each section of the recreation facility. The communication line 151 is not particularly limited, and may be either wired or wireless, and an exclusive line, an exchange line or the like can be adopted.

The server 200 controls a plurality of slot machines 10. In the present embodiment, in particular, the server 200 conducts the processing for counting the number of games played in each slot machine 10. The server 200 may have a function as a so-called hall server which is installed in a recreation facility having a plurality of slot machines 10, a server to control a plurality of recreation facilities in block, or the like. It is to be noted that each slot machine 10 is provided with a unique identification number, and the server 200 determines from which slot machine data is transmitted according to the identification number. Also when data is transmitted from the server 200 to the slot machine 10, the server 200 specifies to which slot machine the data will be transmitted, by using the identification number.

In the above-mentioned example, the case of using mechanical reels 14 has been described. However, in the present invention (the first aspect of the present invention and the second aspect of the present invention), symbols may be displayed to a display device such as a liquid crystal display device in place of the mechanical reels.

Figure 37:
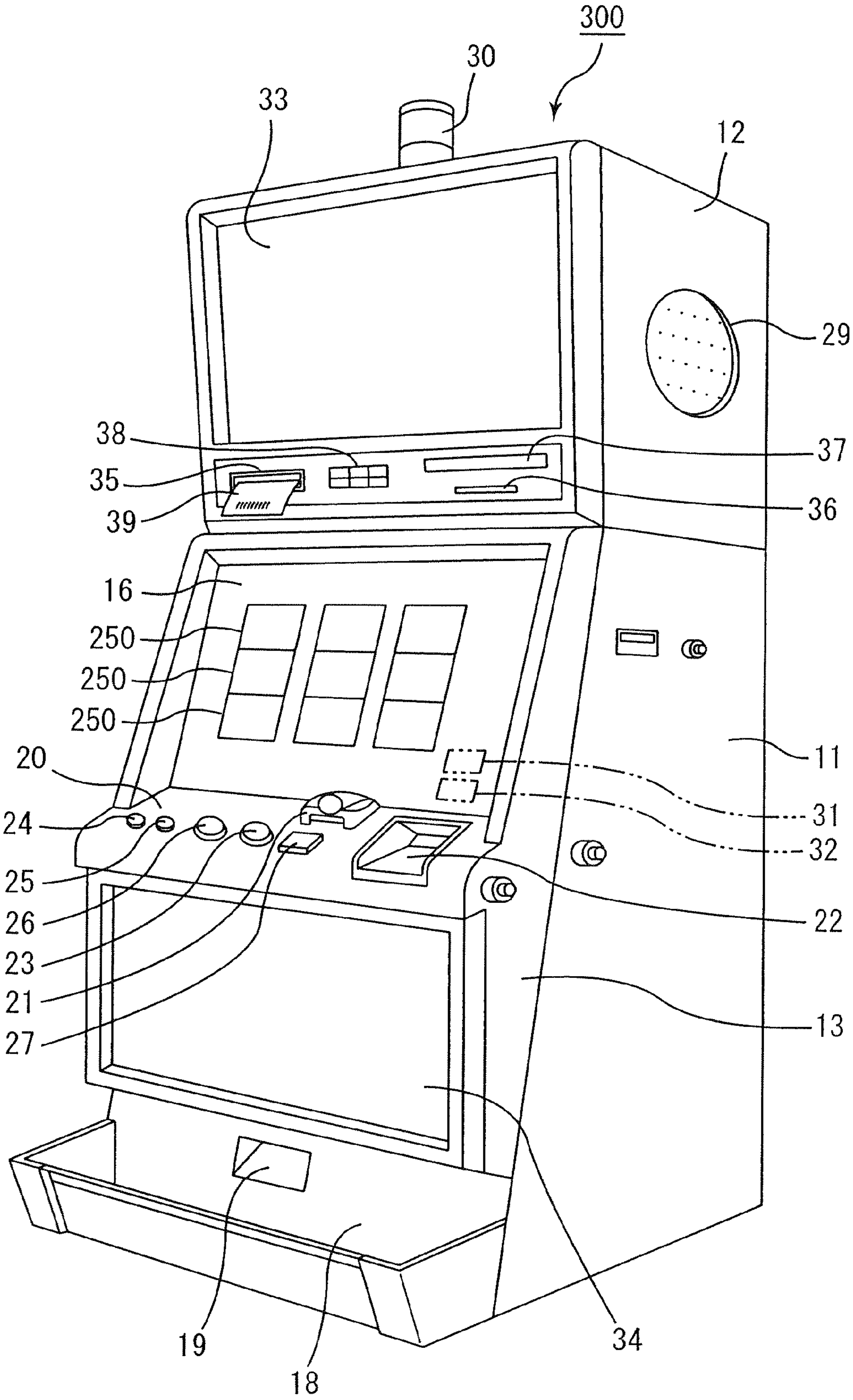
FIG. 37 is a diagrammatic view showing a slot machine according to another embodiment of the present invention.

FIG. 37 is a perspective view schematically showing a slot machine according to another embodiment of the present invention.

Except for displaying symbols to a lower image display panel, a slot machine 300 has substantially the same appearance, circuit configuration and the like as those of the slot machine 10, and the flowchart of the slot machine 300 is substantially the same as that of the slot machine 10. Therefore, descriptions of the slot machine 300 are omitted except for a description of symbol display. Further, constituents corresponding to those of the slot machine 10 are provided with the same numerals as in the slot machine 10.

The lower image display panel 16 included in the slot machine 300 is provided with symbol display areas 250 of three columns and three rows, and one symbol is displayed in each symbol display area. In such a configuration, the scroll-display of symbols may be displayed to the lower image display panel 16 in place of the reel rotation control by the sub CPU 61.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step becomes apparent from the above descriptions.

What is claimed as new and desired to be secured by Letters Patent of the United States is:

1. A gaming machine comprising:

a removable key provided so as to correspond to said gaming machine; and a controller, said controller programmed to execute the processing of (A) determining whether or not said key has been removed, (B) controlling said gaming machine so as to make a game executable when determining in said processing (A) that said key has not been removed, while controlling said gaming machine so as to make the game unexecutable when determining in said processing (A) that said key has been removed, (C) executing a game on condition that the flame has been made executable in said processing (B), (D) counting the number of games when transition occurs from a non-insurance mode to an insurance mode, (E) measuring an elapsed time since last removal of said key, (F) clearing the number of games counted in said processing (D) when said elapsed time reaches a first predetermined time without said key being returned, wherein transition occurs from the insurance mode to the non-insurance mode upon clearing the number of games; and (G) paying out a predetermined number of game media when the number of games counted in said processing step (D) has reached a specific number.

2. The gaming machine according to claim 1, wherein said controller is further programmed to execute the processing of (H) accepting insertion of a predetermined number of game media, when said key is returned before said elapsed time reaches said first predetermined time after having reached a second predetermined time that is shorter than said first predetermined time, and clearing said history of games when a predetermined number of game media are not inserted.

3. A gaming machine comprising: a removable key provided so as to correspond to said gaming machine; a symbol display device capable of variably displaying a plurality of symbols; and a controller, said controller programmed to execute the processing of (A) determining whether or not said key has been removed, (B) controlling said gaming machine so as to make a game executable when determining in said processing (A) that said key has not been removed, while controlling said gaming machine so as to make the game unexecutable when determining in said processing (A) that said key has been removed, (C) executing, on condition that the game has been made executable in said processing (B), a game in which said plurality of symbols are variably displayed and then stop-displayed by said symbol display device after game media have been BET in number equal to or less than a predetermined maximum number of BETs, and game media are paid out in number according to the stop-displayed symbols or a combination thereof, (D) counting the number of games when transition occurs from a non-insurance mode to an insurance mode, (E) paying out a predetermined number of game media when the number of games counted in said processing (D) has reached a specific number, (F) measuring an elapsed time since last removal of said key, and (G) clearing the number of games counted in said processing (D) when said elapsed time reaches a first predetermined time without said key being returned, wherein transition occurs from the insurance mode to the non-insurance mode upon clearing the number of games.

4. The gaming machine according to claim 3, wherein said controller is further programmed to execute the processing of accepting insertion of a predetermined number of game media, when said key is returned before said elapsed time reaches said first predetermined time after having reached a second predetermined time that is shorter than said first predetermined time; and clearing the number of games when the predetermined number of game media are not inserted.

5. The gaming machine according to claim 1, further comprising a data reading device capable of reading data from a removable storage medium, wherein said key includes an identification information storage medium storing identification information for identifying said gaming machine, and determining that said key has been removed when the identification information corresponding to said gaming machine is readable by said data reading device, and determining that said key has not been removed when the identification information corresponding to said gaming machine is unreadable by said data reading device.

6. A gaming machine comprising:

a reading device capable of reading player data from a player information storage medium storing said player information for specifying a player;

an input device with which interruption of a game or end of the game is to be inputted; and a controller, said controller programmed to execute the processing of (A) reading the player information from the player information storage medium by using said reading device, (B) making the game executable when, in the game ended state, the player information has been read in said processing (A), (C) making the game unexecutable, on condition that interruption of the game or end of the game has been inputted from said input device, (D) determining, when the player information is read in said processing (A) after interruption of the game has been last inputted from said input device, whether or not this piece of player information is the same as a piece of player information having been last read before interruption of the game, (E) making the game executable when determining that the two pieces of player information are the same, while keeping the game unexecutable when determining that the two pieces of player information are not the same;

(F) executing the game on condition that the game has been made executable in said processing (B) and when transition occurs from a non-insurance mode to an insurance mode;

(G) measuring an elapsed time since last input of interruption of the game from said input device; and (H) clearing a history of games executed in said processing (F), when said elapsed time reaches a third predetermined time without the game being made executable in said processing (E) after interruption of the game has been last inputted from said input device, wherein transition occurs from the insurance mode to the non-insurance mode upon clearing a history of games executed.

7. The gaming machine according to claim 6, wherein said controller is further programmed to execute the processing of:

(I) determining whether or not the piece of player information, which is read by said reading device before said elapsed time reaches said third predetermined time after having reached a fourth predetermined time that is shorter than said third predetermined time, is the same as a piece of player information having been last read before interruption of the game; and (J) accepting insertion of a predetermined number of game media when the two pieces of player information have been determined to be the same in said processing (I), and clearing said history of games when the predetermined number of game media are not inserted.

8. The gaming machine according to claim 7, further comprising a symbol display device capable of variably displaying a plurality of symbols, wherein executing, on the condition that the game has been made executable, a game in which said plurality of symbols are variably displayed and then stop-displayed by said symbol display device after game media have been BET in number equal to or less than a predetermined maximum number of BETs, and game media are paid out in number according to the stop-displayed symbols or a combination thereof;

said controller is further programmed to execute the processing of counting the number of games; and paying out a predetermined number of game media when the number of games counted has reached a specific number; and clearing the number of games counted when said elapsed time reaches the third predetermined time without the game being made executable after interruption of the game has been last inputted from said input device.

9. The gaming machine according to claim 8, wherein said accepting insertion of a predetermined number of game media when the two pieces of player information have been determined to be the same includes clearing the number of games when the predetermined number of game media are not inserted.

10. A control method of a gaming machine comprising the steps of:

(A) determining whether or not a removable key, which is provided so as to correspond to said gaming machine, is removed;

(B) making a game executable when determining in said step (A) that said key has not been removed, while making the game unexecutable when determining in said step (A) that said key has been removed;

(C) executing, on condition that the, game has been made executable in said step (B), a, game in which said plurality of symbols are variably displayed and then stop-displayed by said symbol display device after, game media have been BET in number equal to or less than a predetermined maximum number of BETs, and, game media are paid out in number according to the stop-displayed symbols or a combination thereof;

(D) counting the number of games when transition occurs from a non-insurance mode to an insurance mode;

(E) paying out a predetermined number of, game media when the number of games counted in said step (D) has reached a specific number;

(F) measuring an elapsed time since last removal of said key; and (G) clearing the number of, games counted in said step (D), when said elapsed time reaches a first predetermined time without said key being returned, wherein transition occurs from the insurance mode to the non-insurance mode upon clearing the number of games counted.

11. The gaming machine according to claim 4, wherein measuring an elapsed time since last removal of said key is started when transition occurs from a non-insurance mode to an insurance mode; and transition occurs from the insurance mode to the non-insurance mode upon clearing the number of games in said processing when the predetermined number of game media are not inserted.

* * * * *